US012613661B2

(12) United States Patent
Kawaguchi et al.

(10) Patent No.: US 12,613,661 B2
(45) Date of Patent: Apr. 28, 2026

(54) MEMORY SYSTEM AND MEMORY DEVICE

(71) Applicant: Kioxia Corporation, Tokyo (JP)

(72) Inventors: Yuki Kawaguchi, Fujisawa Kanagawa
(JP); Takehiko Amaki, Yokohama
Kanagawa (JP); Suguru Nishikawa,
Kita Tokyo (JP); Yoshihisa Kojima,
Kawasaki Kanagawa (JP)

(73) Assignee: Kioxia Corporation, Tokyo (JP)

( * ) Notice: Subject to any disclaimer, the term of this
patent is extended or adjusted under 35
U.S.C. 154(b) by 0 days.

(21) Appl. No.: 18/820,068

(22) Filed: Aug. 29, 2024

(65) Prior Publication Data

US 2025/0077121 A1     Mar. 6, 2025

(30) Foreign Application Priority Data

Aug. 30, 2023     (JP) ................................. 2023-140408

(51) Int. Cl.
*G06F 3/06* (2006.01)
(52) U.S. Cl.
CPC .......... *G06F 3/0659* (2013.01); *G06F 3/0619*
(2013.01); *G06F 3/0679* (2013.01)
(58) Field of Classification Search
CPC .... G06F 3/0659; G06F 3/0619; G06F 3/0679;
G11C 16/06; G11C 29/42
See application file for complete search history.

(56) References Cited

U.S. PATENT DOCUMENTS

| | | | |
|---|---|---|---|
| 7,701,768 B2 | 4/2010 | Hwang | |
| 9,225,356 B2 | 12/2015 | Mu | |
| 11,429,538 B2 | 8/2022 | Byun | |
| 11,437,104 B2 | 9/2022 | Sharma | |
| 2014/0254262 A1 | 9/2014 | Chen | |
| 2019/0227751 A1* | 7/2019 | Khakifirooz | ........ G11C 11/5628 |
| 2020/0004446 A1 | 1/2020 | Palmer | |
| 2020/0286568 A1 | 9/2020 | Sheperek | |
| 2021/0064285 A1* | 3/2021 | Ji | ............................ G06F 3/064 |
| 2021/0064294 A1* | 3/2021 | Kim | ...................... G06F 3/0679 |
| 2022/0342585 A1* | 10/2022 | Sharma | ................ G06F 3/0679 |
| 2024/0005969 A1 | 1/2024 | Asami | |

* cited by examiner

*Primary Examiner* — Francisco A Grullon
(74) *Attorney, Agent, or Firm* — Kim & Stewart LLP

(57) ABSTRACT

A memory system includes a non-volatile memory and a
memory controller. The non-volatile memory includes a
memory cell and a control circuit that writes first data of n
bits to the memory cell by a first write operation and writes
second data of m bits, which includes the n bits of the first
data, to the memory cell by a second write operation. The
memory controller issues a first command sequence to the
non-volatile memory to execute the first write operation,
selects one of first and second methods for preparing the
second data for the second write operation based on an index
related to reliability of the first data stored in the memory
cell, and issues a second command sequence to the non-
volatile memory to execute the second write operation, the
second command sequence indicating the selected method
for preparing the second data.

29 Claims, 38 Drawing Sheets

TBL1

| MLC PROGRAM LOG TABLE | | |
|---|---|---|
| WL | SU | MLC PROGRAM COMPLETION TIME |
| 0 | 0 | 0:01 |
| 0 | 1 | 0:02 |
| ⋮ | ⋮ | ⋮ |

*FIG. 9*

| | | SU0 | SU1 | SU2 | SU3 | SU4 |
|---|---|---|---|---|---|---|
| WL0 | MLC | 1 | 2 | 3 | 4 | 5 |
| | Fine | 7 | 9 | 11 | 13 | 15 |
| WL1 | MLC | 6 | 8 | 10 | 12 | 14 |
| | Fine | 17 | 19 | 21 | 23 | 25 |
| WL2 | MLC | 16 | 18 | 20 | 22 | 24 |

| CHIP | THRESHOLD VALUE |
|------|-----------------|
| 0 | Dth_Chip0 |
| ... | ... |
| i | Dth_Chipi |
| ... | ... |

*FIG. 22B*

| WORD LINE (WL) | THRESHOLD VALUE |
|----------------|-----------------|
| 0 | Dth_WL0 |
| ... | ... |
| i | Dth_WLi |
| ... | ... |

*FIG. 22A*

| BLOCK (BLK) | THRESHOLD VALUE |
|-------------|-----------------|
| 0 | Dth_BLK0 |
| ... | ... |
| i | Dth_BLKi |
| ... | ... |

MEMORY SYSTEM AND MEMORY DEVICE

CROSS-REFERENCE TO RELATED APPLICATION(S)

This application is based upon and claims the benefit of priority from Japanese Patent Application No. 2023-140408, filed Aug. 30, 2023, the entire contents of which are incorporated herein by reference.

FIELD

Embodiments described herein relate generally to a memory system and a memory device.

BACKGROUND

A solid state drive (SSD) including a memory controller and a memory device is known as one type of memory systems. The memory device is, for example, a non-volatile memory. The non-volatile memory is, for example, a NAND flash memory.

DESCRIPTION OF THE DRAWINGS

FIG. 1 is a block diagram showing a configuration example of a memory system according to a first embodiment.

FIG. 4 is a diagram showing an example of a relationship between a threshold voltage and data of a memory cell according to the first embodiment.

FIG. 6 is a diagram showing a configuration example of a management table in the memory system according to the first embodiment.

FIG. 9 is a diagram showing an operation example of a write operation in the memory system of the first embodiment.

FIG. 10 is a sequence diagram showing an operation example of the write operation in the memory system of the first embodiment.

FIG. 11 is a sequence diagram showing another operation example of the write operation in the memory system of the first embodiment.

FIG. 12 is a sequence diagram showing still another operation example of the write operation in the memory system according to the first embodiment.

FIG. 18 is a diagram showing the operation example of the first write operation in the memory system of the first embodiment.

FIG. 20 is a diagram showing the operation example of the second write operation in the memory system of the first embodiment.

FIGS. 22A to 22C are diagrams showing a configuration example of a second modification example of the memory system of the first embodiment.

FIG. 23 is a block diagram showing a configuration example of a third modification example of the memory system of the first embodiment.

FIG. 24 is a block diagram showing a configuration example of a memory system according to a second embodiment.

FIG. 26 is a diagram showing an operation example of the write operation in the memory system according to the second embodiment.

FIG. 31 is a block diagram showing a configuration example of a memory system according to a third embodiment.

FIG. 34 is a block diagram showing a configuration example of a memory system according to a fourth embodiment.

DETAILED DESCRIPTION

Figure 2:
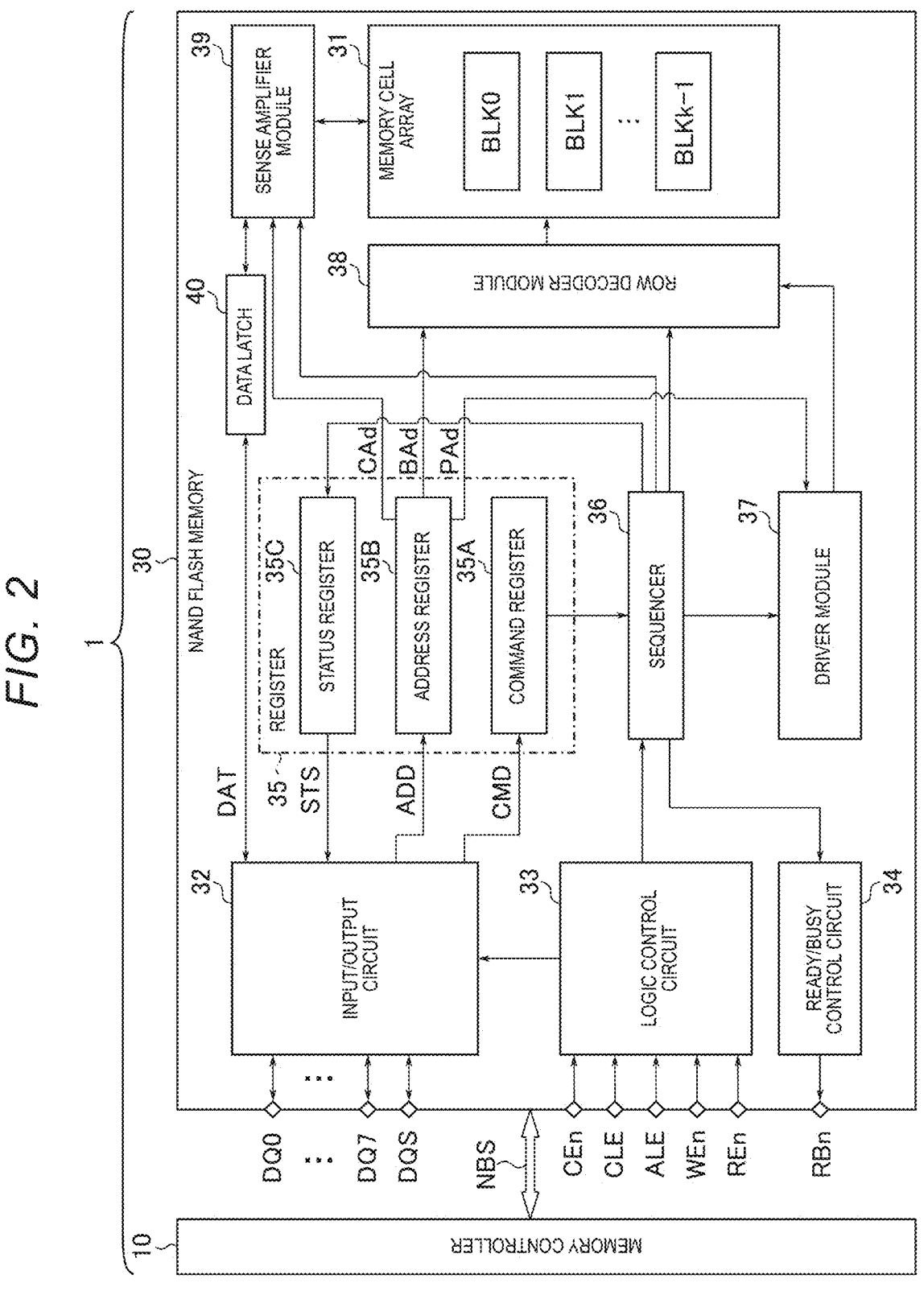
FIG. 2 is a block diagram showing a configuration example of a non-volatile memory according to the first embodiment.

Embodiments provide a memory system with high performance and high reliability.

In general, according to one embodiment, a memory system includes a non-volatile memory and a memory controller electrically connected to the non-volatile memory. The non-volatile memory includes a memory cell configured to store data in a non-volatile manner, and a control circuit configured to write first data of n (n is a real number of 1 or larger) bits to the memory cell by a first write operation and write second data of m bits (m is a real number larger than n), which includes the n bits of the first data, to the memory cell by a second write operation. The memory controller is configured to issue a first command sequence to the non-volatile memory to execute the first write operation, select one of first and second methods for preparing the second data for the second write operation based on an index related to reliability of the first data stored in the memory cell, and issue a second command sequence to the non-volatile memory to execute the second write operation, the second command sequence indicating the selected method for preparing the second data.

A memory system of the embodiments will be described with reference to FIGS. 1 to 37. In the following description, the elements having the same functions and configurations are denoted by the same reference signs. In addition, in each of the following embodiments, a numeral/alphabet for differentiation may be used at the end of a reference sign of the element (for example, a circuit, wiring, various voltages and signals). When the elements may not be distinguished from each other, reference signs without such numeral/alphabet at the end are used.

(1) First Embodiment

A memory system of a first embodiment will be described with reference to FIGS. 1 to 23.

(a) Configuration Example

(a-1) Information Processing System

Figure 1:
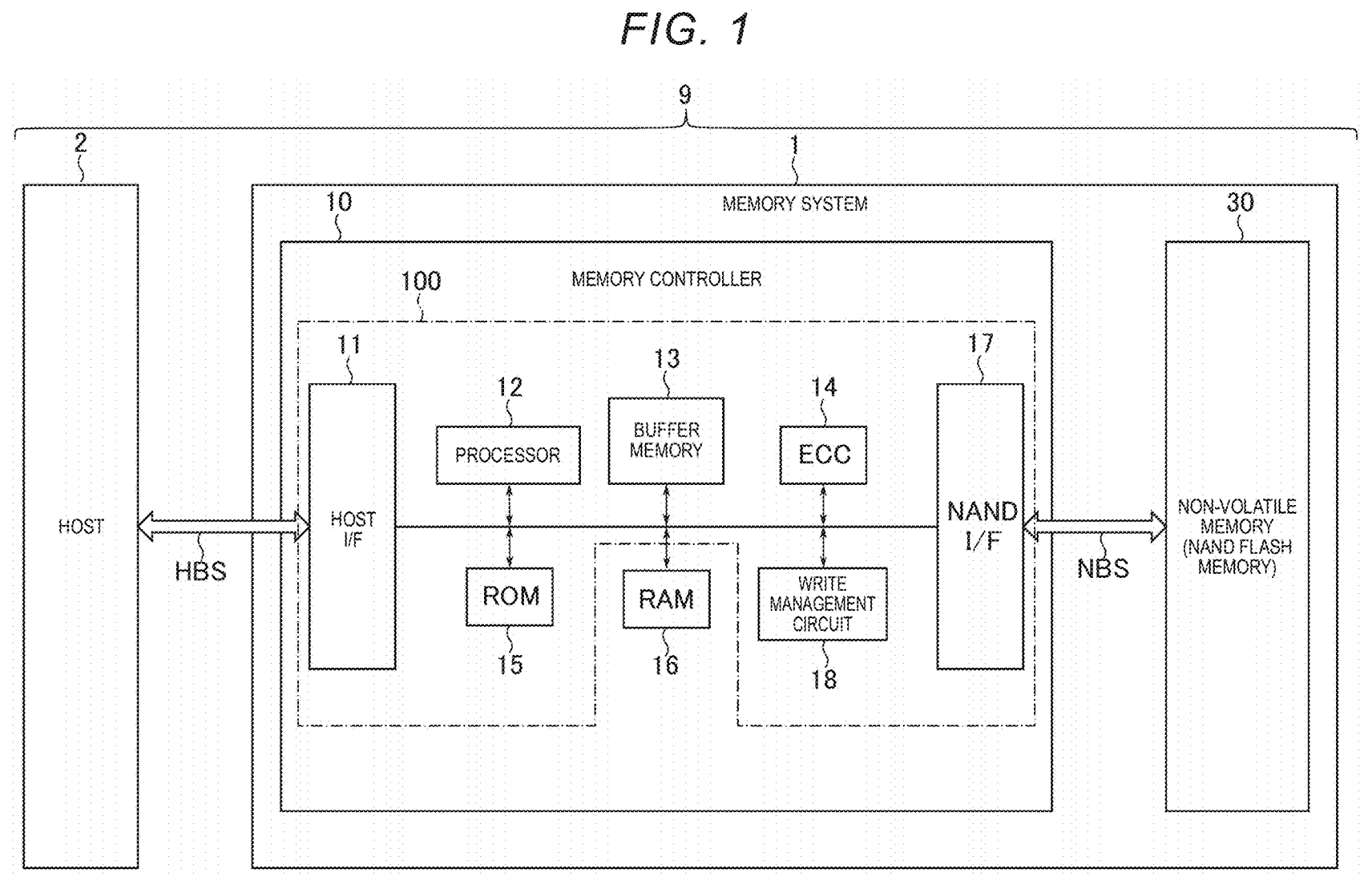

As shown in FIG. 1, an information processing system 9 includes a memory system 1 and a host 2.

The memory system 1 is a device that stores data. The memory system 1 is, for example, a solid state drive (SSD), a universal flash storage (UFS) device, a universal serial bus (USB) memory, a multi-media card (MMC), or an SD® card. The memory system 1 can be connected to the host 2 via a host bus HBS. The memory system 1 performs processing based on a request (e.g., a command or a host command) received from the host 2 or a spontaneous processing request generated inside the memory system 1.

The host 2 is a computing device that controls the memory system 1. The host 2 is, for example, a personal computer, a server system, a mobile device, an on-vehicle device, or a digital camera.

(a-1-1) Internal Configuration of Memory System

The memory system 1 includes a memory controller 10 and a memory device 30. The memory device 30 is, for example, a non-volatile memory. The memory device 30 is, for example, a non-volatile semiconductor memory such as a NAND flash memory. Hereinafter, the memory device 30 is referred to as a non-volatile memory 30 or a NAND memory 30.

The memory controller 10 is a device that controls the NAND memory 30. The memory controller 10 is configured to be connected to the host 2 via the host bus HBS. The memory controller 10 receives a request from the host 2 via the host bus HBS. A type of the host bus HBS depends on an application applied to the memory system 1. When the memory system 1 is an SSD, the host bus HBS complies with, for example, the serial attached SCSI (SAS) standard, the serial ATA (SATA) standard, or the peripheral component interconnect express (PCIe™) standard. When the memory system 1 is a UFS device, the host bus HBS complies with the M-PHY standard. When the memory system 1 is a USB memory, the host bus HBS complies with the USB standard. When the memory system 1 is an MMC, the host bus HBS complies with the embedded multimedia card (eMMC) standard. When the memory system 1 is an SDTM card, the host bus HBS complies with the SD™ standard.

The memory controller 10 controls the NAND memory 30 via a NAND bus NBS based on a request received from the host 2 or a spontaneous processing request generated inside the memory system 1. The NAND bus NBS complies with, for example, a Toggle NAND Flash Interface standard or an Open NAND Flash Interface standard.

The NAND memory 30 is a device that stores data. The NAND memory 30 includes a plurality of memory cells. Each of the plurality of memory cells stores data in a non-volatile manner in accordance with a threshold voltage of the memory cell. The NAND memory 30 stores data received from the memory controller 10 in a non-volatile manner in the plurality of memory cells. The NAND memory 30 outputs data read from the plurality of memory cells to the memory controller 10.

(a-1-2) Memory Controller

An example of an internal configuration of the memory controller 10 will be described.

As shown in FIG. 1, the memory controller 10 includes a host interface (I/F) circuit 11, a processor 12, a buffer memory 13, an error checking and correcting (ECC) circuit 14, a read only memory (ROM) 15, a random access memory (RAM) 16, a NAND interface (I/F) circuit 17, and a write management circuit 18. The host interface circuit 11, the processor 12, the buffer memory 13, the ECC circuit 14, the ROM 15, the NAND interface circuit 17, and the write management circuit 18 may be configured as, for example, a system-on-a-chip (SoC) 100. In the example shown in FIG. 1, the RAM 16 is implemented outside the SoC 100, but the RAM 16 may be implemented inside the SoC 100. The memory controller 10 may be configured with a plurality of chips. The function of each part of the memory controller 10 may be implemented by a dedicated hardware circuit, a processor that executes a program (firmware), or a combination thereof.

The host interface circuit 11 is a circuit that controls communication between the memory controller 10 and the host 2. The host interface circuit 11 is configured to be connected to the host 2 via the host bus HBS.

The processor 12 is a control circuit of the memory controller 10. The processor 12 is, for example, a central processing unit (CPU). The processor 12 controls an operation of the entire memory controller 10 by executing a program (firmware) stored in the ROM 15. For example, the processor 12 controls a write operation based on a write request received from the host 2. The same applies to a read operation and an erase operation.

The buffer memory 13 is a memory that temporarily stores data. The buffer memory 13 is, for example, a static random access memory (SRAM). The buffer memory 13 temporarily stores write data, read data, and the like. The write data is data to be written to the NAND memory 30. The read data is data read from the NAND memory 30.

The ECC circuit 14 is a circuit that performs error checking and correcting (ECC) processing to correct data errors. The ECC circuit 14 generates an error correction code based on write data during a data write operation. The ECC circuit 14 generates a syndrome based on the error correction code in a predetermined unit and detects an error during a data read operation. The ECC circuit 14 corrects the detected error.

The ROM 15 is a non-volatile memory. The ROM 15 is, for example, an electrically erasable programmable read-only memory (EEPROM™). The ROM 15 stores a program such as firmware.

The RAM 16 is a volatile memory. The RAM 16 is, for example, an SRAM or a dynamic random access memory (DRAM). The RAM 16 is used as a work area of the processor 12. The RAM 16 stores firmware for managing the NAND memory 30 and various pieces of management information. The RAM 16 stores, for example, various tables TBL1.

The NAND interface circuit 17 is a circuit that controls communication between the memory controller 10 and the NAND memory 30. The NAND interface circuit 17 is connected to the NAND memory 30 via a NAND bus NBS. For example, the NAND interface circuit 17 controls transfer of data, commands, addresses, and the like between the memory controller 10 and the NAND memory 30.

The write management circuit 18 performs various management of the write operation to be executed by the NAND memory 30 based on a state of data in the NAND memory 30.

(a-1-3) NAND Flash Memory

A configuration of the NAND memory 30 will be described with reference to FIG. 2.

FIG. 2 is a block diagram showing an example of the configuration of the NAND memory 30. The NAND memory 30 includes a memory cell array 31, an input/output circuit 32, a logic control circuit 33, a ready/busy control circuit 34, a register 35, a sequencer 36, a driver module 37, a row decoder module 38, a sense amplifier module 39, and a data latch 40.

The memory cell array 31 includes one or more blocks BLK0, BLK1, . . . , and BLKk−1. Here, k is an integer of 1 or larger. The block BLK is, for example, a set of a plurality of memory cells, the data stored in which are collectively erased. For example, the block BLK is used as a unit of a data erase operation. A plurality of bit lines and a plurality of word lines are provided in the memory cell array 31. Each memory cell is associated with, for example, one bit line and one word line. The memory cell array 31 will be described in detail later.

The input/output circuit 32 is a circuit that communicates with the memory controller 10. The input/output circuit 32 communicates an input/output signal DQ (for example, signals DQ0 to DQ7 of 8 bits) and a data strobe signal DQS with the memory controller 10. The signal DQ contains data communicated between the NAND memory 30 and the memory controller 10. The signal DQ is, for example, a command CMD, an address ADD, status information STS, and data DAT. The signal DQS is a signal (e.g., synchronization signal) for controlling a timing of communication of the signal DQ. For example, at the time of writing data, the signal DQS is transmitted from the memory controller 10 to the NAND memory 30 together with the signal DQ including the write data. The NAND memory 30 receives a signal DQ including the write data in synchronization with the signal DQS. At the time of reading data, the signal DQS is transmitted from the NAND memory 30 to the memory controller 10 together with the signal DQ including the read data. The memory controller 10 receives the signal DQ including the read data in synchronization with the signal DQS. The input/output circuit 32 may receive the signal DQS from the memory controller 10 via the logic control circuit 33.

The input/output circuit 32 transmits the command CMD in the signal DQ to a command register 35A. The input/output circuit 32 transmits the address ADD in the signal DQ to an address register 35B. The input/output circuit 32 receives the status information STS from a status register 35C. The input/output circuit 32 transmits and receives the data DAT in the signal DQ to and from the data latch 40.

The logic control circuit 33 is a circuit that controls the input/output circuit 32 and the sequencer 36 based on control signals. The logic control circuit 33 receives a chip enable signal CEn, a command latch enable signal CLE, an address latch enable signal ALE, a write enable signal WEn, and a read enable signal REn from the memory controller 10. The signal CEn is a signal for enabling the NAND memory 30. The signal CLE is a signal indicating that the signal DQ received by the NAND memory 30 contains the command CMD. The signal ALE is a signal indicating that the signal DQ received by the NAND memory 30 contains the address ADD. The signal WEn is a signal for instructing the NAND memory 30 to input the signal DQ. The signal REn is a signal for instructing the NAND memory 30 to output the signal DQ. The NAND memory 30 generates the signal DQS based on the signal REn. The NAND memory 30 outputs the signal DQ to the memory controller 10 based on the generated signal DQS.

The ready/busy control circuit 34 is a circuit that informs the memory controller 10 of the operation status of the sequencer 36. The ready/busy control circuit 34 transmits a ready/busy signal RBn to the memory controller 10 based on the operation status of the sequencer 36. The signal RBn is a signal indicating whether the NAND memory 30 is in a ready state or a busy state. A signal level of the signal RBn is set to, for example, a high level ("H" level) when the NAND memory 30 is in the ready state. The ready state is a state in which the NAND memory 30 is able to receive a command from the memory controller 10. A signal level of the signal RBn is set to, for example, a low level ("L" level) when the NAND memory 30 is in the busy state. The busy state is a state in which the NAND memory 30 is unable to receive a command from the memory controller 10.

The register 35 is a circuit that temporarily stores information. The register 35 includes the command register 35A, the address register 35B, and the status register 35C.

The command register 35A is a circuit that stores the command CMD. The command CMD includes, for example, a command to cause the sequencer 36 to execute the read operation, the write operation, or the erase operation.

The address register 35B is a circuit that stores the address ADD. The address ADD includes, for example, a row address and a column address CAd. The row address includes a block address BAd and a page address PAd (which is also a word line address). For example, the block address BAd, the page address PAd, and the column address CAd are used to select the block BLK, the word line, and the bit line, respectively.

The status register 35C is, for example, a circuit that temporarily stores the status information STS in the read operation, the write operation, or the erase operation. The status information STS is used to notify the memory controller 10 of whether the operation has normally ended.

The sequencer 36 is a circuit that controls an operation of another circuit according to a predetermined program. The sequencer 36 controls operations of the entire NAND memory 30. For example, the sequencer 36 controls the ready/busy control circuit 34, the driver module 37, the row decoder module 38, and the sense amplifier module 39 based on the command CMD stored in the command register 35A. For example, the sequencer 36 executes the read operation, the write operation, and the erase operation.

The driver module 37 is a circuit that generates a voltage used in the read operation, the write operation, and the erase operation. The driver module 37 applies the generated voltage to a signal line corresponding to the selected word line, based on the page address PAd stored in the address register 35B.

The row decoder module 38 is a circuit that selects one block BLK in the memory cell array 31 based on the block address BAd stored in the address register 35B. The row decoder module 38 transfers the voltage applied to the signal line corresponding to the selected word line to the selected word line in the selected block BLK.

In the write operation, the sense amplifier module 39 receives the write data DAT from the input/output circuit 32 via the data latch 40. The sense amplifier module 39 applies a voltage based on the received write data DAT to the bit line. In the read operation, the sense amplifier module 39 determines the data stored in the memory cell based on the presence or absence of a current in the bit line or a voltage of the bit line. The sense amplifier module 39 transfers a determination result as read data DAT to the input/output circuit 32 via the data latch 40.

The data latch (also referred to as a data cache) 40 includes a plurality of latch circuits (not shown). Each latch circuit temporarily stores write data or read data. In the write operation, for example, the data latch 40 temporarily stores the write data received from the input/output circuit 32 and transmits the write data to the sense amplifier module 39. In addition, in the read operation, the data latch 40 temporarily stores the read data received from the sense amplifier module 39 and transmits the read data to the input/output circuit 32.

Configuration Example of Memory Cell Array

Figure 3:
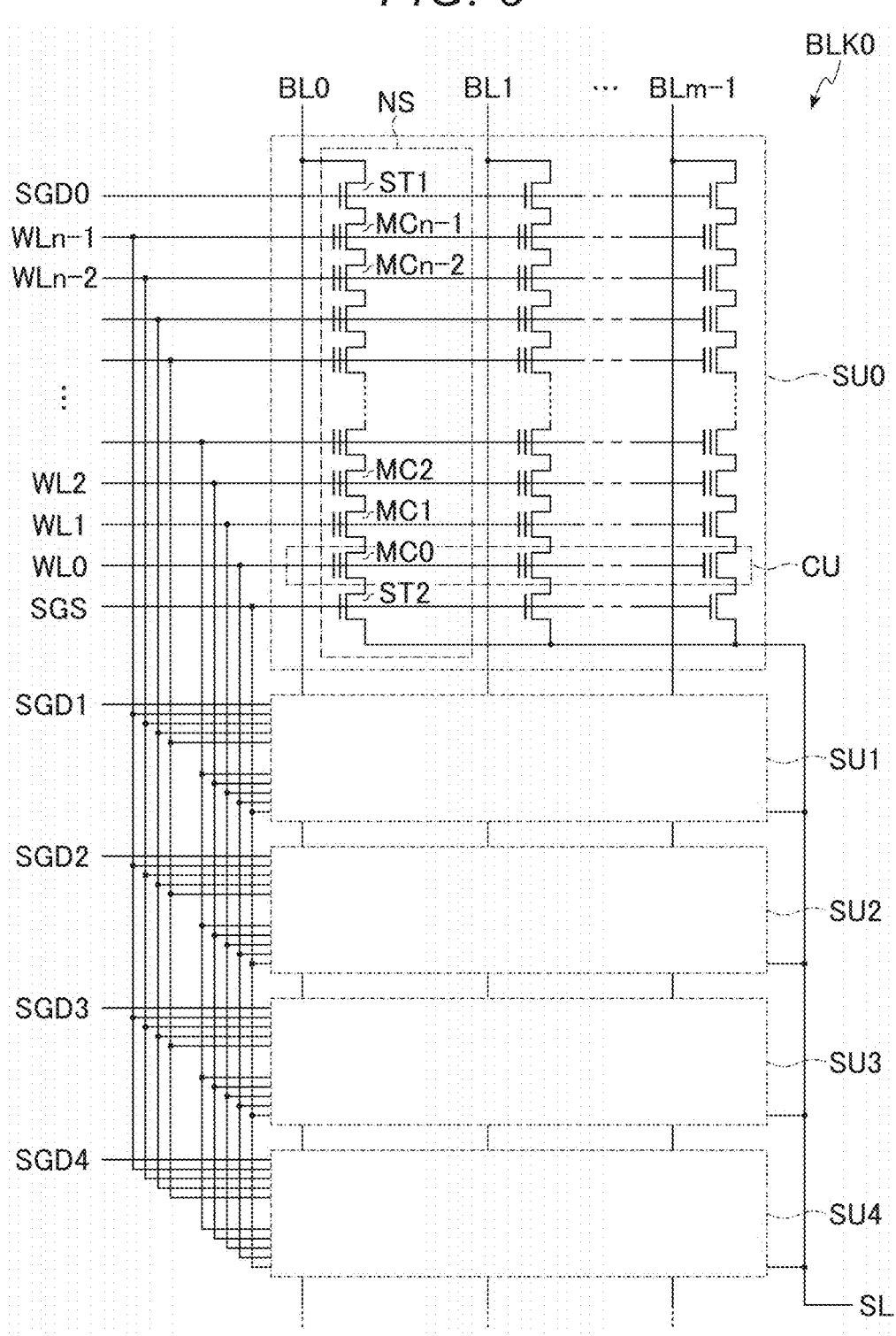
FIG. 3 is a circuit diagram of a memory cell array of the non-volatile memory according to the first embodiment.

The circuit configuration of the memory cell array 31 will be described with reference to FIG. 3. FIG. 3 is a circuit diagram of the memory cell array 31. FIG. 3 shows a circuit configuration of the block BLK0 provided in the memory cell array 31 as an example of the circuit configuration of the memory cell array 31. Other blocks BLK also have the same configuration as in FIG. 3.

The block BLK0 includes, for example, five string units SU0, SU1, SU2, SU3, and SU4. Each string unit SU is, for example, a set of a plurality of NAND strings NS that are collectively selected in the write operation or the read operation. Each string unit SU includes a plurality of NAND strings NS associated with the bit lines BL0, BL1, . . . , and BLm−1, respectively. Here, m is an integer of 1 or larger. The NAND string NS is a set of a plurality of memory cells connected in series. Each NAND string NS includes, for example, memory cells MC0, MC1, MC2, MC3, . . . , MCn−2, and MCn−1, a select transistor ST1, and a select transistor ST2. Here, n is an integer of 1 or larger. The memory cell MC (also referred to as a memory cell transistor) is a field effect transistor including a control gate and a charge storage layer. The select transistors ST1 and ST2 are switching elements. Each of the select transistors ST1 and ST2 is used to select the string unit SU at the time of various operations.

In each NAND string NS, the memory cells MC0, . . . , and MCn−1 are connected in series. The drain of the select transistor ST1 is connected to an associated bit line BL. The source of the select transistor ST1 is connected to one end of the memory cells MC0, . . . , and MCn−1 connected in series. The drain of the select transistor ST2 is connected to the other end of the memory cells MC0, . . . , and MCn−1 connected in series. The source of the select transistor ST2 is connected to a source line SL.

In the same block BLK, the control gates of the memory cells MC0, MC1, MC2, MC3, . . . , MCn−2, and MCn−1 are respectively connected to word lines WL0, WL1, WL2, WL3, . . . , WLn−2, and WLn−1, commonly across the plurality of NAND strings. The gates of the select transistors ST1 in the string units SU0, SU1, SU2, SU3, and SU4 are respectively connected to select gate lines SGD0, SGD1, SGD2, SGD3, and SGD4, commonly across the plurality of NAND strings. The gates of the select transistors ST2 provided in the same block BLK are commonly connected to the select gate line SGS across the plurality of NAND strings.

In the configuration of the circuit of the memory cell array 31 described above, the bit line BL is shared by, for example, the NAND string NS to which the same column address CAd is assigned in each string unit SU. The source line SL is shared among, for example, the plurality of blocks BLK.

A set of a plurality of memory cells MC commonly connected to a word line WL in one string unit SU is referred to as, for example, a cell unit CU. The block BLK includes a plurality of cell units CU. The data stored in the cell unit CU including a plurality of memory cells MC each of which stores 1-bit data in accordance with a threshold voltage, corresponds to one page data. The cell unit CU may store two or more page data based on the number of bits of data stored in each memory cell MC. In the present embodiment, one memory cell MC can store 4-bit data. That is, the memory cell MC in the present embodiment is a quad level cell (QLC) that stores 4-bit data. In this case, the data stored in the cell unit CU corresponds to four page data.

The number of bits of data that can be stored in the memory cell MC may be any real number. For example, the memory cell MC may be a multi-level cell (MLC) that stores 2-bit data, a triple level cell (TLC) that stores 3-bit data, or a penta-level cell (PLC) that stores 5-bit data.

Note that, the circuit configuration of the memory cell array 31 is not limited to the above-described configuration. For example, the number of string units SU provided in each block BLK and the number of memory cells MC and select transistors ST1 and ST2 provided in each NAND string NS may be any number.

Threshold Voltage Distribution of Memory Cell

Figure 4:
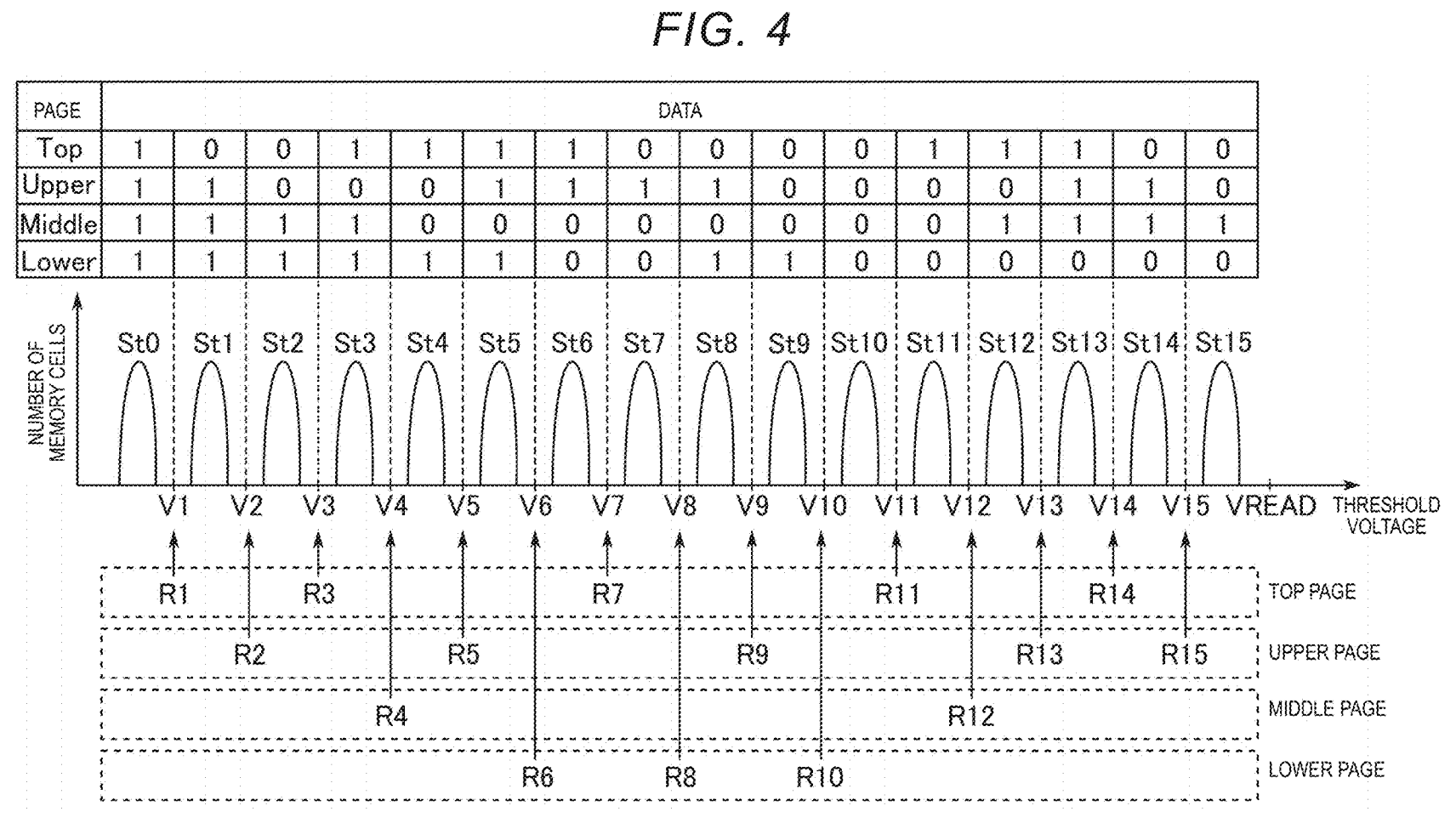

The threshold voltage distribution of the memory cells MC will be described with reference to FIG. 4. FIG. 4 is a diagram showing an example of a relationship between the threshold voltage distribution of the memory cell MC and data stored in the memory cell MC. The horizontal axis of FIG. 4 indicates the threshold voltage of the memory cell MC. The vertical axis of FIG. 4 indicates the number of memory cells MC.

As shown in FIG. 4, when the memory cell MC stores 4-bit data, the distribution of the threshold voltage is divided into 16 distributions. The 16 threshold voltage distributions are referred to as an "St0" state, an "St1" state, . . . , an "St14" state, and an "St15" state in order from the lowest threshold voltage.

Further, the voltages V1, V2, . . . , and V15 are voltages (hereinafter, referred to as "verify voltages") respectively used (e.g., applied to the gate of the memory cell MC via the selected word line WL) for verifying the "St1" state, the "St2" state, . . . , and the "St15" state during the write operation. A voltage VREAD is a voltage applied to the non-selected word lines WL during the read operation. When the voltage VREAD is applied to the gate of the memory cell MC, the memory cell MC is turned on regardless of the data stored therein. A relationship of these voltage values is V1<V2<V3<V4<V5<V6<V7<V8< V9<V10<V11<V12<V13<V14<V15<VREAD.

The "St0" state corresponds to an erased state of the memory cell MC. The "St1" state, the "St2" state, . . . , and the "St15" state correspond to a state in which charges are injected into the charge storage layer of the memory cell MC and data is stored therein. The threshold voltage of the memory cell MC in the "St0" state is lower than the voltage V1. The threshold voltage of the memory cell MC in the "St1" state to the "St14" state is equal to or higher than the voltage V1 to the voltage V14, respectively, and lower than the voltage V2 to the voltage V15, respectively. The threshold voltage of the memory cell MC in the "St15" state is equal to or higher than the voltage V15 and lower than the voltage VREAD.

A value of the verify voltage and a value of a read voltage, which are applied to the gate of the memory cell MC via the selected word line WL during the write operation and the read operation respectively, corresponding to each state may be the same or may be different. Hereinafter, in order to simplify the description, a case where the verify voltage and the read voltage have the same set value will be described.

Hereinafter, each of the read operations using the voltages V1, V2, . . . , and V15 is referred to as read operations R1, R2, . . . , and R15. The read operation R1 determines whether the threshold voltage of the memory cell MC is lower than the voltage V1. The read operation R2 determines whether the threshold voltage of the memory cell MC is lower than the voltage V2. The read operation R3 determines whether the threshold voltage of the memory cell MC is lower than the voltage V3. The same applies to the other read operations.

As described above, each memory cell MC can be in 16 different states by having a threshold voltage belonging to any of the 16 threshold voltage distributions. By assigning these states to data of "0000", . . . , and "1111" in binary notation, each memory cell MC can store 4-bit data. Hereinafter, 4-bit data is referred to as a lower bit, a middle bit, an upper bit, and a top bit in order from the lowest bit. In addition, a set of lower bits stored in the memory cell MC provided in the same cell unit CU is referred to as a lower page, a set of middle bits is referred to as a middle page, a set of upper bits is referred to as an upper page, and a set of top bits is referred to as a top page.

In the example of FIG. 4, data is assigned to the "lower bit/middle bit/upper bit/top bit" of the memory cell MC provided in each state as shown below.

"St0" state: "1111" data
"St1" state: "1110" data
"St2" state: "1100" data
"St3" state: "1101" data
"St4" state: "1001" data
"St5" state: "1011" data
"St6" state: "0011" data
"St7" state: "0010" data
"St8" state: "1010" data
"St9" state: "1000" data
"St10" state: "0000" data
"St11" state: "0001" data
"St12" state: "0101" data
"St13" state: "0111" data
"St14" state: "0110" data
"St15" state: "0100" data Data assigned to each state is not limited to this example.

When the data assigned in this way is read, the lower bit is determined by the read operations R6, R8, and R10. The middle bit is determined by the read operations R4 and R12. The upper bit is determined by the read operations R2, R5, R9, R13, and R15. The top bit is determined by the read operations R1, R3, R7, R11, and R14.

In the memory system 1 of the present embodiment, four page data is written to the NAND memory 30, which will be described later, by a first write operation (hereinafter, also referred to as an MLC program) of writing data of lower page and middle page, and a second write operation (hereinafter, also referred to as a fine program) of writing data of the lower page and the middle page, and data of the upper page and top page, after the first write operation.

During the second write operation, the lower page data and the middle page data used in the second write operation are prepared by data load from inside the NAND memory 30 or from outside the NAND memory 30.

A data load method of the lower/middle page data includes internal data load (IDL) and external data load (EDL).

The IDL is a method of loading (providing)the lower/middle page data used for the second write operation from the memory cell array 31 inside the NAND memory 30.

The EDL is a method of loading (providing)the lower/middle page data used for the second write operation from the outside of the NAND memory 30 (for example, the RAM 16 of the memory controller 10).

In the memory system 1 of the present embodiment, the data load method of the lower page data and the middle page data used for the second write operation is determined based on a certain index related to a reliability of the lower page data and the middle page data written to the NAND memory 30 by the first write operation.

For example, the reliability of data written to the memory cell array 31 of the NAND memory 30 changes depending on the period for which the data is stored in the memory cell array 31 or the operation status of the NAND memory 30 (for example, temperature and/or usage period).

(a-1-4) Write Management Circuit

Figure 5:
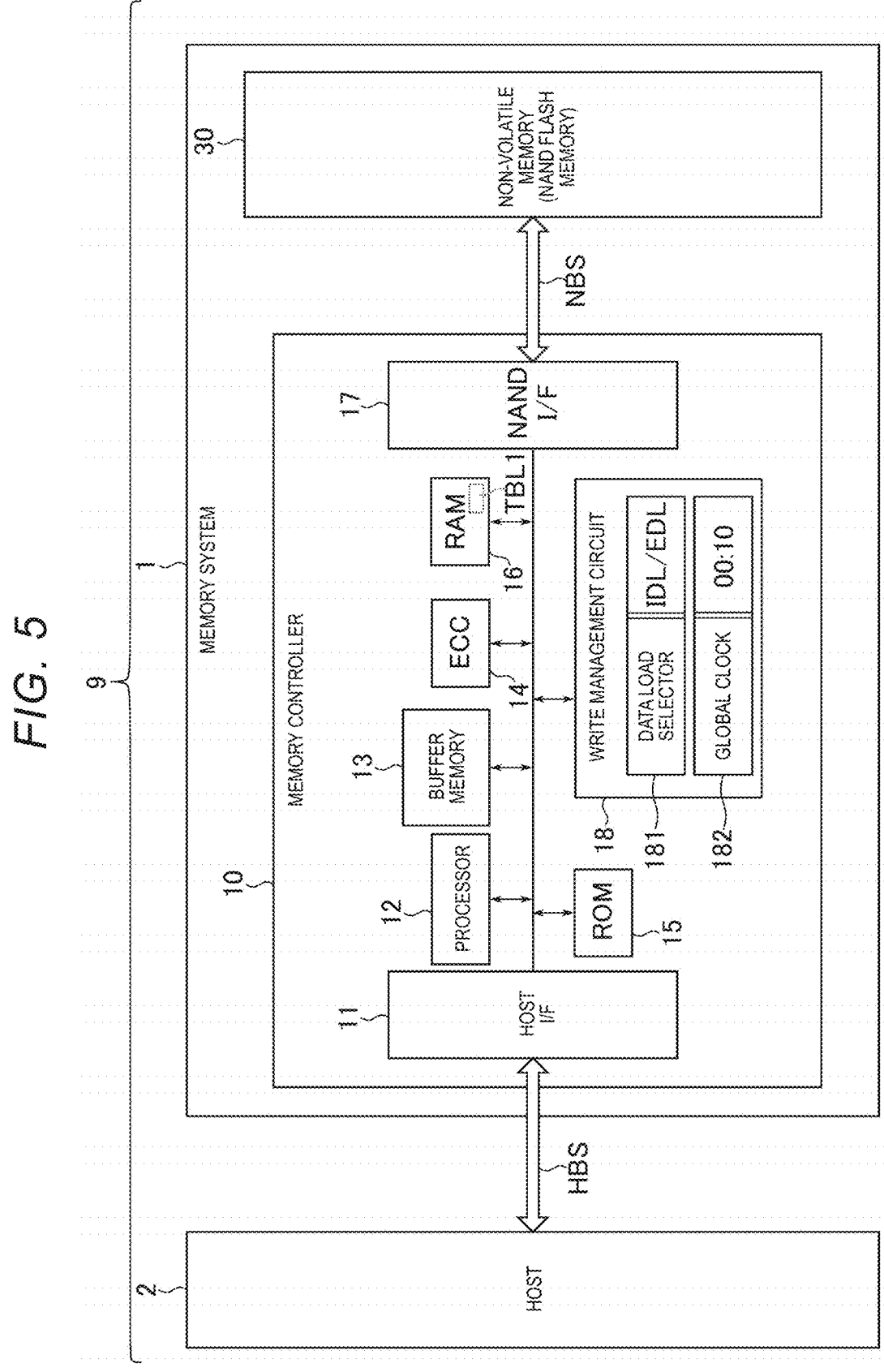
FIG. 5 is a block diagram showing a configuration example of a write management circuit in the memory system of the first embodiment.

FIG. 5 is a block diagram showing a configuration example of the write management circuit 18 of the memory controller 10 in the memory system 1 of the present embodiment.

As shown in FIG. 5, the write management circuit 18 includes a data load selector 181 and a global clock 182.

The data load selector 181 selects the data load method of any one of the IDL or the EDL based on a certain index related to the reliability of the lower page data and the middle page data written by the first write operation.

The global clock 182 is a timer. The global clock 182 starts measuring time, for example, from the first power-on of the memory system 1. The global clock 182 may temporarily stop measuring the time when the power to the memory system 1 is cut off. The time measured until the power is cut off may be stored in the NAND memory 30. When the power supply is restarted in the memory system 1 from the power-cutoff state, the global clock 182 may restart the measurement of the time. The global clock 182 may restart the measurement of the time from the time measured until the power is cut off.

In the write management circuit 18, the data load selector 181 records a completion time of the first write operation measured by the global clock 182 in a management table TBL1. The management table TBL1 is stored in, for example, the RAM 16. The management table TBL1 may be stored in a storage area (for example, a register) provided in the write management circuit 18.

FIG. 6 is a diagram illustrating the management table TBL1 in the memory system 1 of the present embodiment.

The management table TBL1 is a log table that records a corresponding value for each of an item of a word line number (word line address) which is a target of the first write operation, an item of the number of the string unit number which is a target of the first write operation, and an item of the completion time of the first write operation. For example, one management table TBL1 is prepared for one write destination block. This is because a plurality of write destination blocks may be used in parallel.

Hereinafter, the management table TBL1 is also referred to as an MLC program log table TBL1.

The data load selector 181 selects the data load method for the lower page data and the middle page data during the second write operation with reference to the MLC program log table TBL1. The data load selector 181 determines the data load method at the time of the second write operation, based on the current time indicated by the global clock 182 (that is, the time immediately before execution of the second write operation, or the time when the data load method is selected) and the completion time of the first write operation at the corresponding address of the MLC program log table TBL1.

For example, the data load selector 181 compares a difference value between the current time and the completion time of the first write operation with a threshold value for determining the data load method. When the difference value is greater than the threshold value, the data load selector 181 selects the EDL. Thereby, the EDL is used as the data load method for the lower/middle page data in the second write operation. When the difference value is equal to or less than the threshold value, the data load selector 181 selects the IDL. Thereby, the IDL is used as the data load method for the lower/middle page data in the second write operation.

(b) Operation

An operation example of the memory system 1 of the present embodiment will be described with reference to FIGS. 7 to 20.

(b-1) Overview of Write Operation

An overview of the write operation of the NAND memory 30 in the memory system 1 of the present embodiment will be described.

The write operation (write sequence) of the NAND memory 30 includes a program operation and a verify operation (also referred to as program verify). The threshold voltage of the memory cell MC is increased to a target level by repeating a combination of the program operation and the verify operation.

The program operation is an operation of increasing the threshold voltage of the memory cell MC by injecting electrons into the charge storage layer of the memory cell MC (or maintaining the threshold voltage by inhibiting the injection). Hereinafter, the operation of increasing the threshold voltage of the memory cell MC is referred to as "0" program. For example, the threshold voltage of the memory cell MC in the "St0" state is increased to be included in the "St1" state, and this is referred to as "0" program. A voltage (for example, a voltage VSS) for "0" program is applied from the sense amplifier module 39 to the bit line BL that is a "0" program target. Meanwhile, the operation of maintaining the threshold voltage of the memory cell MC is referred to as "1" program or write inhibition. A voltage (for example, a positive voltage) for "1" program is applied from the sense amplifier module 39 to the bit line BL that is a "1" program target.

The verify operation is an operation of determining whether the threshold voltage of the memory cell MC reaches the target level by reading data from the memory cell MC after the program operation. The memory cell MC, of which the threshold voltage reaches the target level, is set to be write-inhibited.

In the present embodiment, the above-described write operation is executed in two separate stages. Specifically, the write operation of the four page data corresponding to a certain cell unit CU is executed in two stages of the first write operation (MLC program) and the second write operation (fine program).

(b-1-1) First Write Operation

The first write operation (MLC program) of the memory system 1 of the present embodiment will be described with reference to FIG. 7.

Figure 7:
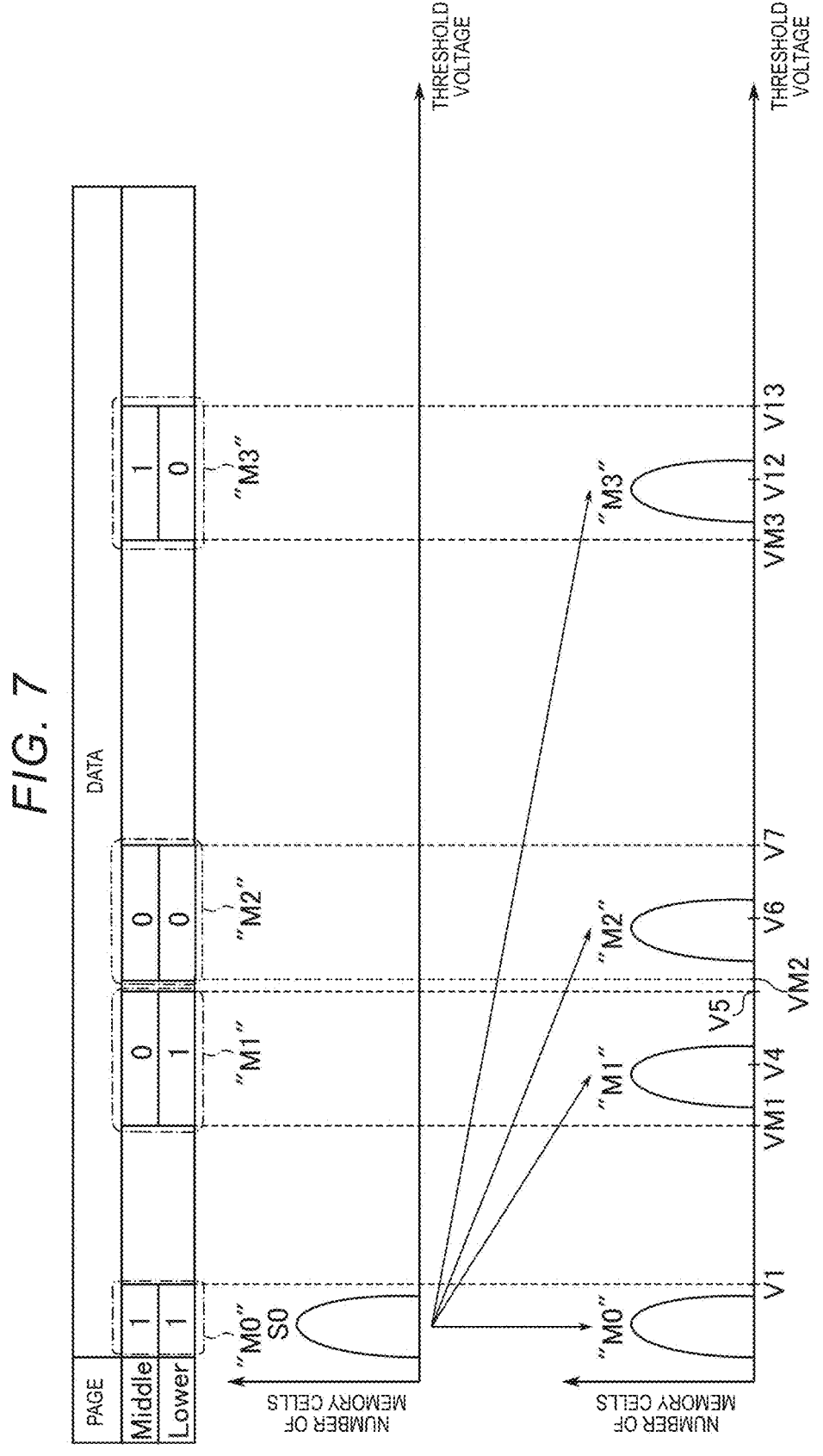
FIG. 7 is a diagram showing an operation example of a first write operation in the memory system of the first embodiment.

FIG. 7 is a diagram showing a change in the threshold voltage distribution of the memory cell MC due to the first write operation.

When the first write operation is executed, the threshold voltage of the memory cell MC increases based on the write data, and four threshold voltage distributions are formed.

As shown in FIG. 7, an "M0" state, an "M1" state, an "M2" state, and an "M3" state are formed by the first write operation. In the first write operation, for example, the threshold voltage distribution of the "M0" state is formed by a plurality of memory cells MC into which "11" data is written. Here, a notation of "kh" data means that the lower bit is "k" data and the middle bit is "h" data. The threshold voltage distribution of the "M1" state is formed by a plurality of memory cells MC into which "10" data is written. The threshold voltage distribution of the "M2" state is formed by a plurality of memory cells MC into which "00" data is written. The threshold voltage distribution of the "M3" state is formed by a plurality of memory cells MC into which "01" data is written.

The sequencer 36 uses voltages VM1, VM2, and VM3 as the verify voltages. The voltage VM1 is the verify voltage used when the "10" data is written. The voltage VM1 is equal to or higher than the voltage V1 and lower than the voltage V4. The voltage VM2 is the verify voltage used when the "00" data is written. The voltage VM2 is equal to or higher than the voltage V4 and lower than the voltage V6. The voltage VM3 is the verify voltage used when the "01" data is written. The voltage VM3 is equal to or higher than the voltage V6 and lower than the voltage V12.

The threshold voltage of the memory cell MC in the "M0" state is lower than the voltage V1. The threshold voltage of the memory cell MC in the "M1" state is equal to or higher than the voltage VM1 and lower than the voltage V5. The threshold voltage of the memory cell MC in the "M2" state is equal to or higher than the voltage VM2 and lower than the voltage V7. The threshold voltage of the memory cell MC in the "M3" state is equal to or higher than the voltage VM3 and lower than the voltage V13.

Hereinafter, the stage in which the first write operation is executed is referred to as an MLC stage. The memory cell MC on which the first write operation has been executed and the second write operation has not yet been executed is referred to as a memory cell MC in the MLC state.

(b-1-2) Second Write Operation

The second write operation (fine program) of the memory system 1 of the present embodiment will be described with reference to FIG. 8.

Figure 8:
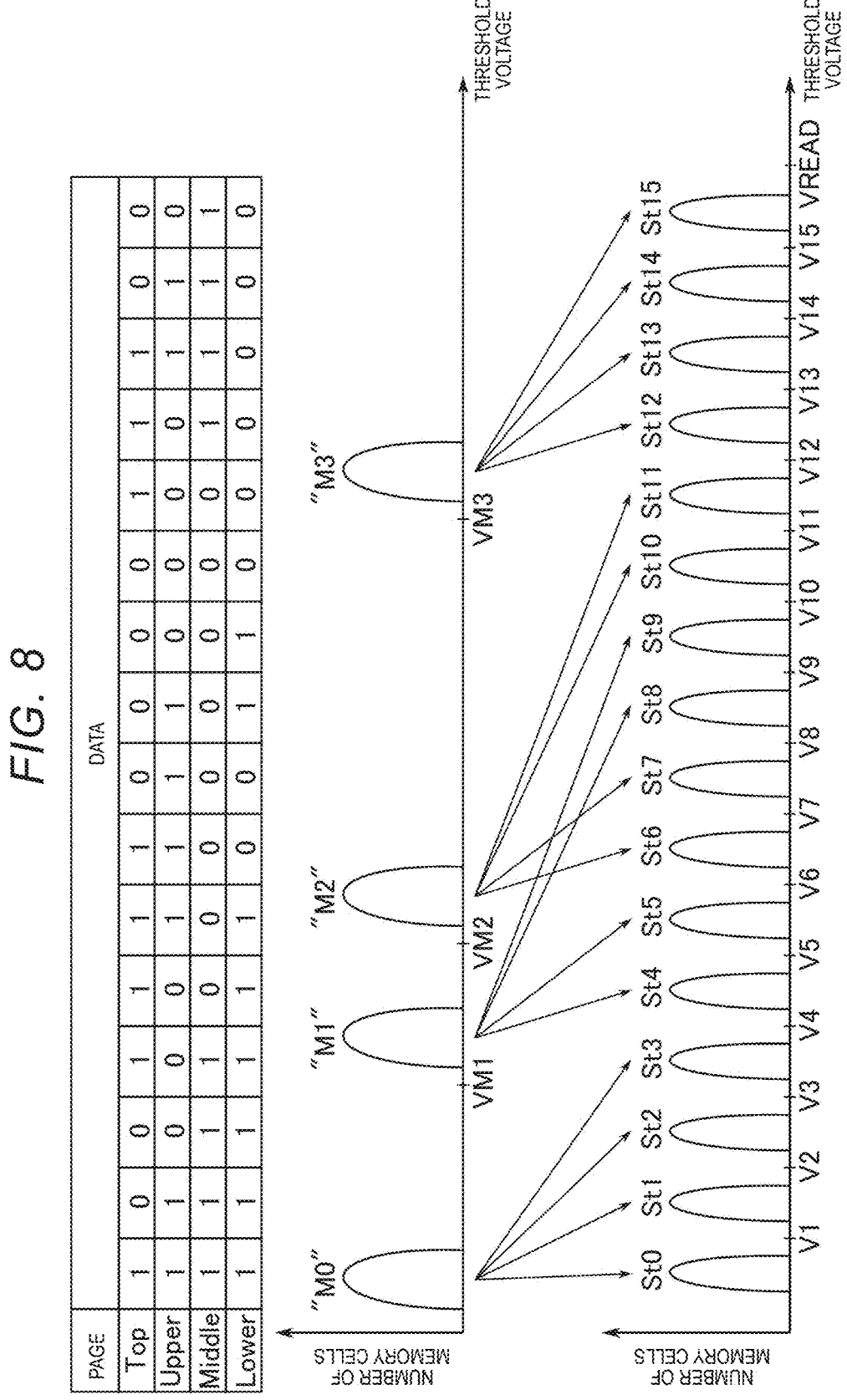
FIG. 8 is a diagram showing an operation example of a second write operation in the memory system of the first embodiment.

FIG. 8 is a diagram showing a change in the threshold voltage distribution of the memory cell MC due to the second write operation.

When the second write operation is executed, the threshold voltage of the memory cell MC is increased based on the write data, and 16 threshold voltage distributions are formed.

As shown in FIG. 8, in the second write operation, for example, the threshold voltage distributions of the "St0" state, the "St1" state, the "St2" state, and the "St3" state are formed from the threshold voltage distribution of the "M0" state. The threshold voltage distributions of the "St4" state, the "St5" state, the "St8" state, and the "St9" state are formed from the threshold voltage distribution of the "M1" state. The threshold voltage distributions of the "St6" state, the "St7" state, the "St10" state, and the "St11" state are formed from the threshold voltage distribution of the "M2" state. The threshold voltage distributions of the "St12" state, the "St13" state, the "St14" state, and the "St15" state are formed from the threshold voltage distribution of the "M3" state.

For example, when the threshold voltage distribution of the "M0" state is shifted to the threshold voltage distribution of the "St3" state, the data stored in the memory cell MC is changed from the data of the "M0" state ("11" data) to the data of the "St3" state ("1101" data).

For example, when the threshold voltage distribution of the "M1" state is shifted to the threshold voltage distribution of the "St4" state, the data stored in the memory cell MC is changed from the data of the "M1" state ("10" data) to the data of the "St4" state ("1001" data).

For example, when the threshold voltage distribution of the "M2" state is shifted to the threshold voltage distribution of the "St7" state, the data stored in the memory cell MC is changed from the data of the "M2" state ("00" data) to the data of the "St7" state ("0010" data).

For example, when the threshold voltage distribution of the "M3" state is shifted to the threshold voltage distribution of the "St14" state, the data stored in the memory cell MC is changed from the data of the "M3" state ("01" data) to the data of the "St14" state ("0110" data).

Hereinafter, the stage in which the second write operation is executed is referred to as a fine stage.

(b-1-3) Execution Order of Write Operation

FIG. 9 shows an example of a selection order of the word line WL and the string unit SU when data is written in a certain block BLK. A solid line quadrangular frame, which corresponds to an intersection between each word line WL and each string unit SU, indicates one cell unit CU. An upper stage separated by a dashed line of the quadrangular frame indicates the write operation of the MLC stage. A lower stage separated by the dashed line of the quadrangular frame indicates the write operation of the fine stage. The numerical values of the upper stage and the lower stage of the quadrangular frame represent an execution order (hereinafter, referred to as a "write order") of the MLC program and the fine program of the plurality of memory cells MC in each cell unit CU of the certain block BLK.

As shown in FIG. 9, as first to fifth operations, the sequencer 36 executes the first write operation of selecting the word line WL0 and sequentially selecting the string units SU0 to SU4.

As a sixth operation, the sequencer 36 executes the first write operation of selecting the string unit SU0 and selecting the word line WL1. As a seventh operation, the sequencer 36 executes the second write operation of selecting the string unit SU0 and selecting the word line WL0.

As eighth to fifteenth operations, the sequencer 36 alternately executes the first write operation of selecting the word line WL1 and the second write operation of selecting the word line WL0 in the same procedure as the sixth and seventh operations with sequentially selecting the string units SU1, . . . , and SU4.

As sixteenth to twenty-fifth operations, the sequencer 36 alternately executes the first write operation of selecting the word line WL2 and the second write operation of selecting the word line WL1 with sequentially selecting the string units SU0, . . . , and SU4 in the same manner as the sixth to fifteenth operations.

Thereafter, in the same manner, as (26+10p)th to (35+10p)th operations, the sequencer 36 alternately executes the first write operation of selecting the word line WL(3+p) and the second write operation of selecting the word line WL(2+p) with sequentially selecting the string units SU0, . . . , and SU4. Here, p is an integer of 0 or larger.

In the above order, the first write operation and the second write operation are sequentially executed on the cell unit CU designated by a data write target address (hereinafter, also referred to as a selected address).

Note that the NAND memory 30 executes the second write operation for a cell unit CU designated by the selected address without executing the erase operation for the block BLK that includes the cell unit CU between the first write operation (MLC program) and the second write operation (fine program) executed to the cell unit CU.

(b-2) Data Load Method

The data load method in the write operation will be described with reference to FIGS. 10 to 12.

As described above, in the second write operation (fine program), the lower page data and the middle page data are prepared inside the NAND memory 30 by the IDL or are prepared outside the NAND memory 30 by the EDL.

(b-2-1) IDL

The IDL when the fine program is performed in the memory system 1 of the present embodiment will be described with reference to FIG. 10.

Figure 10:
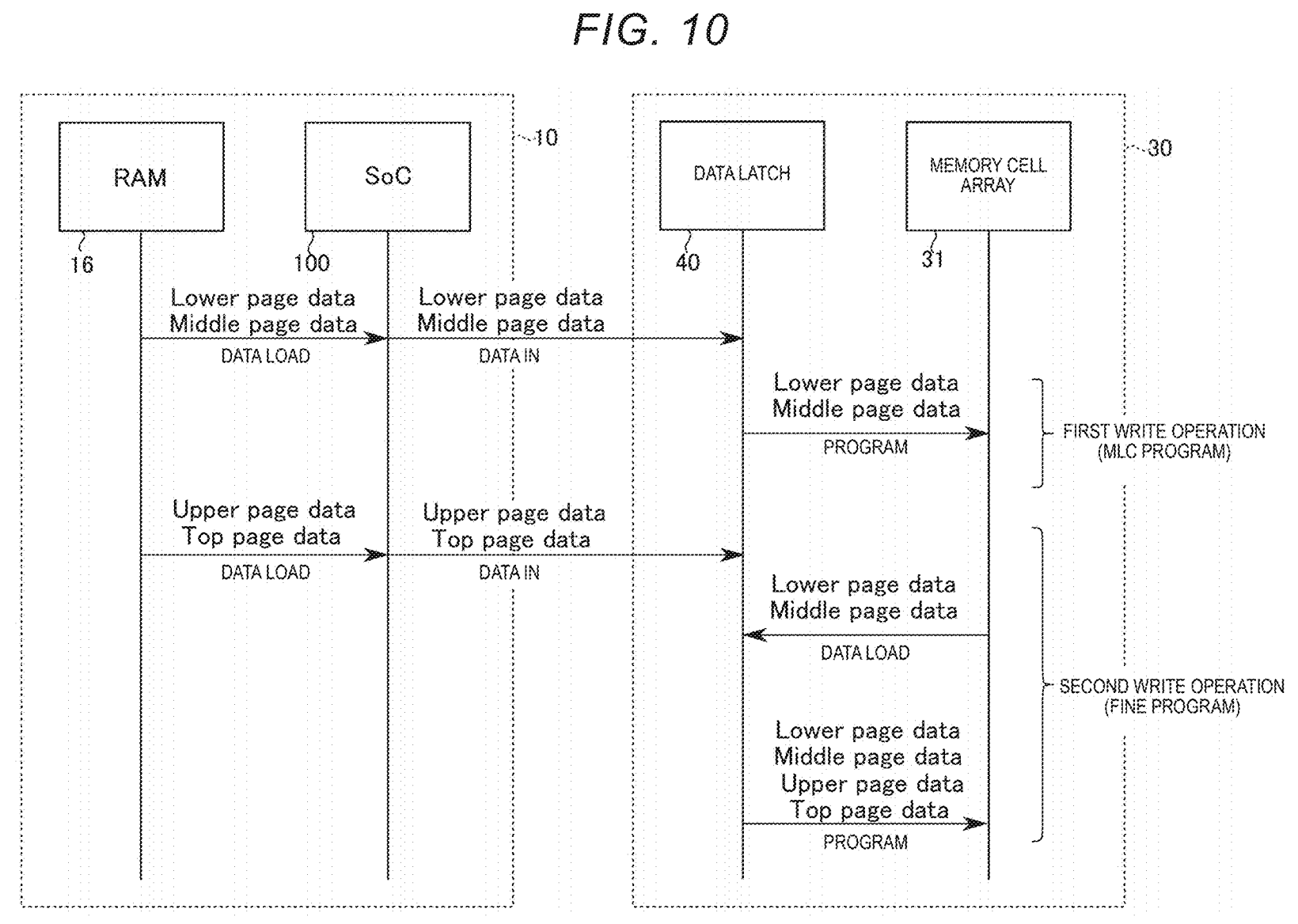

FIG. 10 is a sequence diagram illustrating the IDL in the fine program.

As shown in FIG. 10, the memory system 1 of the embodiment executes the MLC program (first write operation) before executing the fine program (second write operation).

In the MLC program, the SoC 100 of the memory controller 10 loads the lower page data and the middle page data from the RAM 16. The RAM 16 stores the lower page data and the middle page data received from the host 2.

The SoC 100 sends the lower page data and the middle page data loaded from the RAM 16 to the NAND memory 30 together with a command and an address for the MLC program. Thereby, the sense amplifier module 39 of the NAND memory 30 receives the lower page data and the middle page data via the data latch 40 (referred to as data in).

The NAND memory 30 programs the lower page data and the middle page data in the sense amplifier module 39 into the cell unit CU designated by the address received from the NAND interface circuit 17. Thereby, the memory cell array 31 stores two pages of data of the lower/middle page data.

The MLC program is completed as described above, in the memory system 1 of the present embodiment.

The memory system 1 of the embodiment executes the fine program on the cell unit CU designated by the address at which the MLC program is executed.

The SoC 100 loads the upper page data and the top page data from the RAM 16. The RAM 16 stores the upper page data and the top page data received from the host 2.

When the fine program is performed using the IDL, the SoC 100 sends the upper page data and the top page data loaded from the RAM 16 to the NAND memory 30 together with a command and the address, without transferring the lower/middle page data to the NAND memory 30. Thereby, the sense amplifier module 39 receives the upper page data and the top page data.

When the fine program using the IDL is executed, the lower/middle page data is loaded from the memory cell array 31 into the sense amplifier module 39 inside the NAND memory 30.

Thereby, the sense amplifier module 39 stores the upper/top page data from the SoC 100 and the lower/middle page data from the memory cell array 31.

The NAND memory 30 programs the lower page data, the middle page data, the upper page data, and the top page data in the sense amplifier module 39 into the cell unit CU designated by the address received from the NAND interface circuit 17. Thereby, the memory cell array 31 stores four page data of the lower/middle/upper/top page data.

As described with reference to FIG. 10, the IDL prepares the lower page data and the middle page data used for the fine program by reading the lower page data and the middle page data from the memory cell array 31 and loading them into the sense amplifier module 39 inside the NAND memory 30.

(b-2-2) EDL

The EDL when the fine program is performed in the memory system 1 of the present embodiment will be described with reference to FIGS. 11 and 12.

The EDL used for the fine program prepares the lower/middle page data from the RAM 16. The EDL may further include the ECC processing for the lower/middle page data.

Figure 11:
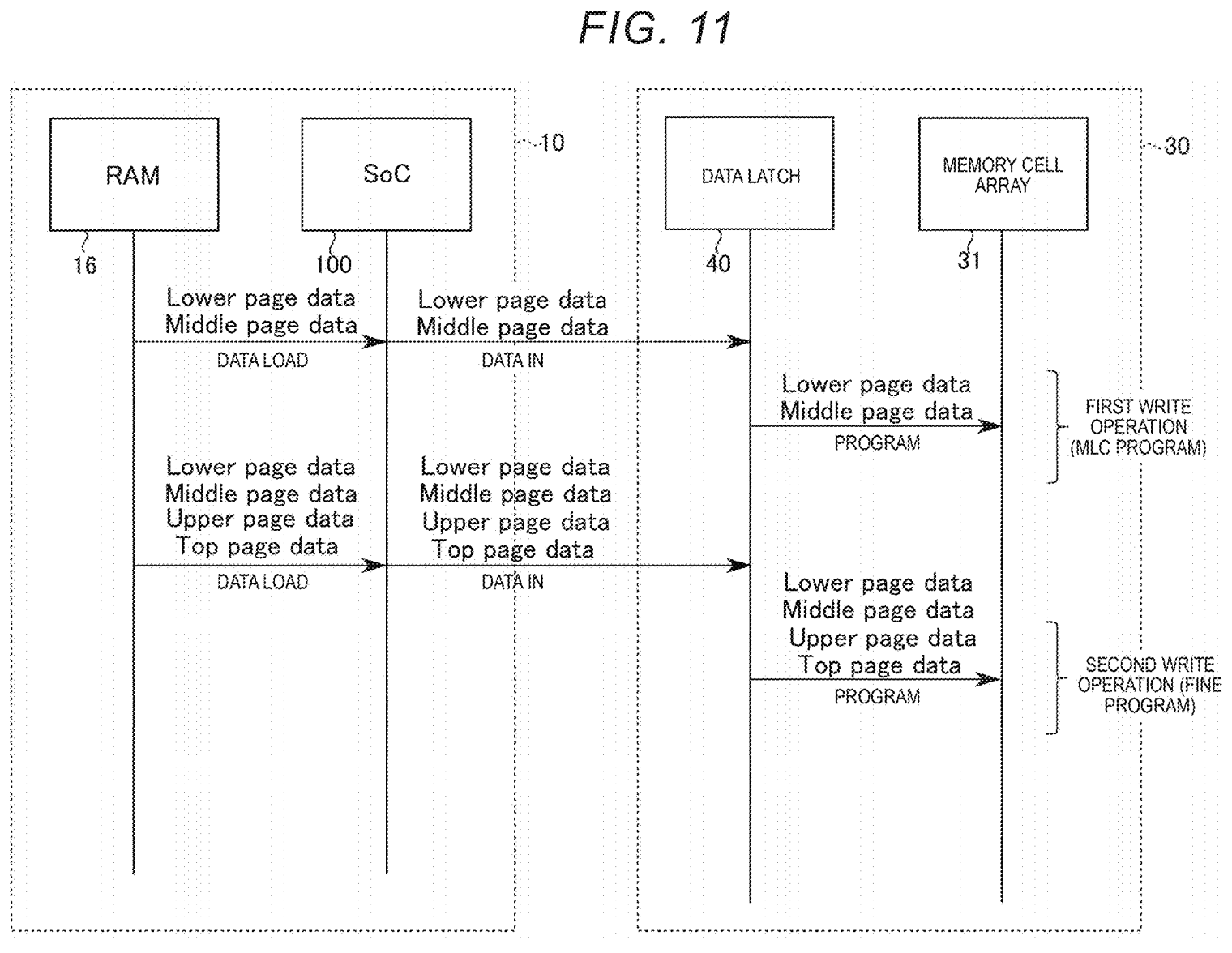

As shown in FIG. 11, the lower page data and the middle page data are programmed into the memory cell array 31 by the MLC program in the same manner as in the example of FIG. 10.

When the fine program is executed, the SoC 100 loads, from the RAM 16, the upper/top page data provided from the host 2.

As described above, the EDL prepares the lower page data and the middle page data outside the NAND memory 30.

In the example of FIG. 11, the RAM 16 stores the lower/middle page data provided from the host 2. The lower/middle page data is the same as the lower/middle page data stored in the cell unit CU designated by the selected address at which the fine program is to be executed. The NAND interface circuit 17 loads the lower/middle page data from the RAM 16.

The SoC 100 sends the lower/middle/upper/top page data loaded from the RAM 16 to the NAND memory 30 together with a command and the address. Thereby, the sense amplifier module 39 receives the lower/middle/upper/top page data.

The NAND memory 30 programs the lower/middle/upper/top page data in the sense amplifier module 39 into the cell unit CU designated by the address received from the NAND interface circuit 17. Thereby, the memory cell array 31 stores four page data of the lower/middle/upper/top page data.

Figure 12:
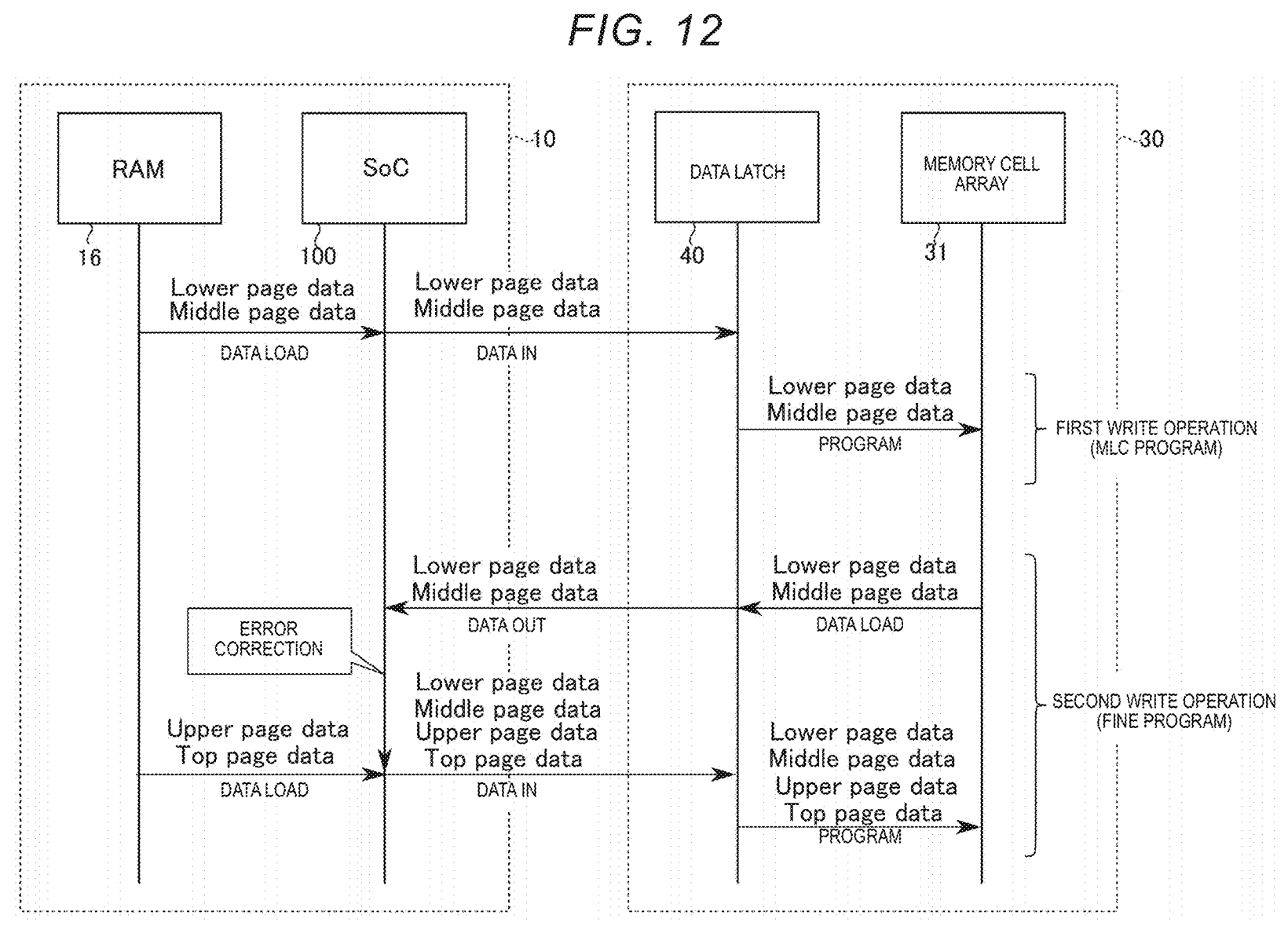

FIG. 12 shows a data load method of the EDL different from the example of FIG. 11.

As shown in FIG. 12, the lower page data and the middle page data are programmed into the memory cell array 31 by the MLC program in the same manner as in the example of FIGS. 10 and 11.

In the example of FIG. 12, when the execution of the fine program is requested, the memory controller 10 (SoC 100) reads the lower page data and the middle page data from the cell unit CU designated by the corresponding address of the NAND memory 30. The ECC circuit 14 of the SoC 100 executes the ECC processing on the lower page data and the middle page data. Thereby, the ECC-processed lower page data and middle page data are generated.

The SoC 100 sends the ECC-processed lower/middle page data to the NAND memory 30. The sense amplifier module 39 receives the ECC-processed lower/middle page data. The ECC-processed lower/middle page data may be stored in the RAM 16 before being sent to the sense amplifier module 39.

The SoC 100 loads the upper/top page data from the RAM 16. The SoC 100 sends the upper/top page data to the NAND memory 30 together with the command and the address. The sense amplifier module 39 receives the upper/top page data.

The NAND memory 30 programs the lower/middle/upper/top page data in the sense amplifier module 39 into the cell unit CU designated by the address received from the NAND interface circuit 17. Thereby, the memory cell array 31 stores four page data of the lower/middle/upper/top page data.

The fine program using the EDL of any one of FIG. 11 or 12 may be applied to the memory system 1. For example, when the RAM 16 has a large storage capacity, the memory system I executes the fine program of the example in FIG. 11. The memory system 1 may be configured such that the method of the fine program to be executed may be switched to any one of the example of FIG. 11 and the example of FIG. 12 depending on the request from the host 2 or the operation status of the memory system 1.

As described with reference to FIGS. 11 and 12, the EDL prepares the lower page data and the middle page data used for the fine program outside the NAND memory 30.

(b-3) Command Sequence

A command sequence of the memory system 1 of the present embodiment will be described with reference to FIGS. 13 to 15B.

(b-3-1) Command Sequence of First Write Operation

Figure 13:
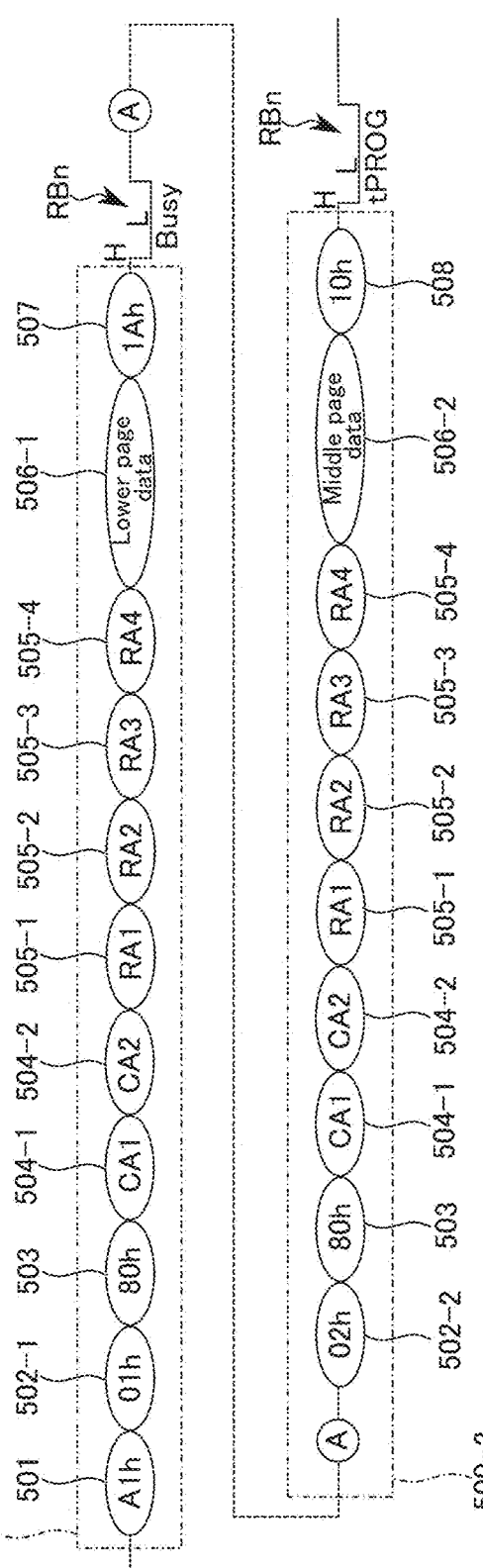
FIG. 13 is a sequence diagram showing an example of a command sequence of the first write operation in the memory system of the first embodiment.

FIG. 13 is a diagram showing the command sequence of the first write operation (MLC program) in the memory system 1 of the present embodiment.

As shown in FIG. 13, when the memory controller 10 instructs the NAND memory 30 to execute the MLC program, the memory controller 10 sends a plurality of command sets 500 (500-1, 500-2) to the NAND memory 30 in the stage (MLC stage) of executing the MLC program.

The memory controller 10 sends the command set 500-1 to the NAND memory 30. The command set 500-1 is a signal group related to the writing of the lower page data.

The command set 500-1 includes commands 501, 502-1, 503, and 507, addresses 504 (504-1 and 504-2) and 505 (505-1, 505-2, 505-3, and 505-4), and write data 506-1.

The commands 501, 502-1, and 503 include command codes "A1h", "01h", and "80h", respectively. The NAND memory 30 receives the commands 501, 502-1, and 503. The command 501 of the command code "A1h" is a prefix command to be added when the command for the write operation in the MLC stage (or the read operation from the memory cell MC in the MLC state) is given. The command 502-1 of the command code "01h" is a command for instructing the NAND memory 30 to perform an operation corresponding to data on the first page (lower page). The command 503 of the command code "80h" is a command indicating start of input of the write target address.

After the transmission of the command 503 of the command code "80h", the memory controller 10 sends the addresses 504 and 505 to the NAND memory 30. The address 504 includes the addresses 504-1 and 504-2. The address 505 includes the addresses 505-1, 505-2, 505-3, and 505-4. The NAND memory 30 receives the addresses 504 and 505. The addresses 504-1 and 504-2 are column addresses. The addresses 505-1, 505-2, 505-3, and 505-4 are row addresses. The column address 504 is transmitted in two cycles. The row address 505 is transmitted in four cycles. The number of cycles for transmitting each address is appropriately changed according to the size of the memory cell array 31 (for example, the number of blocks BLK, the number of word lines WL).

After the transmission of the addresses 504 and 505, the memory controller 10 sends lower page data 506-1 to the NAND memory 30 as the write data. The NAND memory 30 receives the lower page data 506-1.

After the transmission of the lower page data 506-1, the memory controller 10 sends the command 507 of the command code "1Ah" to the NAND memory 30. The NAND memory 30 receives the command 507. The command 507 of the command code "1Ah" is a command for transferring data from the data latch 40 in the NAND memory 30 to the sense amplifier module 39.

After the NAND memory 30 receives the command 507 of the command code "1Ah", the NAND memory 30 enters the busy state. Accordingly, the NAND memory 30 changes the signal level of the ready/busy signal RBn from the "H" level to the "L" level.

During a period in which the signal level of the ready/busy signal RBn is the "L" level, the lower page data 506-1 is transferred from the data latch 40 to the sense amplifier module 39.

After the sense amplifier module 39 stores the lower page data 506-1, the NAND memory 30 enters the ready state. Accordingly, the NAND memory 30 changes the signal level of the ready/busy signal RBn from the "L" level to the "H" level.

The memory controller 10 sends the command set 500-2 to the NAND memory 30 in the ready state after the signal level of the ready/busy signal RBn is changed from the "L" level to the "H" level. The command set 500-2 is a signal group related to the writing of the middle page data.

The command set 500-2 includes commands 502-2, 503, and 508, addresses 504 and 505, and write data 506-2.

The commands 502-2 and 503 include command codes "02h" and "80h", respectively. The NAND memory 30 receives the commands 502-2 and 503. The command 502-2 of the command code "02h" is a command for instructing the NAND memory 30 to perform an operation corresponding to data of the second page (middle page).

After the transmission of the command 503 of the command code "80h", the memory controller 10 sends the addresses 504 and 505 to the NAND memory 30. The NAND memory 30 receives the addresses 504 and 505. Values of the addresses 504 and 505 provided in the command set 500-2 are the same as the values of the addresses 504 and 505 provided in the command set 500-1.

After the transmission of the addresses 504 and 505, the memory controller 10 sends middle page data 506-2 to the NAND memory 30 as the write data. The NAND memory 30 receives the middle page data 506-2.

After the transmission of the middle page data 506-2, the memory controller 10 sends the command 508 of the command code "10h" to the NAND memory 30. The NAND memory 30 receives the command 508. The command 508 of the command code "10h" is a command for executing the program operation.

The NAND memory 30 executes the writing (MLC program) of the lower/middle page data in the sense amplifier module 39 based on the reception of the command 508 of the command code "10h". The NAND memory 30 enters the busy state during the execution of the MLC program. The NAND memory 30 changes the signal level of the ready/busy signal RBn from the "H" level to the "L" level during a period tPROG in which the MLC program is executed.

In the period tPROG in which the signal level of the ready/busy signal RBn is the "L" level, two pages of data are written to the cell unit CU designated by the write target address in the memory cell array 31.

The NAND memory 30 enters the ready state when the MLC program is completed. Accordingly, the NAND memory 30 changes the signal level of the ready/busy signal RBn from the "L" level to the "H" level.

As described above, the memory system 1 of the present embodiment can execute the MLC program based on the command sequence of FIG. 13.

(b-3-2) Command Sequence of Second Write Operation

Figure 14:
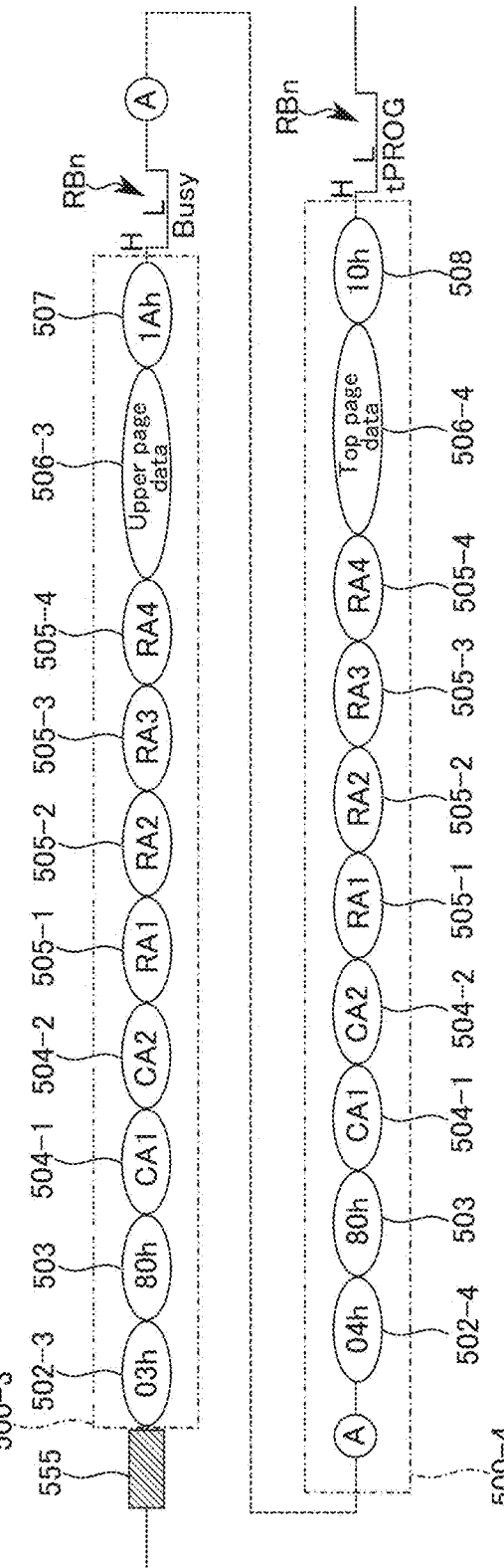
FIG. 14 is a sequence diagram showing an example of a command sequence of the second write operation in the memory system of the first embodiment.
Figure 15A:
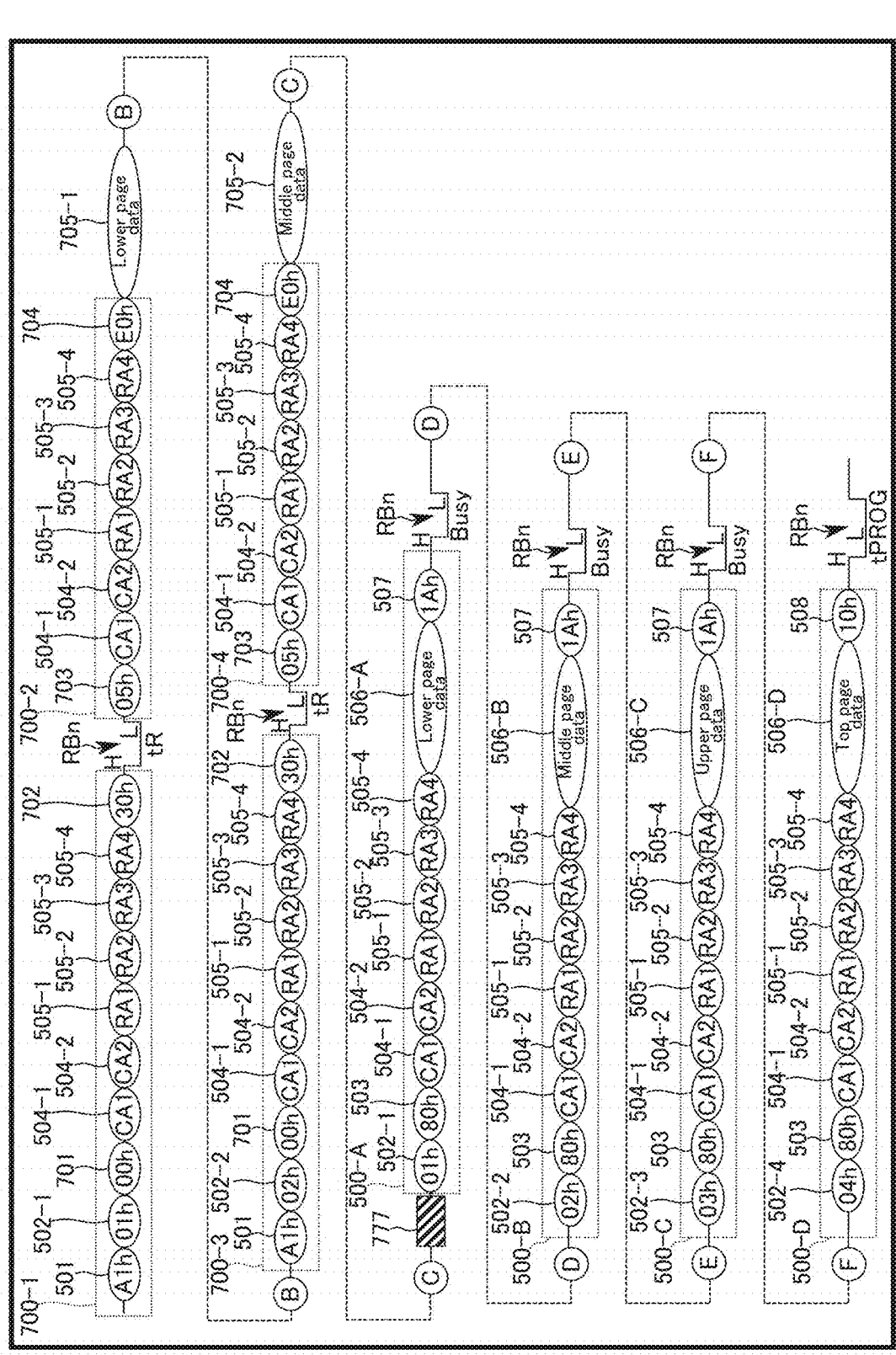
FIG. 15A is a sequence diagram showing another example of the command sequence of the second write operation in the memory system of the first embodiment.
Figure 15B:
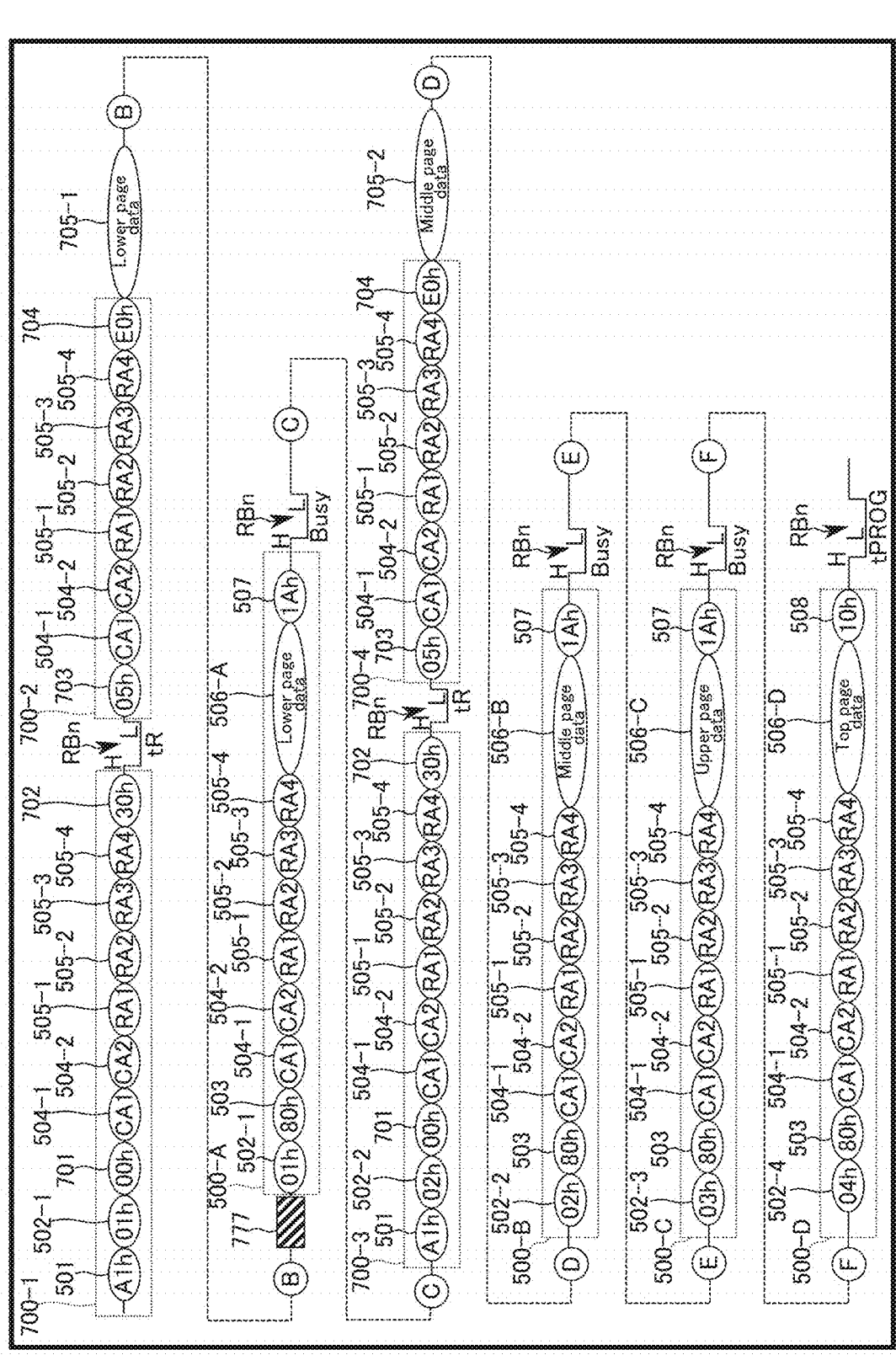
FIG. 15B is a sequence diagram showing still another example of the command sequence of the second write operation in the memory system of the first embodiment.

When the writing of the upper/top page data is requested with respect to an address at which the lower/middle page data is stored, the second write operation (fine program) is executed on the address based on the command sequence in FIG. 14, or FIG. 15A or 15B.

(b-3-2-1) Command Sequence of Second Write Operation Using IDL

FIG. 14 is a diagram showing the command sequence of the fine program using the IDL in the memory system 1 of the present embodiment.

When the writing of data is to be executed to an address on which the MLC program has been executed by the command sequence in FIG. 13, the memory system 1 of the present embodiment executes the fine program on the address.

As shown in FIG. 14, when the memory controller 10 instructs the NAND memory 30 to execute the fine program using the IDL, the memory controller 10 sends a plurality of command sets 500 (500-3, 500-4) for executing the fine program to the NAND memory 30 in the stage (fine stage) of executing the fine program.

In the present embodiment, the memory controller 10 sends a signal 555 to the NAND memory 30 for notification of the selection of the IDL in the fine program. The NAND memory 30 receives the signal 555. The signal 555 is a flag or a prefix command indicating that the data load method used for the fine program is the IDL. The signal 555 is a signal of 1 bit or more.

After the transmission of the signal 555, the memory controller 10 sends the command set 500-3 to the NAND memory 30. The command set 500-3 is a signal group related to the writing of the upper page data.

The command set 500-3 includes commands 502-3, 503, and 507, addresses 504 (504-1 and 504-2) and 505 (505-1, 505-2, 505-3, and 505-4), and write data 506-3.

The commands 502-3 and 503 include command codes "03h" and "80h", respectively. The NAND memory 30 receives the commands 502-3 and 503. The command 502-3 of the command code "03h" is a command for instructing the NAND memory 30 to perform an operation corresponding to data of the third page (upper page).

After the transmission of the command 503 of the command code "80h", the memory controller 10 sends the addresses 504 and 505 to the NAND memory 30. The NAND memory 30 receives the addresses 504 and 505. For example, values of the addresses 504 and 505 provided in the command set 500-3 are the same as the values of the addresses 504 and 505 provided in the command sets 500-1 and 500-2 used for the MLC program.

After the transmission of the addresses 504 and 505, the memory controller 10 sends the upper page data 506-3 to the NAND memory 30 as the write data. The NAND memory 30 receives the upper page data 506-3.

After the transmission of the upper page data 506-3, the memory controller 10 sends the command 507 of the command code "1Ah" to the NAND memory 30. The NAND memory 30 receives the command 507.

After the NAND memory 30 receives the command 507 of the command code "1Ah", the NAND memory 30 enters the busy state.

During the period in which the signal level of the ready/busy signal RBn is the "L" level, the upper page data 506-3 is transferred from the data latch 40 in the NAND memory 30 to the sense amplifier module 39.

After the sense amplifier module 39 stores the upper page data 506-3, the NAND memory 30 enters the ready state.

The memory controller 10 sends the command set 500-4 to the NAND memory 30 in the ready state after the signal level of the ready/busy signal RBn is changed from the "L" level to the "H" level. The command set 500-4 is a signal group related to the writing of the top page data.

The command set 500-4 includes commands 502-4, 503, and 508, addresses 504 and 505, and write data 506-4.

The commands 502-4 and 503 include command codes "04h" and "80h", respectively. The NAND memory 30 receives the commands 502-4 and 503. The command 502-4 of the command code "04h" is a command for instructing the NAND memory 30 to perform an operation corresponding to the data of the fourth page (top page).

After the transmission of the command 503 of the command code "80h", the memory controller 10 sends the addresses 504 and 505 to the NAND memory 30. The NAND memory 30 receives the addresses 504 and 504. Values of the addresses 504 and 505 provided in the command set 500-4 are the same as the values of the addresses 504 and 505 provided in the command sets 500-1, 500-2, and 500-3.

After the transmission of the addresses 504 and 505, the memory controller 10 sends the top page data 506-4 to the NAND memory 30 as the write data. The NAND memory 30 receives the top page data 506-4.

After the transmission of the top page data 506-4, the memory controller 10 sends the command 508 of the command code "10h" to the NAND memory 30. The NAND memory 30 receives the command 508.

For example, in the fine stage using the IDL, the lower/middle page data is loaded from the memory cell array 31 to the sense amplifier module 39 at a timing after the transfer of the command sets 500-3 and 500-4 related to the upper/top page data.

The NAND memory 30 executes the writing of the lower/middle/upper/top page data in the sense amplifier module 39 (fine program) based on the reception of the command 508 of the command code "10h". The NAND memory 30 enters the busy state based on the reception of the command 508 of the command code "10 h".

In the period tPROG in which the signal level of the ready/busy signal RBn is the "L" level, four pages of data are written to the cell unit CU designated by the write target address of the memory cell array 31.

The NAND memory 30 enters the ready state when the fine program is completed.

The fine program using the IDL is completed as described above, in the memory system 1 of the present embodiment.

As described above, the memory system 1 of the present embodiment can execute the fine program using the IDL based on the command sequence in FIG. 14.

(b-3-2-2) Command Sequence of Second Write
Operation Using EDL

FIG. 15A is a diagram showing the command sequence of the fine program using the EDL in the memory system 1 of the present embodiment.

In a case where the lower/middle page data prepared by the EDL is generated through the ECC processing (see FIG. 12), the memory system 1 executes the reading of the lower/middle page data from the NAND memory 30.

As shown in FIG. 15A, in the fine stage using the EDL, the memory controller 10 sends, to the NAND memory 30, a plurality of command sets 700 (700-1, 700-2, 700-3, 700-4) for reading the lower/middle page data from the NAND memory 30.

The memory controller 10 sends the command set 700-1 to the NAND memory 30. The command set 700-1 is a signal group related to the reading of the lower page data from the memory cell array 31 to the sense amplifier module 39.

The command set 700-1 includes commands 501, 502-1, 701, and 702, and addresses 504 and 505.

The commands 501, 502-1, and 701 include command codes "A1h", "01h", and "00h", respectively. The NAND memory 30 receives the commands 501, 502-1, and 701. The command 701 of the command code "00h" is a command indicating start of input of a read target address.

After the transmission of the command 701 of the command code "00h", the memory controller 10 sends the read target addresses 504 and 505 of the lower page data to the NAND memory 30. The NAND memory 30 receives the addresses 504 and 505.

After the transmission of the addresses 504 and 505, the memory controller 10 sends the command 702 of the command code "30h" to the NAND memory 30. The NAND memory 30 receives the command 702. The command 702 of the command code "30h" is a command for instructing the NAND memory 30 to output data of the read target address from the memory cell array 31 to the data latch 40 (sense amplifier module 39).

After the NAND memory 30 receives the command 702 of the command code "30h", the NAND memory 30 enters the busy state. The NAND memory 30 reads the lower page data from the cell units CU indicated by the addresses 504 and 505 to the sense amplifier module 39 in a period tR.

The NAND memory 30 enters the ready state after the sense amplifier module 39 stores the lower page data.

The memory controller 10 sends the command set 700-2 to the NAND memory 30, after the signal level of the ready/busy signal RBn is changed from the "L" level to the "H" level. The command set 700-2 is a signal group related to transfer of data from the NAND memory 30 to the memory controller 10.

The command set 700-2 includes commands 703 and 704 and addresses 504 and 505.

The memory controller 10 sends command 703 of the command code "05h" to the NAND memory 30. The command 703 of the command code "05h" is a command for instructing the NAND memory 30 to perform an operation (cache reading) of outputting data starting from the designated column address 504 from the data latch 40 to the memory controller 10.

After the transmission of the command 703 of the command code "05h", the memory controller 10 sends the addresses 504 and 505 to the NAND memory 30. Values of the addresses 504 and 505 of the command set 700-2 are the same as the values of the addresses 504 and 505 of the command set 700-1.

After the transmission of the addresses 504 and 505, the memory controller 10 sends the command 704 of the command code "E0h" to the NAND memory 30. The command 704 of the command code "E0h" is a command for instructing the NAND memory 30 to output data to the memory controller 10.

The NAND memory 30 sequentially receives the command 703, the addresses 504 and 505, and the command 704. The NAND memory 30 sends lower page data 705-1 in the sense amplifier module 39 to the memory controller 10 via the data latch 40 based on the commands 703 and 704 of the command codes "05h" and "E0h". The memory controller 10 receives the lower page data 705-1.

After receiving the read lower page data 705-1, the memory controller 10 sends the command set 700-3 to the NAND memory 30. The command set 700-3 is a signal group related to the reading of the middle page data from the memory cell array 31 to the sense amplifier module 39.

The command set 700-3 includes commands 501, 502-2, 701, and 702, and addresses 504 and 505.

In the same manner as the reading of the lower page data according to the command set 700-1, after the sense amplifier module 39 stores the middle page data according to the command set 700-3, the NAND memory 30 enters the ready state.

The memory controller 10 sends the command set 700-4 to the NAND memory 30, after the signal level of the ready/busy signal RBn is changed to the "H" level. The command set 700-4 includes commands 703 and 704 and addresses 504 and 505.

In the same manner as the reading of the lower page data according to the command set 700-2, the NAND memory 30 sends middle page data 705-2 to the memory controller 10 according to the command set 700-4. The memory controller 10 receives the middle page data 705-2.

The memory controller 10 executes the ECC processing for each of the received lower page data 705-1 and middle page data 705-2.

By executing the ECC processing, the ECC-processed lower page data and middle page data are generated.

After the ECC processing, the memory controller 10 executes the writing of the lower/middle/upper/top page data (fine program).

For example, in the present embodiment, the memory controller 10 sends a signal 777 to the NAND memory 30 for notification of the selection of the EDL in the fine program. The NAND memory 30 receives the signal 777. The signal 777 is a flag or a prefix command indicating that the data load method used for the fine program is the EDL. The signal 777 is a signal of 1 bit or more.

Thereby, in the present embodiment, the memory controller 10 can notify the NAND memory 30 of the execution of the fine program using the EDL.

After the transmission of the signal 777, the memory controller 10 sends a command set 500-A related to the lower page data to the NAND memory 30. The command set 500-A basically includes the same commands, addresses, and write data as the command set 500-1 described with reference to FIG. 13, but does not include the command 501 of the command code "A1h". In addition, write data 506-A provided in the command set 500-A is the lower page data after the ECC processing. Note that the signal 777 may be a signal (command) provided in the command set 500-A. The NAND memory 30 receives the command set 500-A.

The NAND memory 30 stores the lower page data 506-A after the ECC processing in the sense amplifier module 39 after the reception of the command 507 of the command code "1Ah" provided in the command set 500-A, in the same manner as the operation described with reference to FIG. 13.

The memory controller 10 sends a command set 500-B related to the middle page data to the NAND memory 30, after the signal level of the ready/busy signal RBn is changed from the "L" level to the "H" level. The command set 500-B includes the same commands, addresses, and write data as the command set 500-2 described with reference to FIG. 13. Write data 506-B provided in the command set 500-B is the middle page data after the ECC processing. The NAND memory 30 receives the command set 500-B.

The NAND memory 30 stores the middle page data 506-B after the ECC processing in the sense amplifier module 39 after the reception of the command 507 of the command code "1Ah" provided in the command set 500-B, in the same manner as the operation described with reference to FIG. 13.

The memory controller 10 sends a command set 500-C related to the upper page data to the NAND memory 30, after the signal level of the ready/busy signal RBn is changed from the "L" level to the "H" level. The command set 500-C includes the same commands, addresses, and write data as the command set 500-3 described with reference to FIG. 14.

The NAND memory 30 stores the upper page data 506-C in the sense amplifier module 39 after the reception of the command 507 of the command code "1Ah" provided in the command set 500-C, in the same manner as the operation described with reference to FIG. 14.

The memory controller 10 sends a command set 500-D related to the top page data to the NAND memory 30, after the signal level of the ready/busy signal RBn is changed from the "L" level to the "H" level. The command set 500-D includes the same commands, addresses, and write data as the command set 500-4 described with reference to FIG. 14.

The NAND memory 30 writes the lower/middle/upper/top page data in the sense amplifier module 39 to the memory cell array 31 by the fine program based on the command 508 of the command code "10h" provided in the command set 500-D, in the same manner as the operation described with reference to FIG. 14.

The fine program using the EDL is completed as described above, in the memory system 1 of the present embodiment.

Note that in a case where the memory controller 10 transfers the lower page data and the middle page data from the RAM 16 to the NAND memory 30, the memory system 1 of the present embodiment executes the fine program using the EDL based on the command sets 500-A, 500-B, 500-C, and 500-D without executing the operation based on the command sets 700-1, 700-2, 700-3, and 700-4.

As described above, the memory system 1 of the present embodiment can execute the fine program using the EDL based on the command sequence of FIG. 15A.

FIG. 15B shows a modification example of the command sequence of the fine program using the EDL in the memory system 1 of the present embodiment.

As shown in FIG. 15B, the lower page data 506-A after the ECC processing may be sent from the RAM 16 to the NAND memory 30 before the middle page data is read. After the lower page data 506-A after the ECC processing is sent to the NAND memory 30 by the command set 500-A, the middle page data 705-2 is sent from the NAND memory 30 to the memory controller 10 by the read operation according to the command sets 700-3 and 700-4. The memory controller 10 executes the ECC processing on the middle page data 705-2. The memory controller 10 sends the middle page data 506-B after the ECC processing to the NAND memory 30 by using the command set 500-B. After this, the memory controller 10 sends the upper page data 506-C and the top page data 506-D to the NAND memory 30.

(b-4) Processing Flow of Write Operation

A processing flow of the write operation in the memory system 1 of the present embodiment will be described with reference to FIGS. 16 to 20.

(b-4-1) Basic Flow of Write Operation

Figure 16:
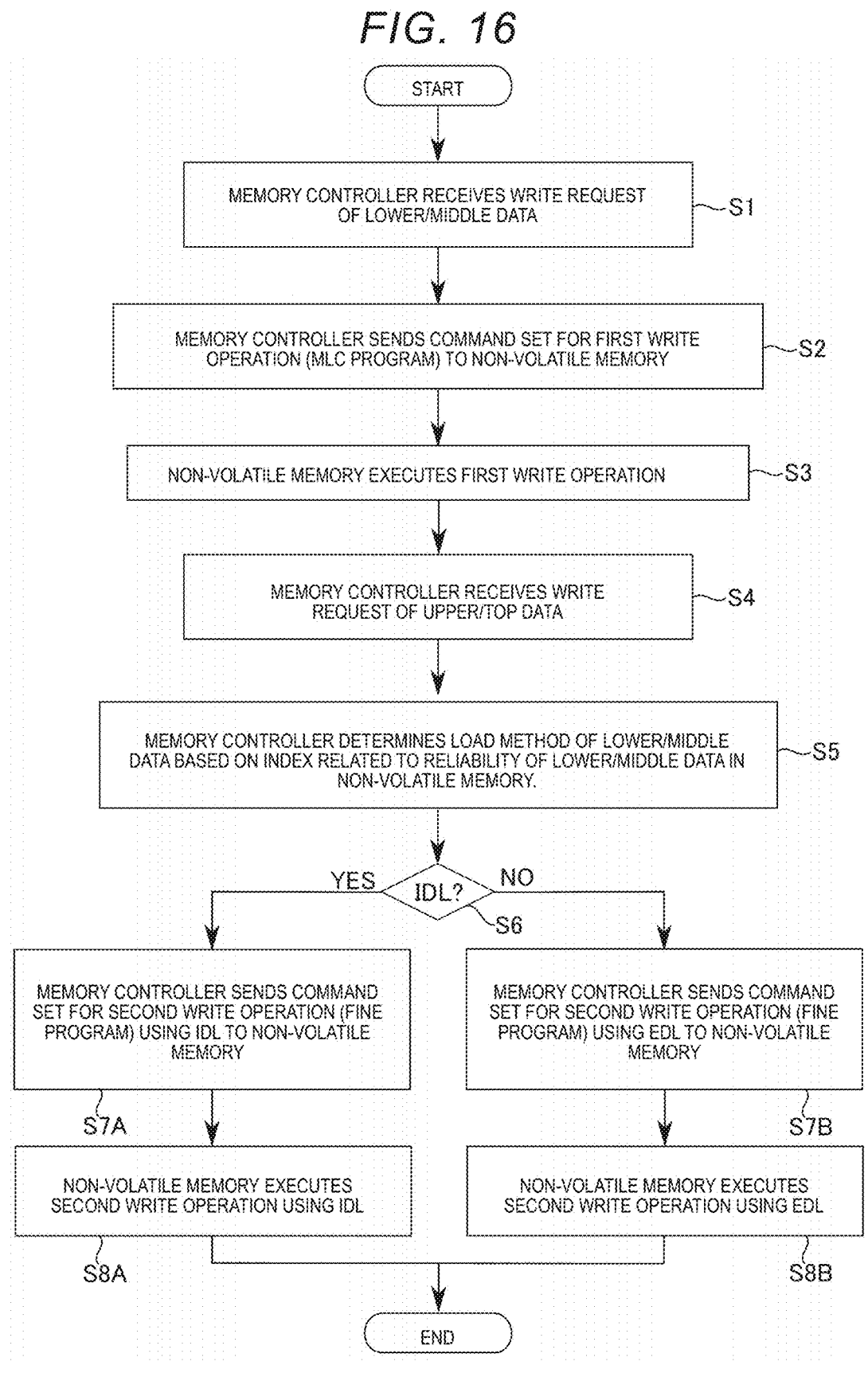
FIG. 16 is a flowchart showing an operation example of the write operation in the memory system of the first embodiment.

FIG. 16 is a flowchart describing the write operation in the memory system 1 of the present embodiment.

The memory controller 10 receives a write request from the host 2 (S1). The memory controller 10 determines to write data for which the writing is requested to the NAND memory 30 as the lower page data and the middle page data, in accordance with the write order described with reference to FIG. 9, for example.

The memory controller 10 sends the command set for executing the MLC program (first write operation) to the NAND memory 30 based on the write request (S2).

The NAND memory 30 executes the MLC program according to the command set from the memory controller 10 (S3). Thereby, the lower page data and the middle page data are written to the memory cell array 31 of the NAND memory 30.

The memory controller 10 receives a write request from the host 2 (S4). The memory controller 10 determines to write data for which the writing is requested to the NAND memory 30 (address at which the MLC program is executed) as the upper page data and the top page data, in accordance with the write order described with reference to FIG. 9, for example. The memory controller 10 prepares for the execution of the fine program (second write operation). Note that the writing of the lower page data, the middle page data, the upper page data, and the top page data is determined based on a single write request from the host 2.

In executing the fine program, the memory controller 10 determines which of the IDL or the EDL is used as the data load method based on an index related to the reliability of the lower page data and the middle page data stored in the NAND memory 30 (S5). The memory controller 10 selects any one of the IDL or the EDL based on the index (S6).

For example, in the present embodiment, any one of the IDL or the EDL is selected based on a period from the completion of the MLC program to the start of the fine program.

When the memory controller 10 determines to use the IDL as the data load method of the fine program (YES in S6), the memory controller 10 sends the command set for instructing the NAND memory 30 to execute the fine program using the IDL (S7A).

The NAND memory 30 executes the fine program using the IDL based on the command set from the memory controller 10 (S8A).

When the memory controller 10 determines to use the EDL as the data load method of the fine program (NO in S6), the memory controller 10 sends the command set for instructing the NAND memory 30 to execute the fine program using the EDL (S7B).

The NAND memory 30 executes the fine program using the EDL based on the command set from the memory controller 10 (S8B).

After the execution of the fine program of the NAND memory 30, the memory system 1 ends the operation.

(b-4-2) Specific Example of First Write Operation

As described above, the memory system 1 of the present embodiment selects the data load method at the time of the execution of the fine program based on the index of the reliability of the lower/middle page data at a start point of the fine program.

Figure 17:
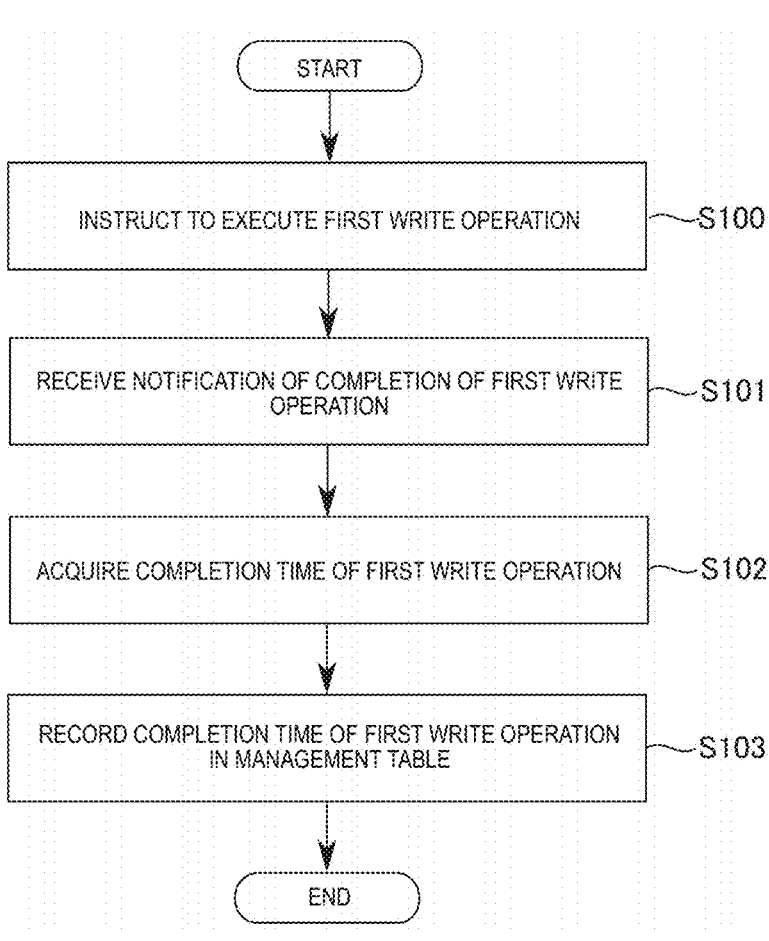
FIG. 17 is a flowchart showing an operation example of the first write operation in the memory system of the first embodiment.
Figure 18:
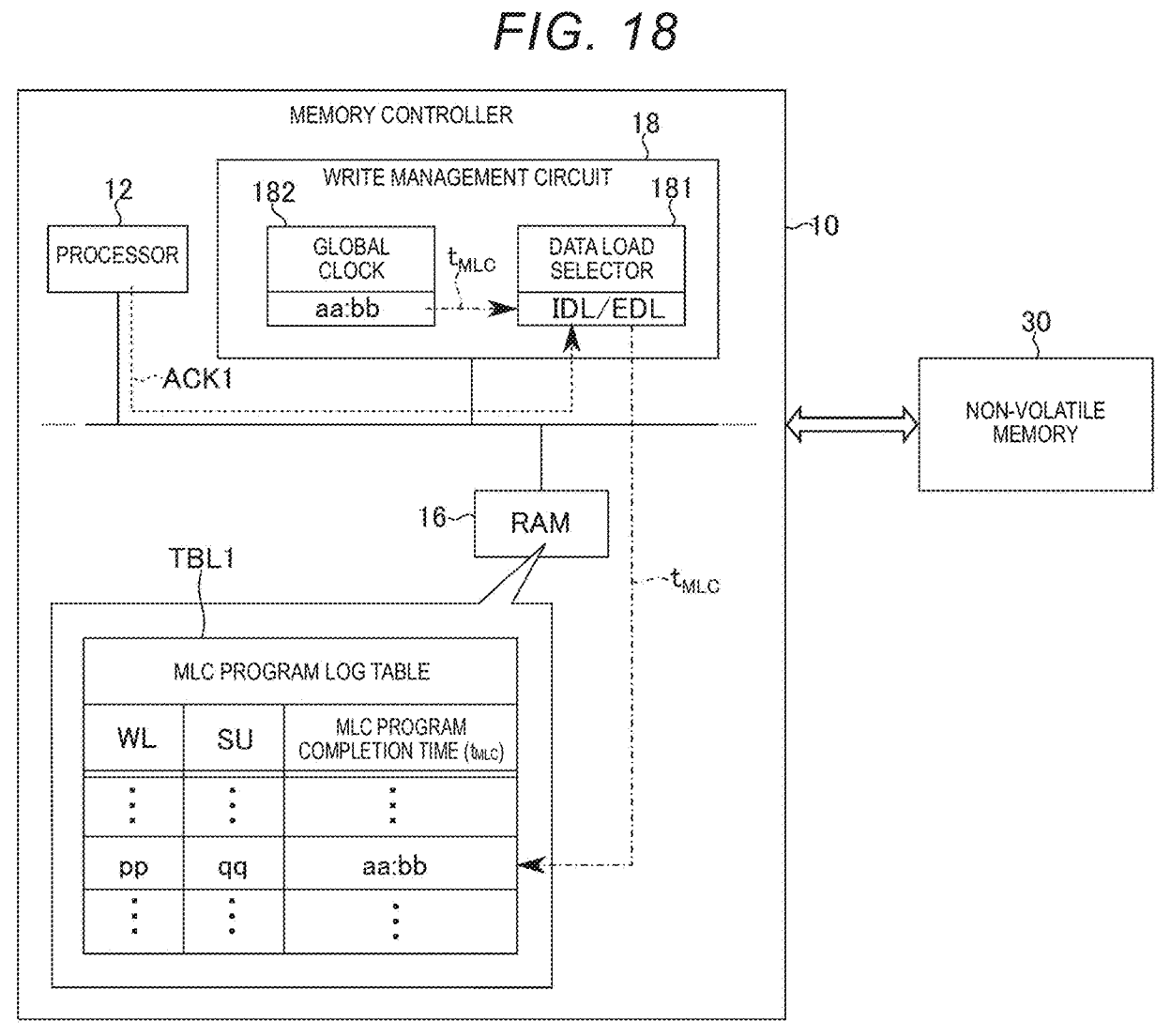

FIG. 17 is a flowchart showing an operation example of the memory system 1 of the present embodiment when the MLC program is executed. FIG. 18 is a diagram illustrating the operation example of the memory system 1 of the present embodiment when the MLC program is executed.

As shown in FIG. 17, at the time of the execution of the MLC program, the memory system 1 of the present embodiment starts managing information on the index to be used for selecting the data load method at the time of the execution of the fine program.

The memory controller 10 instructs the NAND memory 30 to execute the MLC program (S100). Thereby, the MLC program is executed in the NAND memory 30.

The processor 12 of the memory controller 10 detects the completion of the MLC program, for example, in response to the change of the level of the ready/busy signal RBn from the "L" level to the "H" level. The processor 12 notifies the data load selector 181 of the write management circuit 18 of the completion of the MLC program. For example, as shown in FIG. 18, the processor 12 sends a notification signal ACK1 indicating the completion of the MLC program to the data load selector 181.

The data load selector 181 receives the notification signal ACK1 indicating the completion of the MLC program (S101 in FIG. 17).

The data load selector 181 acquires the current time assumed to be the time when the MLC program is completed (MLC program completion time) $t_{MLC}$ from the global clock 182 of the write management circuit 18, based on the notification signal ACK1 indicating the completion of the MLC program (S102).

As shown in FIG. 18, the data load selector 181 records the word line number which is the target of the MLC program, the string unit number which is the target of the MLC program, and the acquired MLC program completion time $t_{MLC}$ in the management table related to the MLC program (MLC program log table) TBL1 in the RAM 16 (S103 in FIG. 17).

Thereby, at the time of the execution of the MLC program, the memory system 1 of the present embodiment can acquire information (here, the MLC program completion time $t_{MLC}$) to be used for selecting the data load method at the time of the execution of the fine program.

Processing of each unit of the memory controller 10 at the time of the MLC program is ended as described above.

(b-4-3) Specific Example of Second Write Operation

Figure 19:
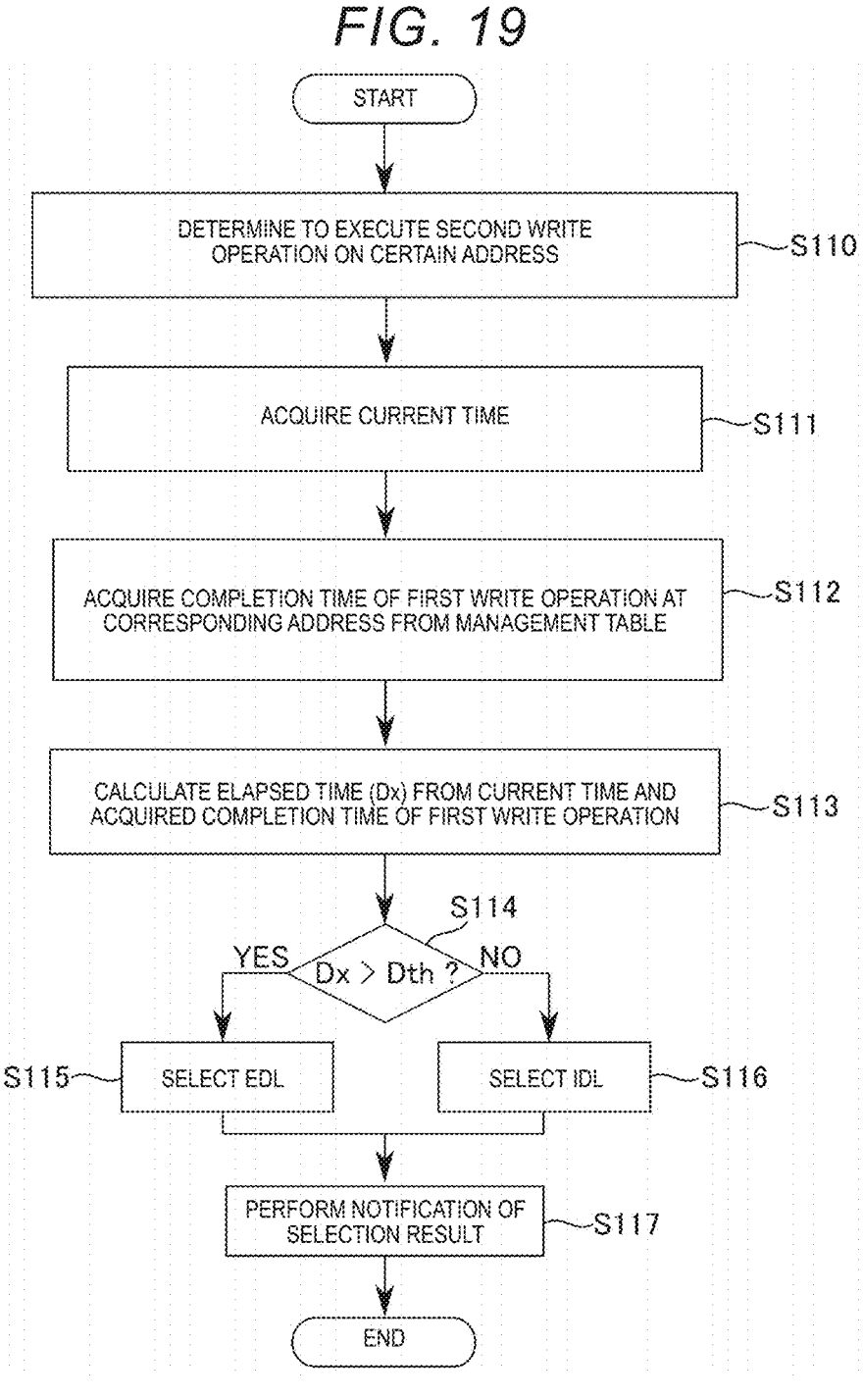
FIG. 19 is a flowchart showing an operation example of the second write operation in the memory system of the first embodiment.
Figure 20:
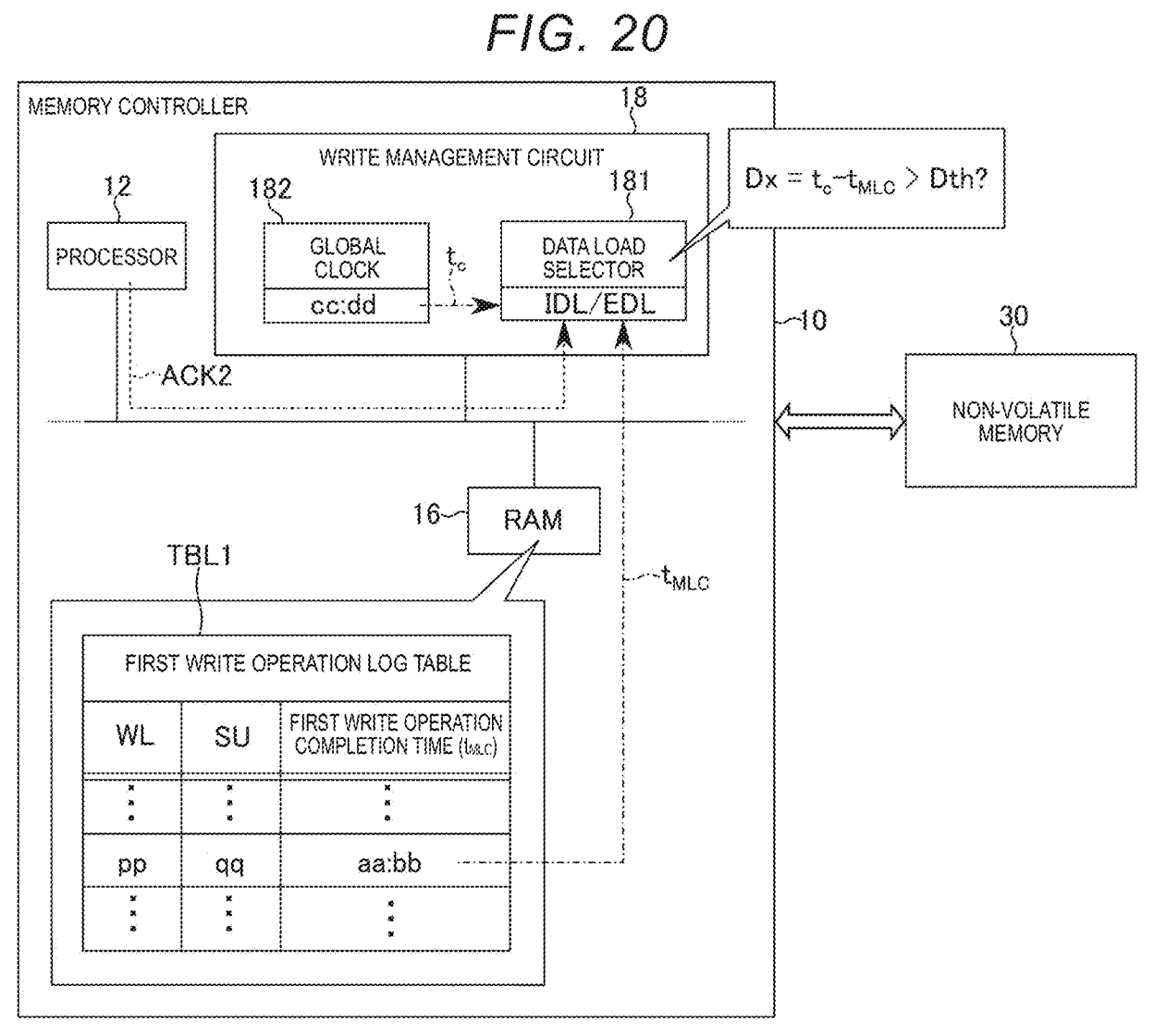

FIG. 19 is a flowchart showing an operation example of the memory system 1 of the present embodiment when the fine program is executed. FIG. 20 is a diagram illustrating the operation example of the memory system 1 of the present embodiment when the fine program is executed.

As shown in FIG. 19, the memory system 1 of the present embodiment starts various pieces of processing for selecting the data load method when the fine program is executed.

The memory system 1 determines whether to execute the fine program for a certain address (S110).

When the execution of the fine program is determined in the memory system 1, the processor 12 notifies the data load selector 181 of the execution of the fine program. For example, as shown in FIG. 20, the processor 12 sends a notification signal ACK2 indicating the execution of the fine program to the data load selector 181. The data load selector 181 receives the notification signal ACK2.

The data load selector 181 acquires the current time (time immediately before the start of the fine program) $t_c$ before the start of the fine program from the global clock 182, based on the notification signal ACK2 (S111 in FIG. 19).

The data load selector 181 searches for the MLC program completion time $t_{MLC}$ associated with the word line number and the string unit number which are the targets of the fine program from among a plurality of entries of the MLC program log table TBL1. Thereby, the data load selector 181 acquires the MLC program completion time $t_{MLC}$ associated with the target address of the fine program (S112).

The data load selector 181 executes calculation processing using the current time $t_c$ and the acquired MLC program completion time $t_{MLC}$. For example, the data load selector 181 performs subtraction processing ($Dx=t_c-t_{MLC}$) of the current time $t_c$ and the MLC program completion time $t_{MLC}$. Thereby, the data load selector 181 acquires an elapsed time Dx from the completion of the MLC program to the present at the corresponding address as a result (difference value) Dx of the calculation processing (S113).

When the difference value (elapsed time) Dx is a relatively large value, the large difference value Dx indicates that time elapsed from the completion of the MLC program is relatively long. When the difference value Dx is a relatively small value, the small difference value Dx indicates that the time elapsed from the completion of the MLC program is relatively short.

Note that, in general, in the NAND flash memory, the reliability of data stored in the memory cell decreases with the elapse of time.

The data load selector 181 compares the elapsed time Dx with a threshold value Dth for selecting the data load method. For example, the data load selector 181 determines whether the elapsed time Dx is longer than the threshold value Dth (S114).

When the elapsed time Dx is longer than the threshold value Dth (YES in S114), the data load selector 181 selects the EDL as the data load method of the lower/middle page data used for the fine program (S115).

When the elapsed time Dx is equal to or shorter than the threshold value Dth (NO in S114), the data load selector 181 selects the IDL as the data load method of the lower/middle page data used for the fine program (S116).

At step S117, the processor 12 (or the write management circuit 18) notifies the NAND memory 30 of the selection result of the data load selector 181 by transmitting a flag or a prefix command as the signals 555 and 777 described above. The processor 12 sends a plurality of command sets in accordance with the selected data load method to the NAND memory 30.

Thereby, the memory controller 10 instructs the NAND memory 30 to execute the fine program using the data load method selected between the IDL and the EDL. The NAND memory 30 executes the fine program by using the lower/middle page data prepared by the selected data load method.

Processing of each unit of the memory controller 10 at the time of the fine program is ended as described above.

As described above, the memory system 1 of the present embodiment uses the elapsed time Dx from the completion of the MLC program as the index of the data reliability to select any one of the IDL or the EDL. Thereby, the memory system 1 of the present embodiment can achieve high write performance of the memory system and high reliability of the data stored in the memory system.

(c) Modification Example

A modification example of the memory system 1 of the present embodiment will be described with reference to FIGS. 21 to 23.

(c-1) Modification Example 1

Figure 21:
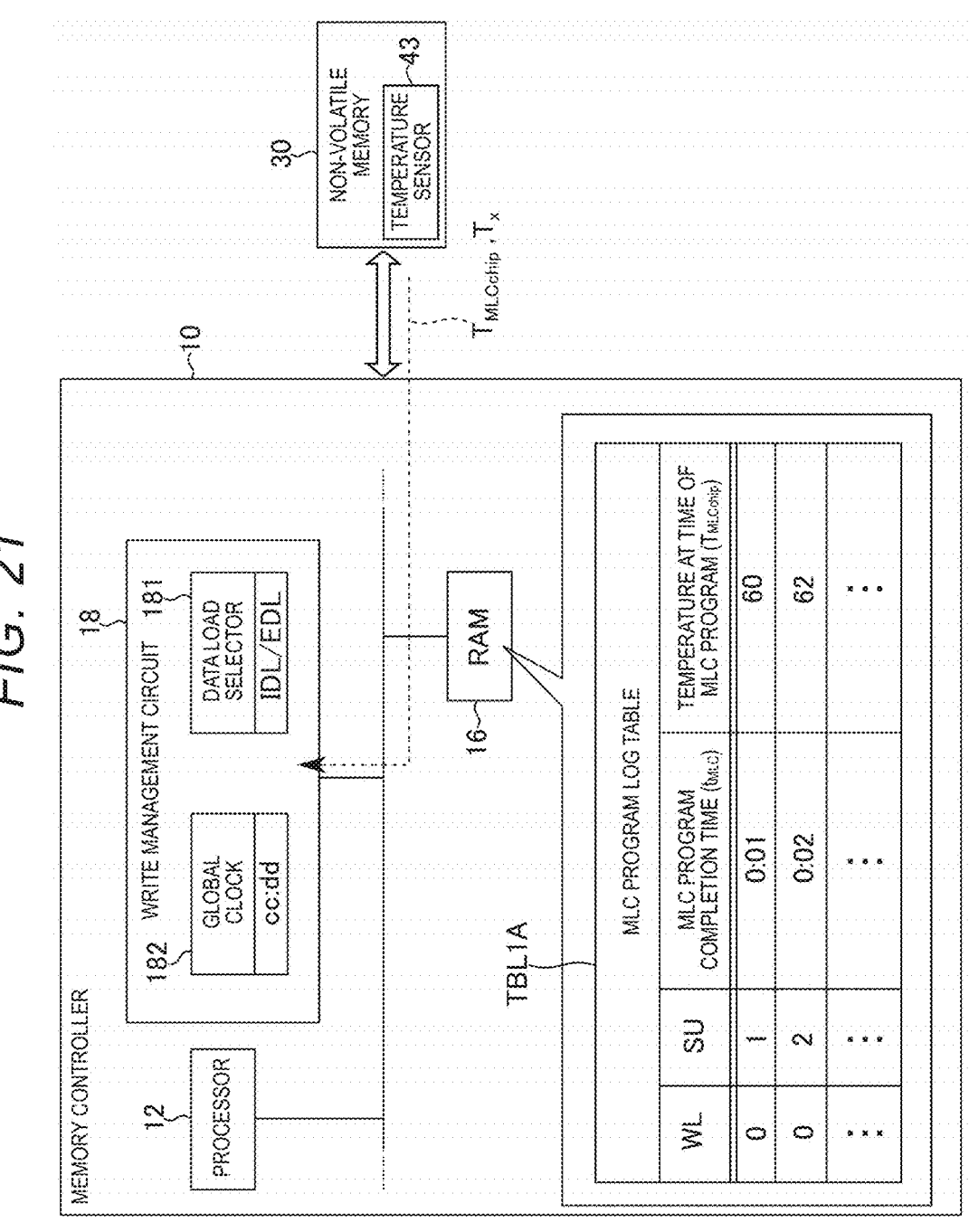
FIG. 21 is a block diagram showing a configuration example of a first modification example of the memory system of the first embodiment.

FIG. 21 is a block diagram illustrating one modification example of the memory system 1 of the present embodiment.

In the memory system 1 of a first modification example of the present embodiment, the data load method at the time of the fine program is selected in consideration of temperature of the memory system 1.

When the temperature of the memory system 1 is high or when a temperature change between the write operation and the read operation of the memory system 1 is large, an error in data is likely to occur. That is, the reliability of data may change depending on the temperature of the memory system 1.

As shown in FIG. 21, the NAND memory 30 includes a temperature sensor 43. The MLC program log table TBL1A further includes a field for recording a chip temperature $T_{MLCchip}$ at the time of the execution of the MLC program.

For example, the write management circuit 18 adjusts a magnitude of a determination reference value of the index of the data reliability (for example, the threshold value Dth with respect to the elapsed time Dx) based on the acquired chip temperature $T_{MLCchip}$.

The data load selector 181 acquires the chip temperature $T_{MLCchip}$ of the NAND memory 30 at the time of the execution of the MLC program from the temperature sensor 43 in parallel with the acquisition of the MLC program completion time $t_{MLC}$.

The data load selector 181 records the acquired chip temperature $T_{MLCchip}$ in a corresponding entry of the MLC program log table TBL1A together with the MLC program completion time $t_{MLC}$.

The data load selector 181 (or the processor 12) adjusts the threshold value Dth at the time of the selection of the data load method, based on the acquired chip temperature $T_{MLCchip}$. An example of adjusting the threshold value Dth is as follows, for example.

The data load selector 181 compares the chip temperature $T_{MLCchip}$ with two threshold values $T_H$ and $T_L$. The threshold value $T_H$ is a threshold value related to a high temperature side. The threshold value $T_L$ is a threshold value related to a low temperature side. When the chip temperature $T_{MLCchip}$ is higher than the threshold value $T_H$ or the chip temperature $T_{MLCchip}$ is lower than the threshold value $T_L$, the data load selector 181 sets a value of the threshold value Dth with respect to the elapsed time Dx to be smaller than an initial set value. By reducing the threshold value Dth in this manner, the EDL is selected even for a shorter elapsed time Dx.

Another example of adjusting the threshold value Dth is as follows.

When the fine program is executed, the data load selector 181 acquires a chip temperature (hereinafter, referred to as the current chip temperature) $T_X$ immediately before the execution of the fine program. The data load selector 181 calculates a temperature difference (here, referred to as D1) by subtraction processing of the chip temperature $T_{MLCchip}$ at the time of the completion of the MLC program and the current chip temperature $T_X$. The data load selector 181 compares the temperature difference D1 with a certain reference value (here, referred to as a threshold value D2). When the temperature difference D1 is greater than the threshold value D2, the data load selector 181 sets the value of the threshold value Dth with respect to the elapsed time Dx to be smaller than the initial set value. Thereby, the EDL is selected even for a shorter elapsed time Dx.

Note that the temperature difference D1 may have a positive value or a negative value depending on a magnitude relationship between the chip temperature $T_{MLCchip}$ and the current chip temperature $T_X$. An amount of variation of the threshold value Dth may be adjusted according to positive and negative polarities of the temperature difference D1. Further, the temperature difference D1 may be indicated by an absolute value of the difference value between the chip temperature $T_{MLCchip}$ and the current chip temperature $T_X$.

In the present modification example, an example is described in which the data load method of the lower/middle page data in the fine program is selected in consideration of both the time during which the memory cell MC stores data and the temperature of the memory system 1 (more specifically, the temperature of the NAND memory 30). However, the memory system 1 of the present embodiment may select the data load method of the lower/middle page data in the fine program based only on the temperature of the memory system 1. For example, when the temperature of the memory system 1 is higher than a threshold value, the data load selector 181 selects the EDL without comparing the elapsed time Dx in accordance with the MLC program completion time $t_{MLC}$ with the threshold value Dth. For example, when the temperature of the memory system 1 is equal to or lower than the threshold value, the data load selector 181 selects the IDL without comparing the elapsed time Dx in accordance with the MLC program completion time $t_{MLC}$ with the threshold value Dth.

As described above, the memory system 1 of the present embodiment can select one of the IDL and the EDL that is more suitable in consideration of the influence of the temperature of the NAND memory 30 on the reliability of data.

(c-2) Modification Example 2

FIGS. 22A to 22C are diagrams illustrating a second modification example of the memory system 1 of the present embodiment.

A plurality of chips provided in the NAND memory 30 may have variations in characteristics. The plurality of blocks provided in the memory cell array 31 may also have variations in characteristics. The memory cells MC connected to the plurality of word lines WL provided in each block may also have variations in characteristics. Therefore, error rates of data vary among the plurality of chips, the plurality of blocks, and the plurality of word lines.

The memory system I according to the second modification example of the present embodiment sets the threshold value for selecting the data load method at the time of the fine program in units of chips, units of blocks, or units of word lines, in consideration of the variations in the error rates among the plurality of chips, the plurality of blocks, and the plurality of word lines.

For example, as shown in FIG. 22A, the threshold value Dth may be set for each block BLK. In this case, a threshold value Dth_BLK0 is set for a block BLK0, and a threshold value Dth_BLKi is set for a block BLKi. Here, i is an integer of 0 or larger. The value of the threshold value Dth_BLK0 may be the same as or different from the value of the threshold value Dth_BLKi.

As shown in FIG. 22B, the threshold value Dth may be set for each word line WL. In this case, a threshold value Dth_WL0 is set for a word line WL0, and a threshold value Dth_WLi is set for a word line WLi.

As shown in FIG. 22C, the threshold value Dth may be set for each chip provided in the NAND memory 30. In this case, a threshold value Dth_Chip0 is set for a certain chip, and a threshold value Dth_Chipi is set for another chip.

The threshold value Dth for a certain unit is determined, for example, at the time of design of the memory system 1 or at the time of screening in manufacturing the NAND memory 30.

When the threshold value Dth for selecting the data load method is set in units of blocks or units of word lines, the value of the threshold value Dth may be set such that the IDL or the EDL is always selected for a specific block and a specific word line. For example, when the EDL is always selected for a specific block or a specific word line, the value of the threshold value Dth is set to zero. For example, when the IDL is always selected for a specific block or a specific word line, the value of the threshold value Dth is set to the maximum value of a numerical range used for the threshold value Dth.

As described above, in the memory system 1 of the present embodiment, the index for selecting any one of the IDL or the EDL can be set in units of chips, units of blocks, and units of word lines.

(c-3) Modification Example 3

Figure 23:
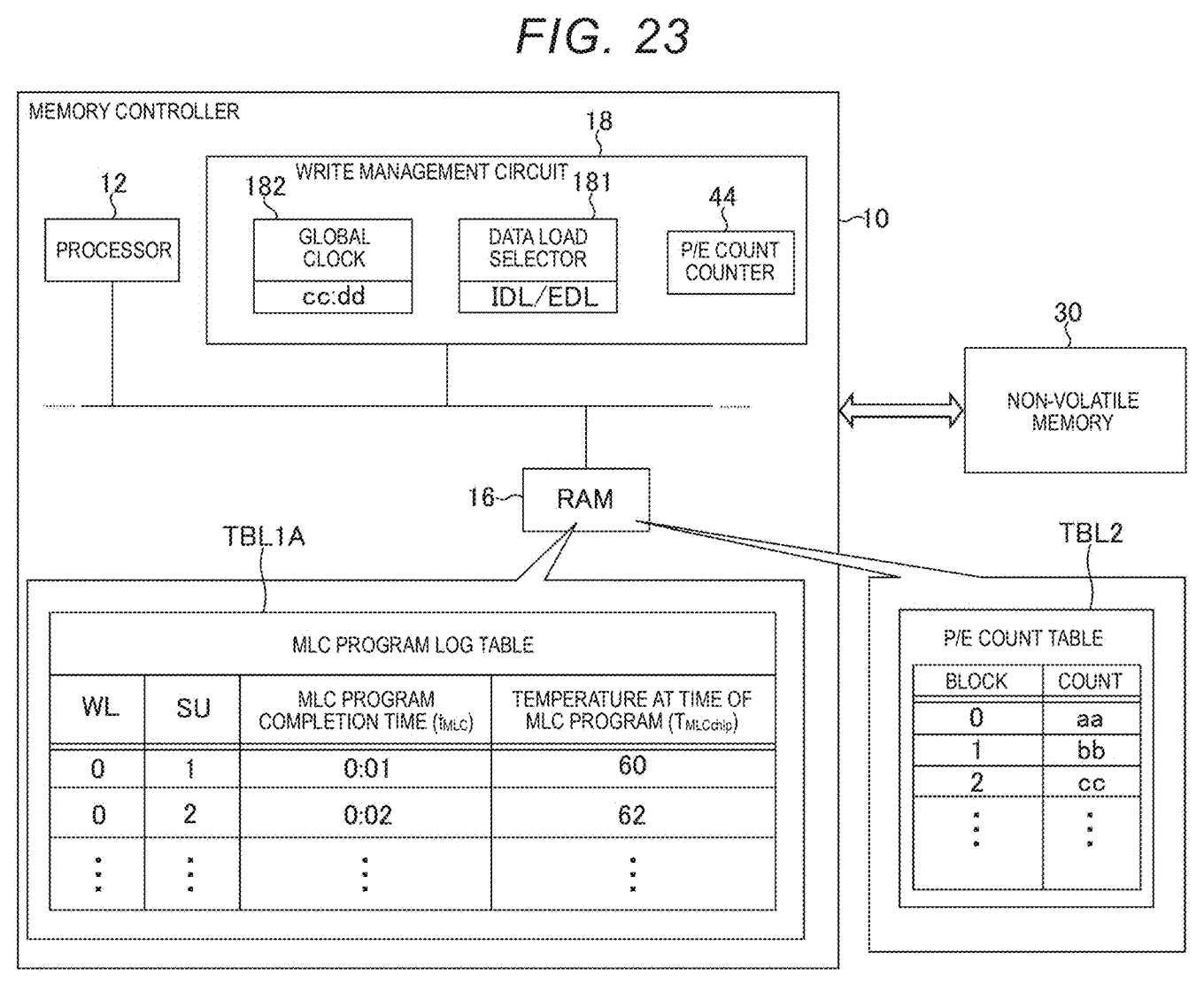

FIG. 23 is a diagram illustrating a third modification example of the memory system 1 of the present embodiment.

The block BLK (and the memory cell MC) of the NAND memory 30 is worn out according to the use of the memory system 1.

The memory system 1 of the third modification example dynamically adjusts the threshold value Dth for selecting any one of the IDL or the EDL according to the wear level (degree of wear) of a block BLK.

As shown in FIG. 23, in the present embodiment, the memory controller 10 includes a program/erase count counter (P/E count counter) 44 in the write management circuit 18. The memory controller 10 may make the program/erase count counter 44 non-volatile in the NAND memory 30 when the power is cut off for the memory system 1, and may load the program/erase count counter 44 into the write management circuit 18 in response to the start of power supply for the memory system 1. A load destination of the program/erase count counter 44 may be the RAM 16. The program/erase count counter 44 measures the number of times of the execution of the program and erase operation in each block BLK. For example, a combination of one write operation and one erase operation is measured as one operation cycle.

The memory controller 10 includes a management table TBL2 related to the program/erase count in the RAM 16.

The management table TBL2 records the number of times of program and erase operation in each block BLK.

An error rate of data in the block BLK changes depending on the program/erase count. For example, the error rate of data increases as the program/erase count increases.

For example, in the memory system 1 of the present modification example, the memory controller 10 (the processor 12 or the data load selector 181) acquires the program/erase count of each block BLK by referring to the program/erase count counter 44.

The memory controller 10 records the acquired program/erase count in the management table TBL2.

The data load selector 181 (or the processor 12) adjusts the value of the threshold value Dth corresponding to each block BLK based on the program/erase count recorded in the management table TBL2.

For example, when the program/erase count of a block BLK is relatively large (when the wear level of the block BLK is high), the threshold value Dth is adjusted to a value smaller than the initial set value. Thereby, the EDL is more likely to be selected for the block BLK having a high wear level.

As described above, the memory system 1 of the present embodiment can select a more suitable data load method between the IDL and the EDL depending on the wear level of the block BLK.

(d) Summary

In the memory system 1 of the present embodiment, based on the index related to the reliability of the lower/middle page data written to the memory cell array 31 by the MLC program, the lower/middle page data used for the fine program is selected to be loaded inside the NAND memory 30 or to be loaded outside the NAND memory 30.

For example, in the NAND flash memory, the threshold voltage of a memory cell MC tends to change with the elapse of time after data is programmed into the memory cell MC. Therefore, the reliability of the data written to the memory cell MC may decrease with the elapse of time.

When the lower/middle page data in a memory cell array 31 includes an error, there is a possibility that the correct four page data is not written to the cell unit CU designated by the selected address of the memory cell array 31 at the time of the fine program.

Meanwhile, when the memory controller 10 provides the lower/middle page data to the NAND memory 30 at the time of the fine program, there is a possibility that the time until the completion of the fine program may be longer due to the ECC processing on the lower/middle page data and/or the transfer of the command set including the lower/middle page data from the memory controller 10 to the NAND memory 30.

In the present embodiment, when the fine program is executed for a certain address, the memory controller 10 evaluates the reliability of the lower/middle page data based on a comparison between the elapsed time Dx, which is from the time tic at which the lower/middle page data was written to the memory cell array 31 to the start of the execution of the fine program, and the threshold value Dth.

Thereby, the memory system 1 of the present embodiment can select a more suitable data load method between the IDL and the EDL for the data load (data preparation) of the lower/middle page data used for the fine program to be executed.

As a result, the present embodiment can provide a memory system with high performance and high reliability.

(2) Second Embodiment

A memory system of a second embodiment will be described with reference to FIGS. 24 to 30.

(a) Configuration Example

A configuration example of the memory system 1 of the present embodiment will be described with reference to FIG. 24.

Figure 24:
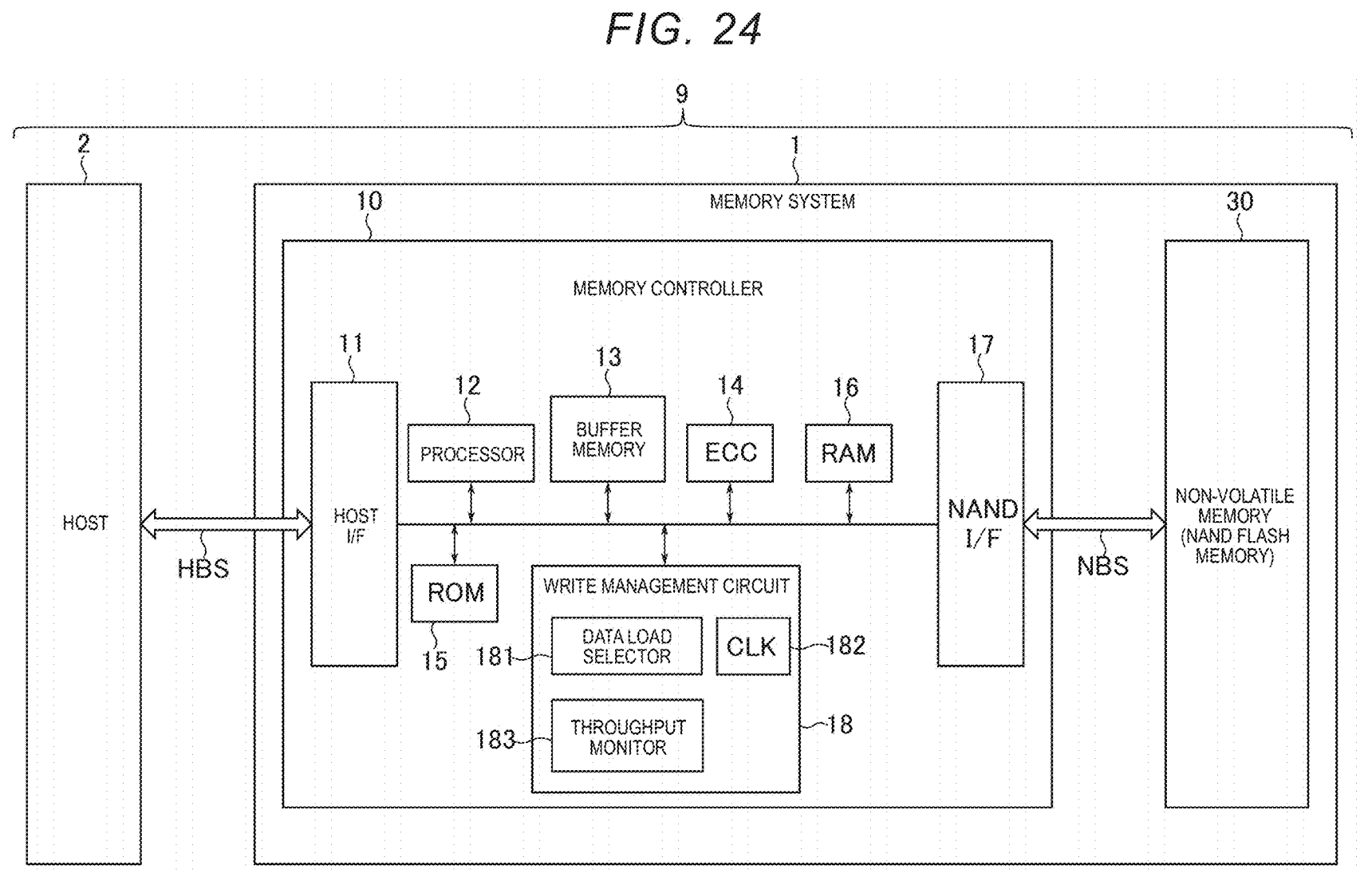

FIG. 24 is a block diagram showing the configuration example of the memory system 1 of the present embodiment.

The memory system 1 of the present embodiment selects the data load method at the time of the fine program based on a workload applied to the memory system 1.

As shown in FIG. 24, in the memory controller 10 of the memory system 1 of the present embodiment, the write management circuit 18 further includes a throughput monitor 183.

The throughput monitor 183 measures an amount of write data supplied from the host 2 to the memory system 1 within a certain time window (unit time). Hereinafter, the amount of write data supplied within the certain time window is referred to as a host write throughput or simply a write throughput. For example, the throughput monitor 183 acquires an average value of the write throughputs in the time window based on a measurement result of the amount of write data supplied from the host 2.

The data load selector 181 of the write management circuit 18 compares the measured write throughput with a preset threshold value (TPth). When the fine program is executed, the data load selector 181 selects any one of the IDL or the EDL based on a comparison result between the write throughput (TP) and the threshold value (TPth).

(b) Operation Example

The operation example of the memory system 1 of the present embodiment will be described with reference to FIGS. 25 and 26.

Figure 25:
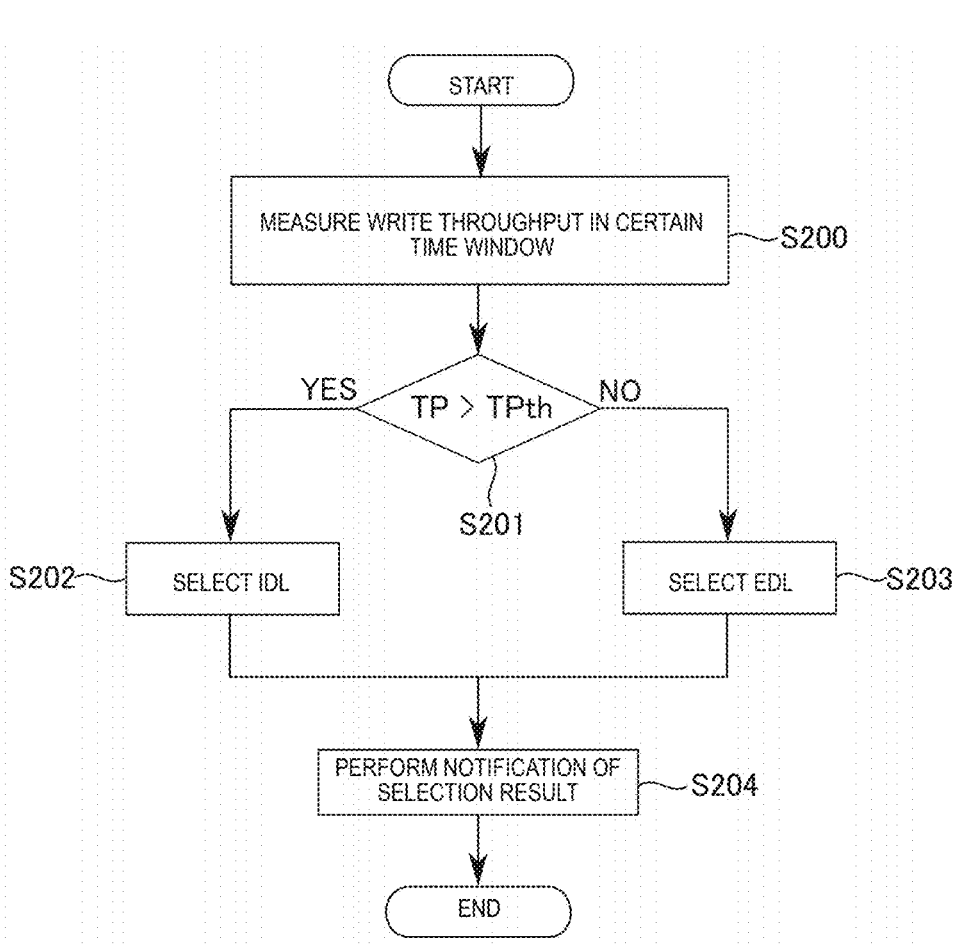
FIG. 25 is a flowchart showing an operation example of a write operation in the memory system according to the second embodiment.

FIG. 25 is a flowchart describing an operation example of the memory system 1 of the present embodiment. FIG. 26 shows an example of a relationship between the write throughput and time in the memory system 1 of the present embodiment. In FIG. 26, the horizontal axis of the graph corresponds to time, and the vertical axis of the graph corresponds to the write throughput.

As shown in FIG. 25, in the memory controller 10 of the memory system 1 of the present embodiment, the throughput monitor 183 of the write management circuit 18 measures the write throughput TP in a certain time window (S200). For example, the throughput monitor 183 acquires the amount of write data supplied from the host 2 in the certain time window. The throughput monitor 183 stores the acquired measurement result in the write management circuit 18.

The data load selector 181 compares the write throughput TP with the threshold value TPth (S201). The data load selector 181 selects the data load method of the fine program that may be executed in a next time window of the certain time window, based on the comparison result.

Figure 26:
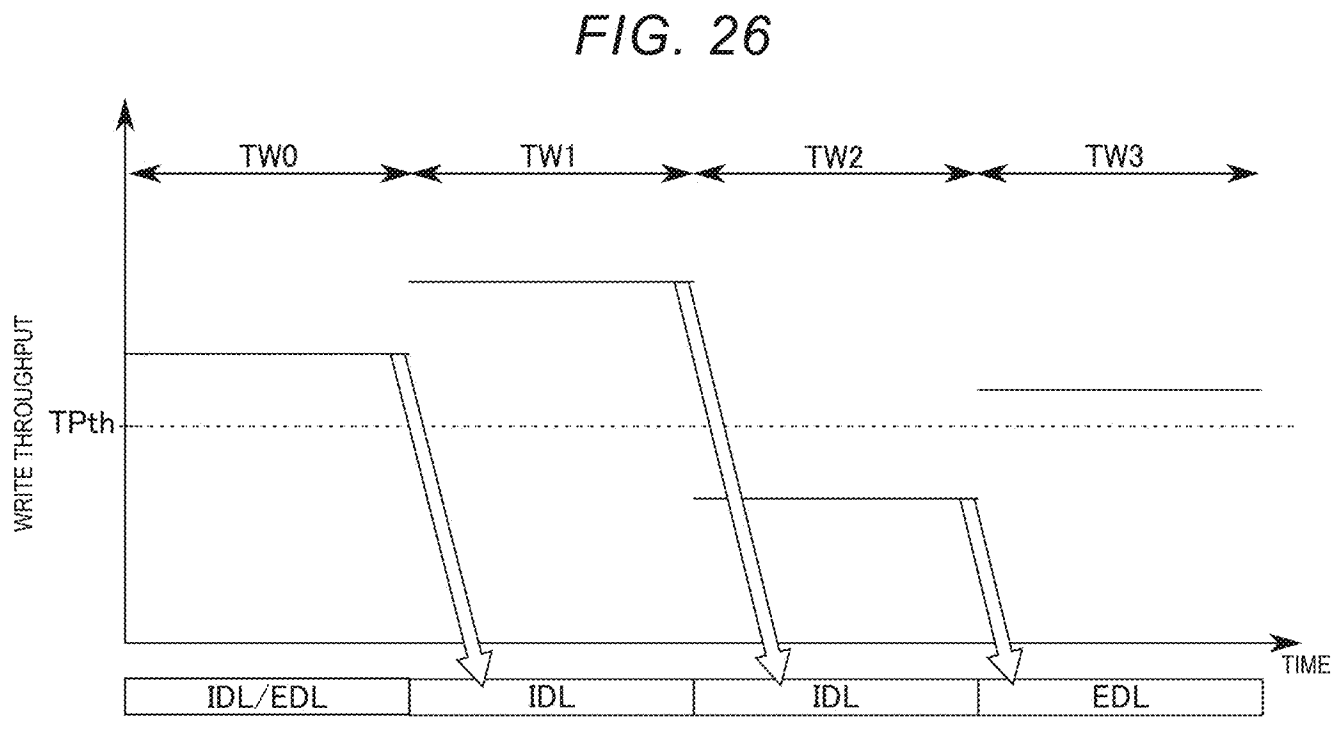

As shown in FIG. 26, in a time window TW0, when the write throughput TP is higher than the threshold value TPth, it is assumed that a period in which the memory cell MC is in the MLC state is short. Therefore, when the write throughput TP is higher than the threshold value TPth, as in the time window TW0, the data load selector 181 selects the IDL as the data load method of the fine program that may be executed in a next time window TW1 (S202 in FIG. 25).

As shown in FIG. 26, in a time window TW2, when the write throughput TP is equal to or lower than the threshold value TPth, it is assumed that a period in which the memory cell MC is in the MLC state is long. Therefore, when the write throughput TP is equal to or lower than the threshold value TPth, as in the time window TW2, the data load selector 181 selects the EDL as the data load method of the fine program that may be executed in a next time window TW3 (S203 in FIG. 25).

The data load selector 181 notifies the processor 12 of the selection result of the data load method (S204). Thereby, when the fine program is executed, the processor 12 instructs the NAND memory 30 to execute the fine program by using the data load method indicated in the selection result.

The NAND memory 30 executes the fine program using the selected data load method. Thereby, four page data is written to a write target address of the memory cell array 31. With the above, the memory system 1 of the present embodiment ends the operation.

Note that a range of the time window may be changed without being fixed. Further, instead of the write data amount in a time window, the write data amount for every certain number of commands may be measured as the write throughput.

Further, in the same time window as a time window in which the write throughput is measured, the data load method of the fine program to be executed in the time window may be selected based on the measurement result of the write throughput.

(c) Modification Example

A modification example of the memory system 1 of the second embodiment will be described with reference to FIGS. 27 to 30.

(c-1) Modification Example 1

Figure 27:
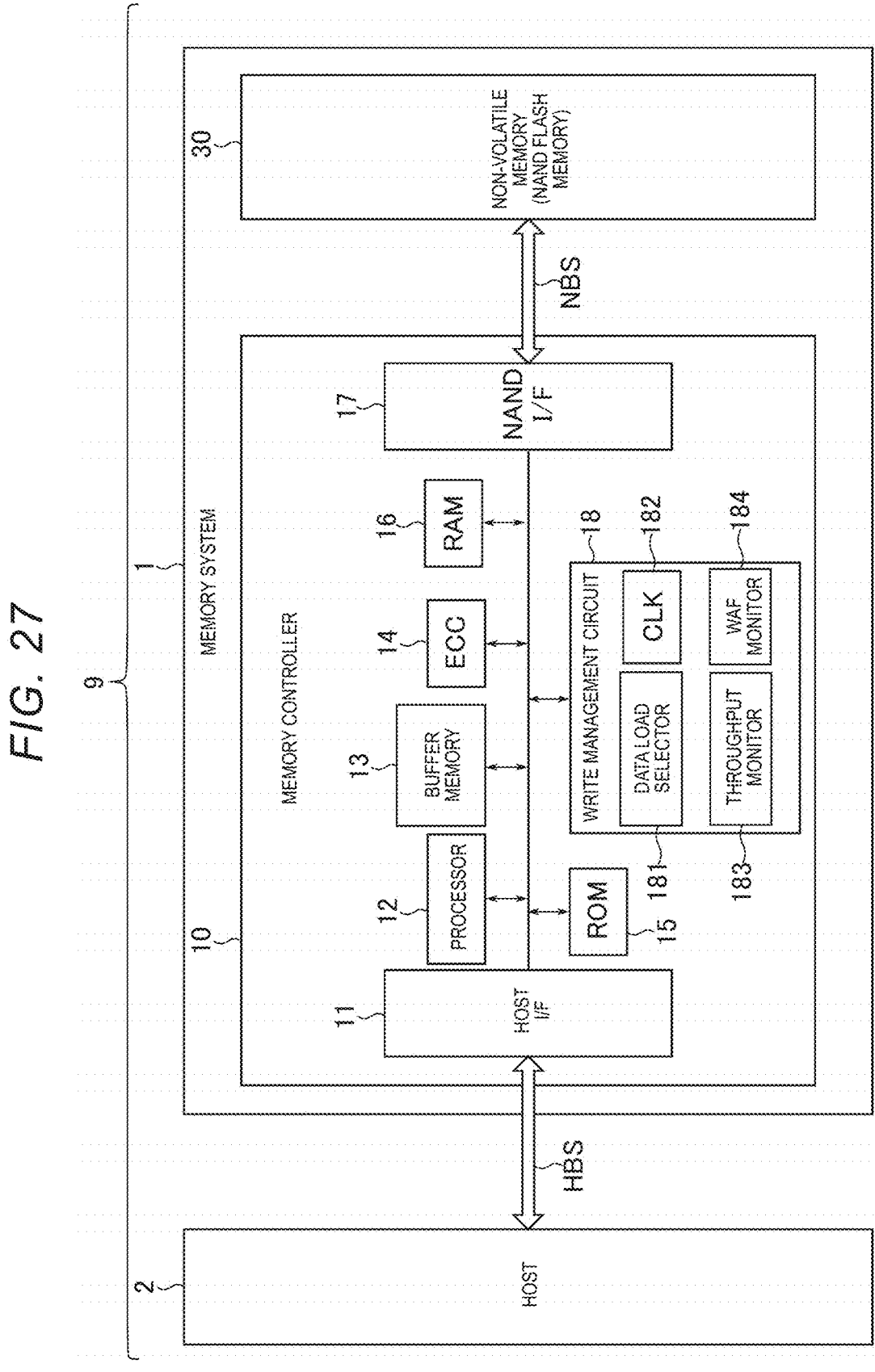
FIG. 27 is a block diagram showing a configuration example of a first modification example of the memory system of the second embodiment.

FIG. 27 is a block diagram showing a configuration example of the memory system 1 according to a first modification example.

The memory system 1 of the present embodiment can select the IDL or the EDL with higher accuracy by considering not only the write throughput from the host 2 to the memory system 1 but also performance of background processing executed in the memory system 1, for example, a garbage collection (compaction).

As shown in FIG. 27, in the memory system 1 of the first modification example, the write management circuit 18 further includes a WAF monitor 184. The WAF monitor 184 calculates a write amplification factor (WAF) of the memory system 1. The WAF is a value indicating a ratio of the write amount to the NAND memory 30 with respect to the write amount (transfer data amount) from the host 2 to the memory system 1. For example, the WAF is obtained from "the write amount to the NAND memory 30/the write amount from the host 2 to the memory system 1". The WAF monitor 184 multiplies the write throughput obtained by the throughput monitor 183 by the WAF. The result of the multiplication (product) indicates an amount of data written to the NAND memory 30 in a certain time window (hereinafter, referred to as NAND throughput).

The data load selector 181 selects the data load method of the fine program that may be executed in the next time window, based on a comparison result between the NAND throughput and the threshold value TPthz.

Figure 28:
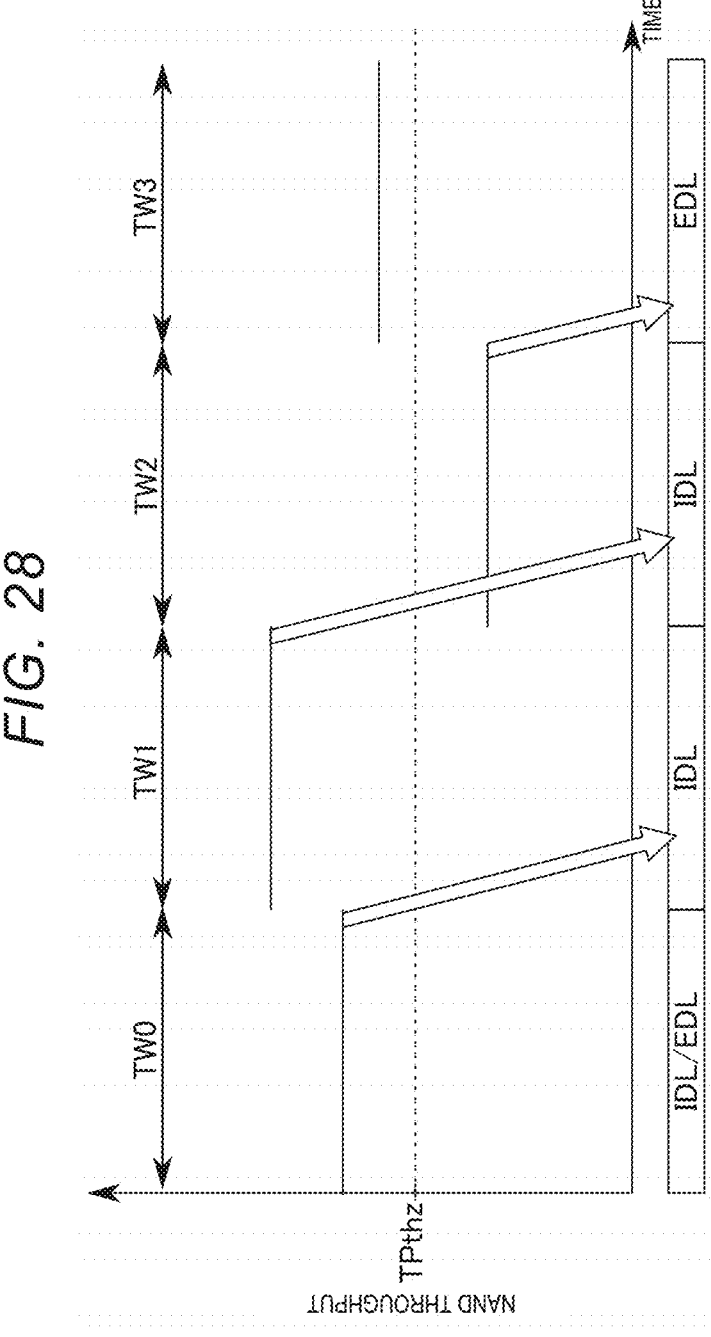
FIG. 28 is a diagram showing an operation example of the write operation in the first modification example of the memory system of the second embodiment.

FIG. 28 shows a relationship between the NAND throughput and time in the memory system 1 of the present embodiment. In FIG. 28, the horizontal axis of the graph corresponds to time, and the vertical axis of the graph corresponds to the NAND throughput.

The memory system 1 of the first modification example executes the comparison between the NAND throughput and the threshold value TPthz, and the selection of the data load method used for the fine program, based on substantially the same processing flow as the processing flow described with reference to FIG. 25.

As shown in FIG. 28, when the NAND throughput in a time window TW0 is higher than the threshold value TPthz, the data load selector 181 selects the IDL as the data load method of the fine program that may be executed in a next time window TW1.

When the NAND throughput in a time window TW2 is equal to or lower than the threshold value TPthz, the data load selector 181 selects the EDL as the data load method of the fine program that may be executed in a next time window TW3.

As described above, the memory system 1 of the first modification example can select the data load method more suitable for the fine program by further considering a processing amount of the background processing of the memory system 1.

(c-2) Modification Example 2

Figure 29:
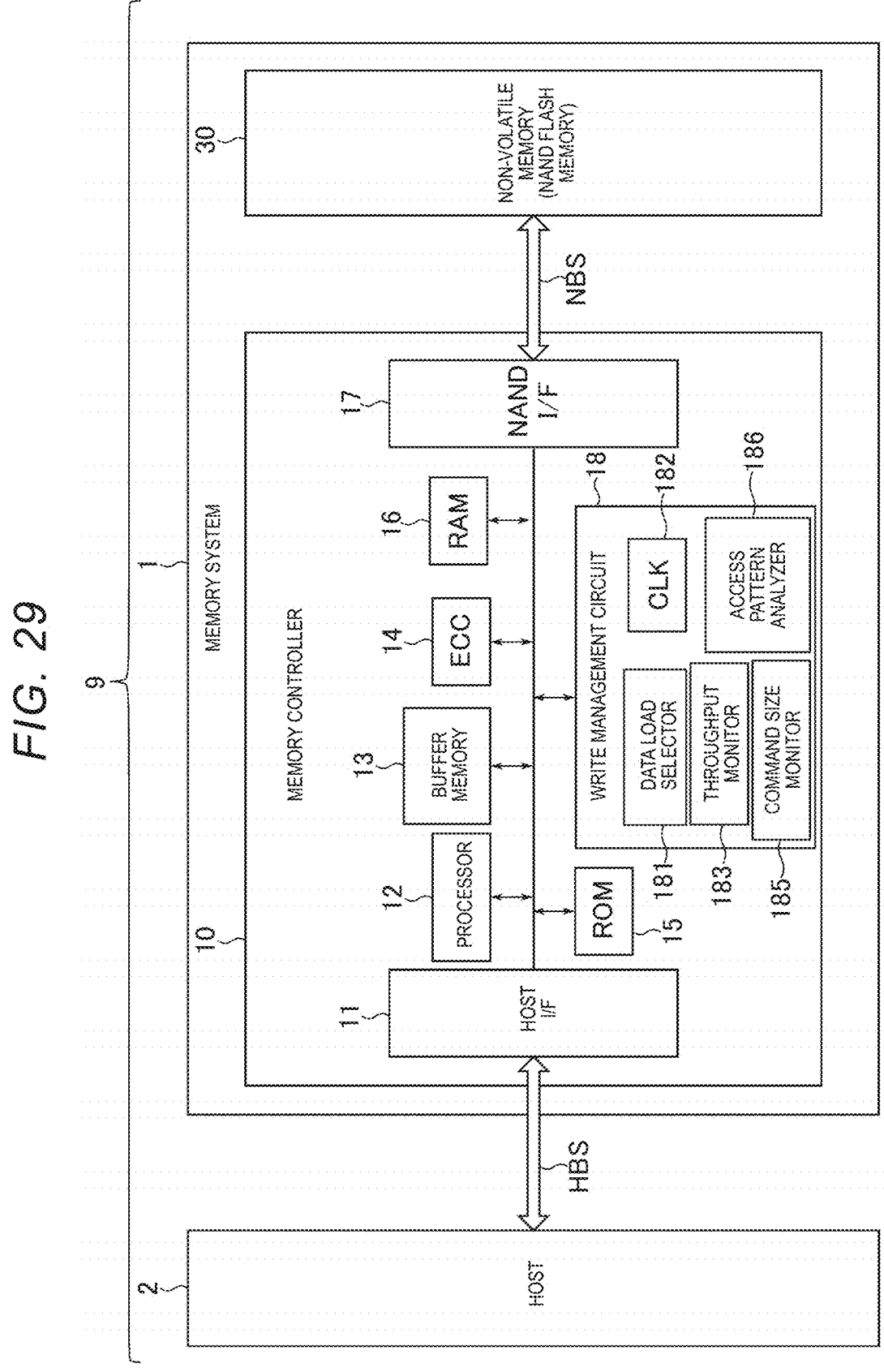
FIG. 29 is a block diagram showing a configuration example of a second modification example of the memory system of the second embodiment.

FIG. 29 is a block diagram showing a configuration example of the memory system 1 according to a second modification example.

The data load method of the fine program may be selected according to a size of write data requested by a command (request) sent from the host 2 (hereinafter referred to as a command size) and continuity of addresses.

As shown in FIG. 29, in the memory controller 10 of the memory system 1 of the second modification example, the write management circuit 18 further includes a command size monitor 185 and an access pattern analyzer 186.

The command size monitor 185 measures the command size for each of a plurality of commands (requests) sent from the host 2. For example, the command size monitor 185 stores command sizes of a plurality of commands sent most recently, and acquires an average value of the plurality of command sizes. The command size monitor 185 notifies the data load selector 181 of whether the acquired average value of the command sizes is larger than a set threshold value.

The access pattern analyzer 186 analyzes, for example, a pattern of logical addresses associated with write target data. The access pattern analyzer 186 detects continuity of the logical addresses associated with the write target data, based on an analysis result of the pattern of the logical addresses. The access pattern analyzer 186 determines that the logical addresses respectively associated with the write target data are contiguous when, for example, a range of the logical addresses of write data for which the writing is requested by a first command and a range of the logical addresses of write data for which the writing is requested by a second command are contiguous. The access pattern analyzer 186 notifies the data load selector 181 of whether the logical addresses respectively associated with the write target data are contiguous.

When an access having a relatively large command size (for example, 128 KB) and contiguous logical addresses occurs, a frequency of writing data to a logical address in the range tends to be relatively high. Therefore, it is considered that an influence of decrease in the reliability of the data corresponding to the logical address may be small.

In the memory system 1 of the second modification example, when the command size is larger than the set threshold value, and the logical addresses associated with the write target data are contiguous, the data load selector 181 selects the IDL as the data load method at the time of the fine program.

When the command size is equal to or smaller than the set threshold value or when the logical addresses associated with the write target data are not contiguous, the data load selector 181 selects any one of the IDL or the EDL based on the above-described elapsed time from the MLC program, the write throughput, or the like.

Figure 30:
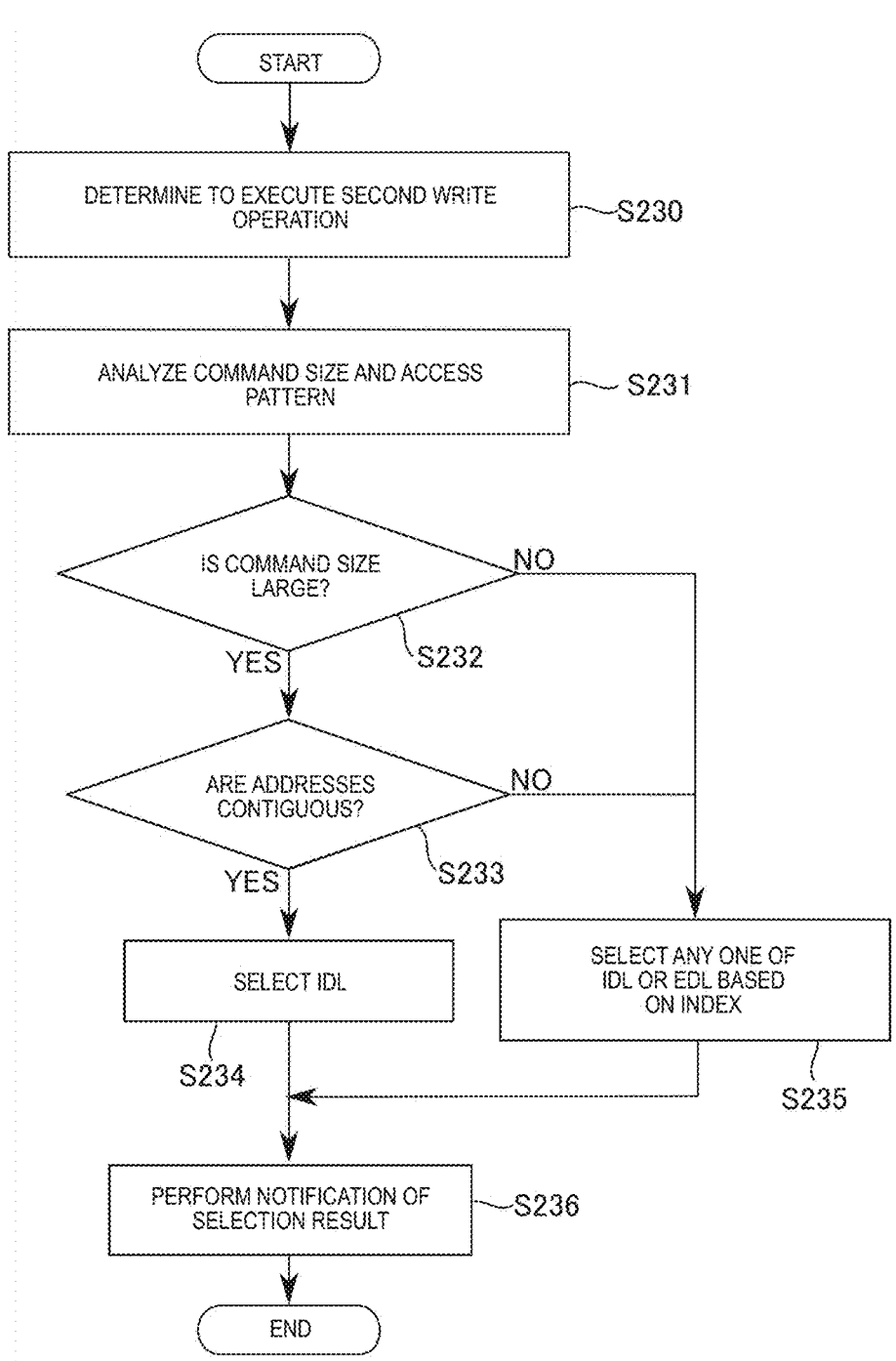
FIG. 30 is a flowchart showing an operation example of the write operation in the second modification example of the memory system of the second embodiment.

FIG. 30 is a flowchart showing an operation example of the second modification example of the memory system 1 of the present embodiment.

The memory controller 10 determines to execute the fine program (S230).

The command size monitor 185 monitors the command size provided in a write request from the host 2. The access pattern analyzer 186 analyzes the pattern (continuity of addresses) of the logical addresses of the write targets (S231).

The data load selector 181 determines whether the command size is larger than a certain threshold value based on the monitoring result of the command size (S232).

When the command size is larger than the threshold value (YES in S232), the data load selector 181 determines whether the write target addresses are contiguous, based on the analysis result of the access pattern (S233).

When the command size is large and the write target addresses are contiguous, the data load selector 181 selects the IDL as the data load method used for the fine program (S234).

When the command size is equal to or smaller than the threshold value (NO in S232) or when the write target addresses are not contiguous (NO in S233), at step S235, the data load selector 181 selects any one of the IDL or the EDL as the data load method used for the fine program based on the above-described index (for example, the elapsed time from the completion of the MLC program).

The data load selector 181 notifies the processor 12 of the selection result of the data load method (S236). Thereby, when the fine program is executed, the processor 12 instructs the NAND memory 30 to execute the fine program by using the data load method indicated in the selection result.

With the above, the memory system 1 of the present modification example ends the operation.

(d) Summary

As described above, the memory system 1 of the present embodiment can select the data load method used for the fine program based on the write throughput in a time window.

Therefore, the present embodiment can provide a memory system with high performance and high reliability.

(3) Third Embodiment

A memory system of a third embodiment will be described with reference to FIGS. 31 to 33.

(a) Configuration Example

Figure 31:
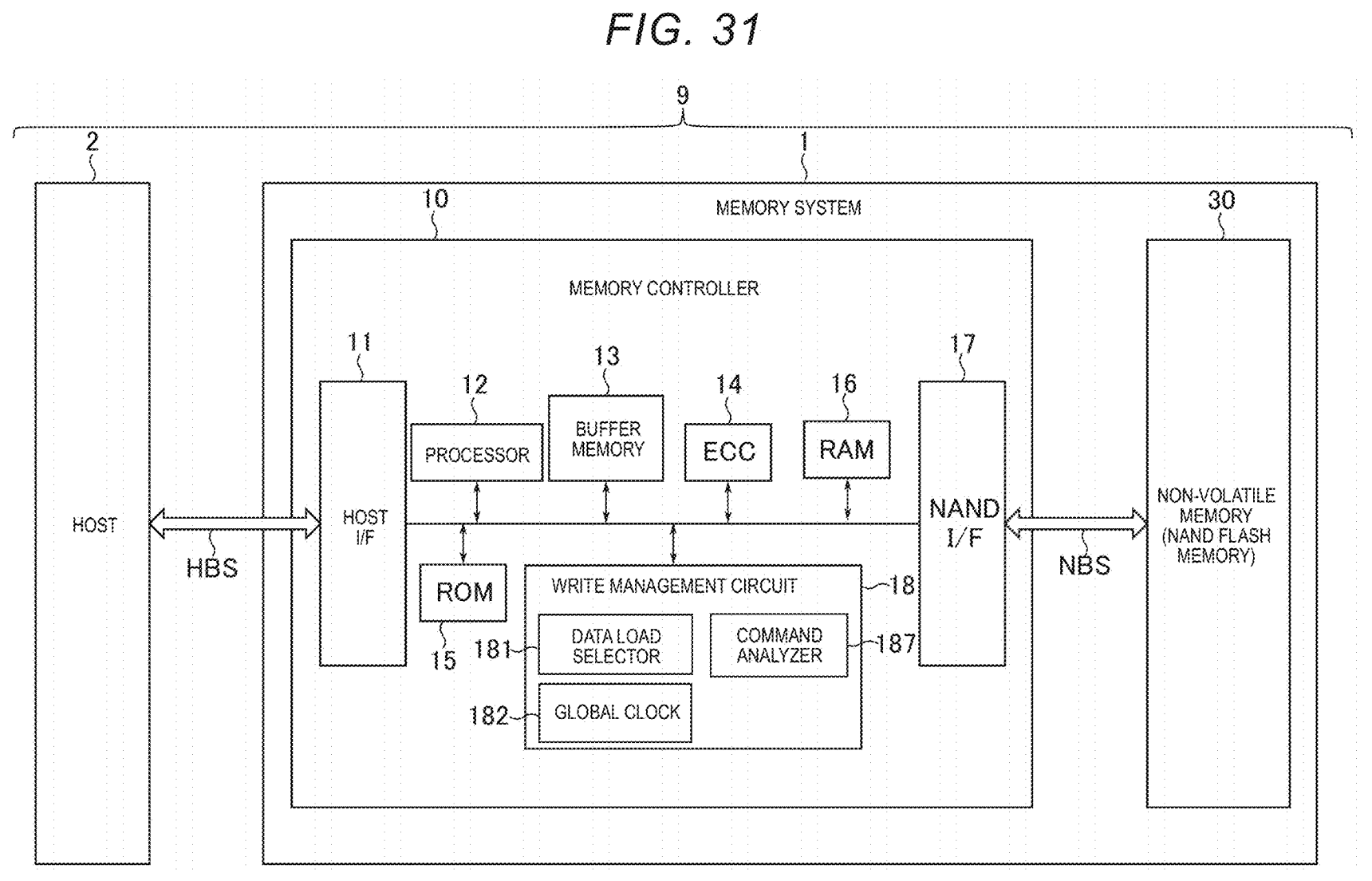

FIG. 31 is a block diagram showing the configuration example of the memory system 1 of the present embodiment.

The memory system 1 of the present embodiment controls the selection of the IDL or the EDL in accordance with whether the write operation is a write operation using write data from the host 2 or a write operation according to background processing. Hereinafter, the write operation requested by the host 2 is referred to as a host write. Further, the write operation according to the background processing is called a background write.

The host write is an operation mode of writing the write data transferred from the host 2 to the NAND memory 30. The background write is an operation mode of writing data prepared inside the memory system 1, such as garbage collection (compaction), wear leveling, or data refresh, to the NAND memory 30.

As shown in FIG. 31, in the memory controller 10 of the memory system 1 of the present embodiment, the write management circuit 18 further includes a command analyzer 187.

The command analyzer 187 analyzes whether the command generated by the NAND interface circuit 17 is a command for the host write or a command for the background write, based on various pieces of information (for example, attribute information) provided in the command generated by the NAND interface circuit 17. The command analyzer 187 sends an analysis result of the command to the data load selector 181.

The data load selector 181 selects the data load method used for the fine program based on the analysis result of the command by the command analyzer 187.

When the write operation to be executed is the background write, the IDL is selected as the data load method of the fine program of the write operation.

For example, the progress of the background write can be adjusted by the memory system 1. Therefore, the memory controller 10 can control the elapsed time Dx from the completion of the MLC program to the present to be relatively short for the memory cell MC that is a target of the background write.

In addition, in the IDL, the loading of the lower/middle page data is executed inside the NAND memory 30, and thus the IDL occupies less the NAND bus NBS than the EDL. Therefore, in particular, in a case of a workload having a relatively short idle time (a workload in which an interval of host write requests is equal to or shorter than a certain threshold value), the influence on the performance of the host write can be reduced by using the IDL for the background write.

Note that, when the background write is executed by the fine program using the IDL, it is desirable that the ECC processing be executed for data written by the background write. When error correction fails in the ECC processing, the memory controller 10 can execute the background write again by using the lower/middle page data stored in the source block that is a target of the background processing.

When the write operation to be executed is the host write, any one of the IDL or the EDL is selected as the data load method for the fine program based on other above-described indices such as the elapsed time from the completion of the MLC program or the write throughput.

(b) Operation Example

Figure 32:
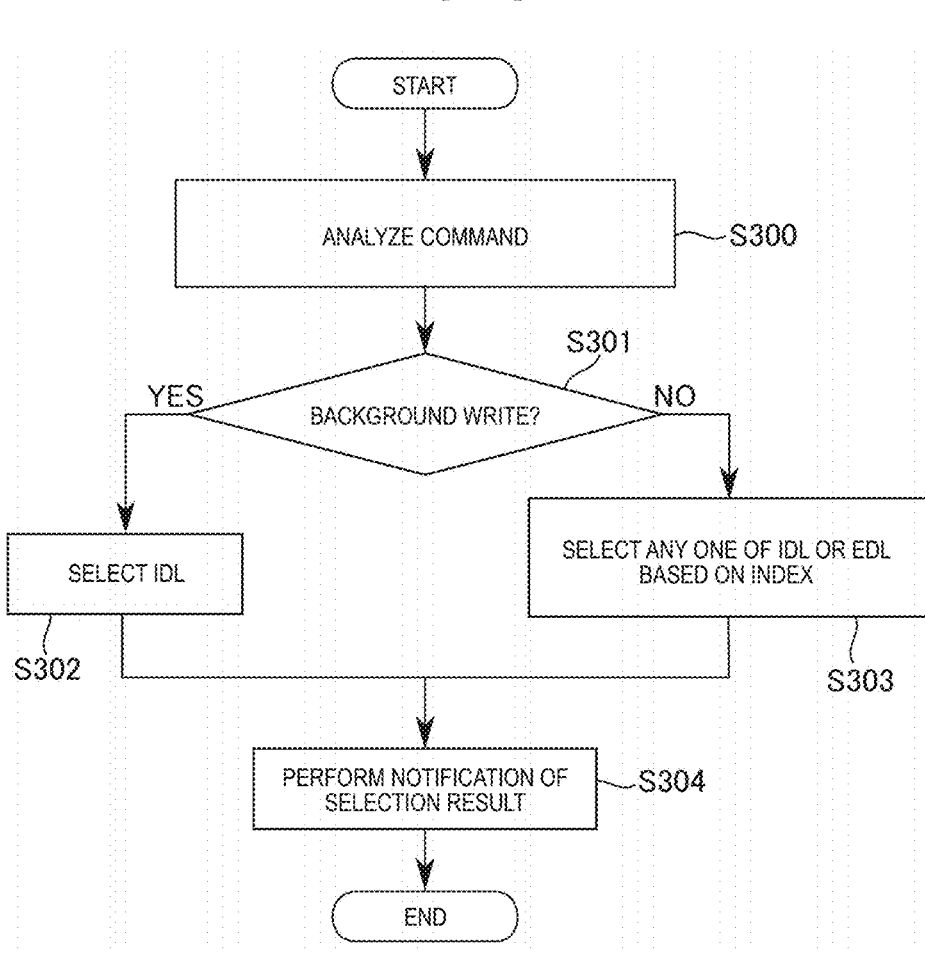
FIG. 32 is a flowchart showing an operation example of a write operation in the memory system according to the third embodiment.

FIG. 32 is a flowchart showing an operation example of the memory system 1 according to the present embodiment.

As shown in FIG. 32, in the memory system 1 of the present embodiment, when the NAND interface circuit 17 generates a command, the command analyzer 187 analyzes the command (S300). The command analyzer 187 sends the analysis result of the command to the data load selector 181.

The data load selector 181 determines whether the write operation to be executed is the background write, based on the analysis result of the command (S301).

When the write operation to be executed is the background write (YES in S301), the data load selector 181 selects the IDL as the data load method of the fine program (S302).

When the write operation to be executed is the host write (NO in S301), at step S303, the data load selector 181 selects any one of the IDL or the EDL based on the above-described one or more indices (for example, the elapsed time from the completion of the MLC program).

The data load selector 181 notifies the processor 12 of the selection result of the data load method (S304). When the fine program is executed, the processor 12 instructs the NAND memory 30 to execute the fine program using the data load method indicated in the selection result. With the above, the memory system 1 of the present embodiment ends the operation.

(c) Modification Example

Figure 33:
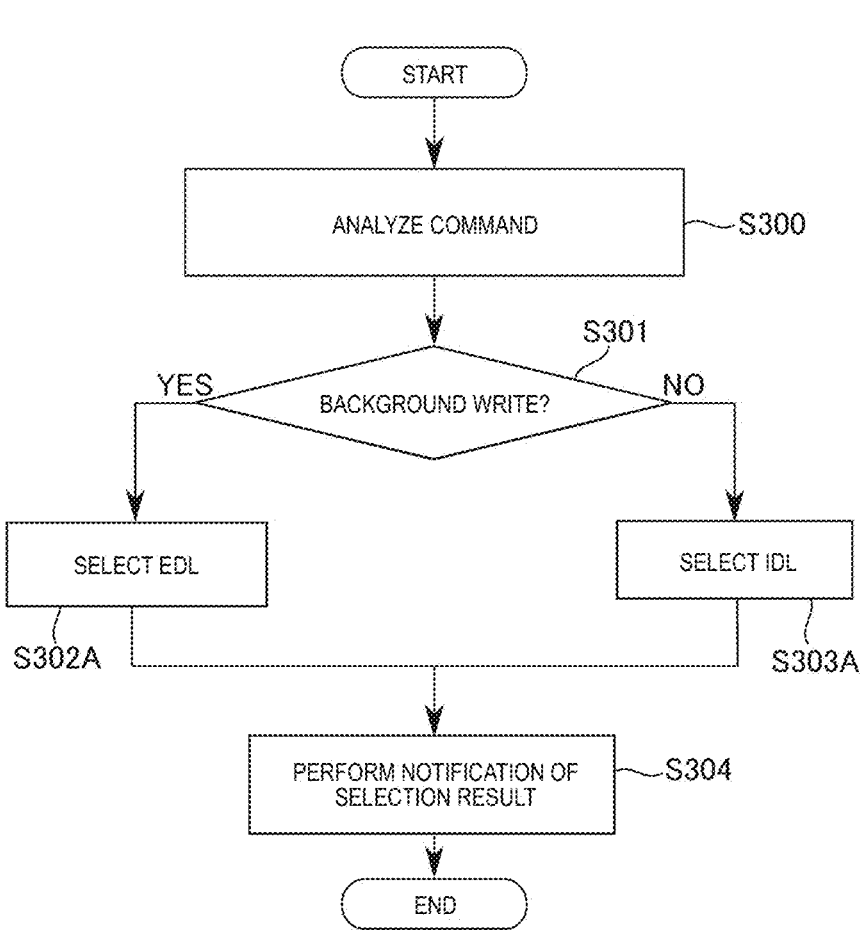
FIG. 33 is a flowchart showing an operation example of the write operation according to a modification example of the memory system of the third embodiment.

FIG. 33 is a flowchart showing an operation example in a modification example of the memory system 1 of the present embodiment.

In a case of a workload having a relatively long idle time (a workload in which the interval of host write requests is longer than a certain threshold value), the time for loading data at the time of the fine program is likely to affect the performance of the memory system as viewed from the host. Therefore, it is desirable that the IDL be used for the fine program of the host write in the workload having the relatively long idle time.

Further, in the case of the workload having the relatively long idle time, the background processing is less likely to affect the performance of the memory system as viewed from the host. Therefore, it is desirable that the EDL be used for the fine program of the background write in the workload having the relatively long idle time.

The configuration of the memory system 1 of the present modification example is the same as the third embodiment described with reference to FIG. 31.

As shown in FIG. 33, in the present modification example, the data load selector 181 determines whether a write operation to be executed is the background write (S300, S301).

When the write operation to be executed is the background write (YES in S301), the data load selector 181 selects the EDL (S302A).

When the write operation to be executed is not the background write (NO in S301), the data load selector 181 selects, for example, the IDL (S303A).

The data load selector 181 notifies the processor 12 of the selection result of the data load method (S304). When the fine program is executed, the processor 12 instructs the NAND memory 30 to execute the fine program using the data load method indicated in the selection result.

With the above, the memory system 1 of the modification example ends the operation.

(d) Summary

The memory system 1 of the present embodiment selects the IDL or the EDL as the data load method at the time of the fine program based on whether a write operation to be executed is a host write or a background write.

Thereby, the memory system 1 of the present embodiment can execute the requested write operation by the data load method suitable for the fine program based on the type of the write operation to be executed.

Therefore, the memory system 1 of the present embodiment can provide a memory system with high performance and high reliability.

(4) Fourth Embodiment

A memory system of a fourth embodiment will be described with reference to FIGS. 34 and 35.

(a) Configuration Example

Figure 34:
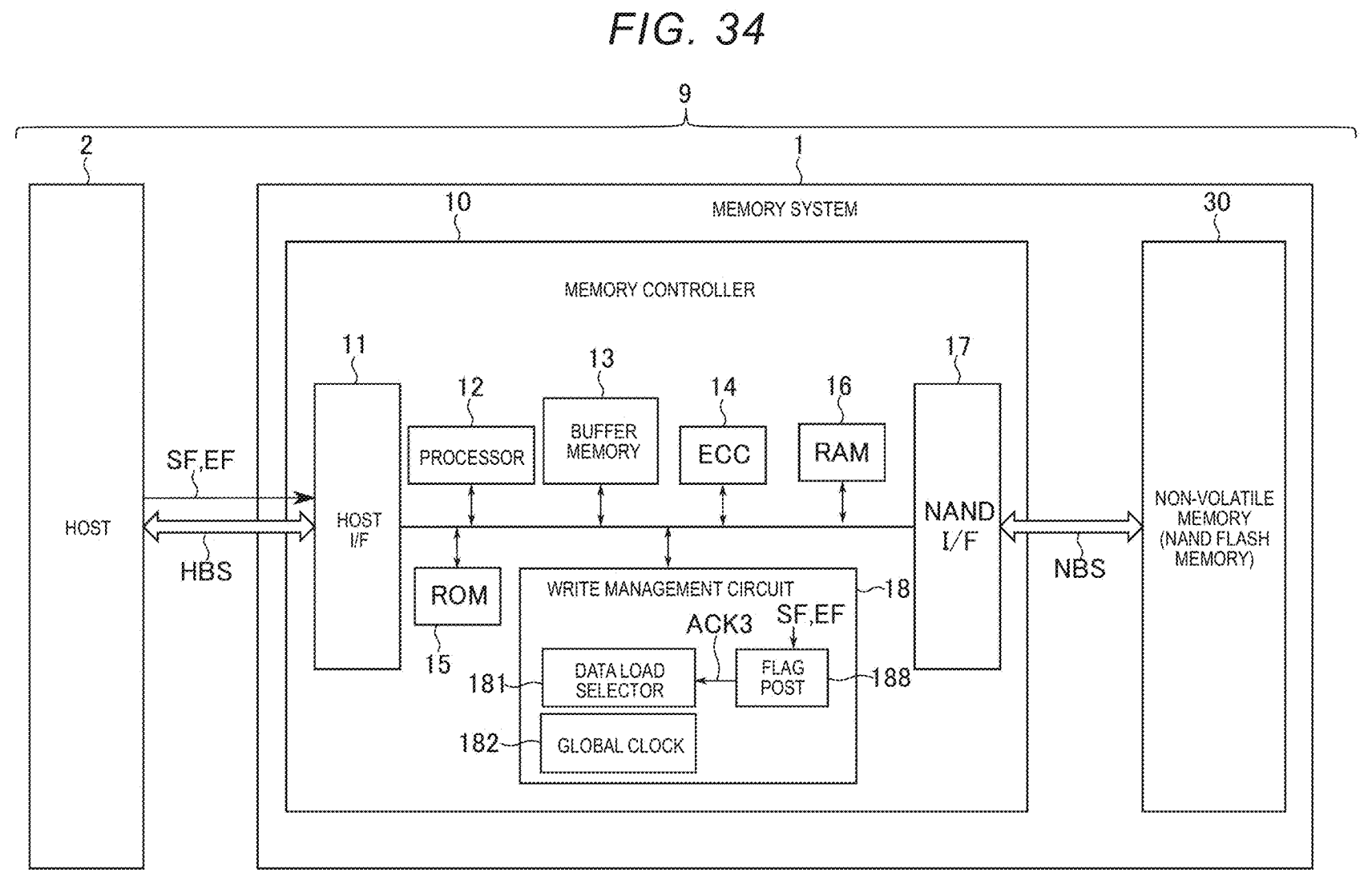

FIG. 34 is a block diagram showing the configuration example of the memory system 1 of the present embodiment.

The memory system 1 of the present embodiment selects any one of the IDL or the EDL as the data load method of the fine program based on hint information from the host 2.

The host 2 sends a pair of a start flag SF and an end flag EF as the hint information to the memory controller 10. The start flag SF is a signal for notifying that the host 2 will start transferring a large number of write commands to the memory system 1. The end flag EF is a signal for notifying the end of the transfer of the large number of write commands.

As shown in FIG. 34, in the memory controller 10 of the memory system 1 of the present embodiment, the write management circuit 18 further includes a flag post 188.

The flag post 188 receives the start flag SF and the end flag EF as the hint information. The flag post 188 sends a notification signal ACK3 to the data load selector 181 such that the IDL is selected during a period from the reception of the start flag SF to the reception of the end flag EF, based on the received start flag SF.

The data load selector 181 selects the IDL during the period from the reception of the start flag SF to the reception of the end flag EF, based on the notification signal ACK3 from the flag post 188.

(b) Operation Example

Figure 35:
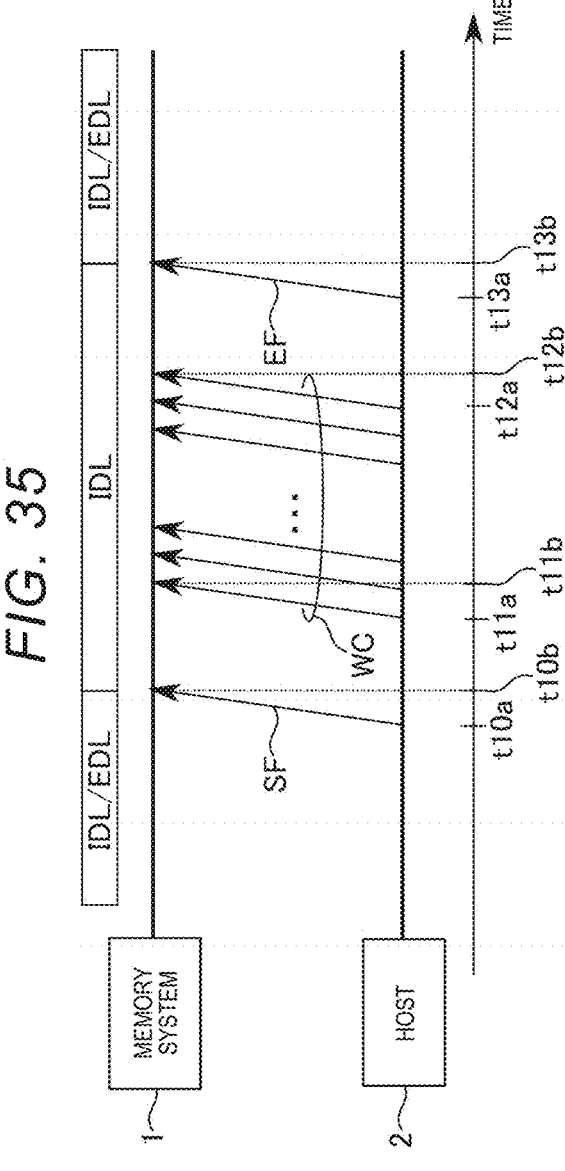
FIG. 35 is a diagram showing an operation example of a write operation in the memory system according to the fourth embodiment.

FIG. 35 is a schematic diagram illustrating an operation example of the memory system 1 of the present embodiment.

As shown in FIG. 35, the host 2 sends the start flag SF as the hint information to the memory system 1 at a time t10$a$. The start flag SF notifies the memory system 1 that a large number of write commands are to be issued from that point.

At a time t10$b$, the memory controller 10 receives the start flag SF.

The flag post 188 analyzes the start flag SF. The flag post 188 sends the notification signal ACK3 to the data load selector 181 based on the analysis result of the start flag SF.

The data load selector 181 recognizes that the IDL is selected when the fine program is executed, based on the notification signal ACK3.

During a period from a time t11$a$ to a time t12$a$, the host 2 sends a large number of write commands WC to the memory system 1.

During a period from a time t11$b$ to a time t12$b$, the memory system 1 receives the large number of write commands WC.

The data load selector 181 continues to select the IDL as the data load method for the fine program to be executed during the period from the time t11$b$ to the time t12$b$.

The host 2 sends the end flag EF to the memory system 1 as the hint information at a time t13$a$ after all the write commands WC are transmitted.

At a time t13$b$, the memory controller 10 receives the end flag EF. In the memory controller 10, the flag post 188 receives the end flag EF.

The flag post 188 analyzes the end flag EF. The flag post 188 stops supplying the notification signal ACK3 based on the analysis result of the end flag.

The data load selector 181 recognizes that the write operations in accordance with the large number of write commands WC are ended, based on the stop of the supply of the notification signal ACK3. Thereby, the data load selector 181 stops the continuous selection of the IDL.

After this, until a new notification signal ACK3 is received from the flag post 188, the data load selector 181 selects any one of the IDL or the EDL based on the above-described index for selecting the data load method (for example, the elapsed time from the completion of the MLC program).

Note that the memory system 1 of the present embodiment may select the EDL as the data load method at the time of the fine program based on the hint information from the host 2.

(c) Summary

As described above, the memory system 1 of the present embodiment can select the data load method suitable for a write operation to be executed among the IDL or the EDL, based on the hint information from the host 2.

Therefore, the memory system 1 of the present embodiment can provide a memory system with high performance and high reliability.

(5) Fifth Embodiment

A memory system of a fifth embodiment will be described with reference to FIGS. 36 and 37.

(a) Configuration Example

Figure 36:
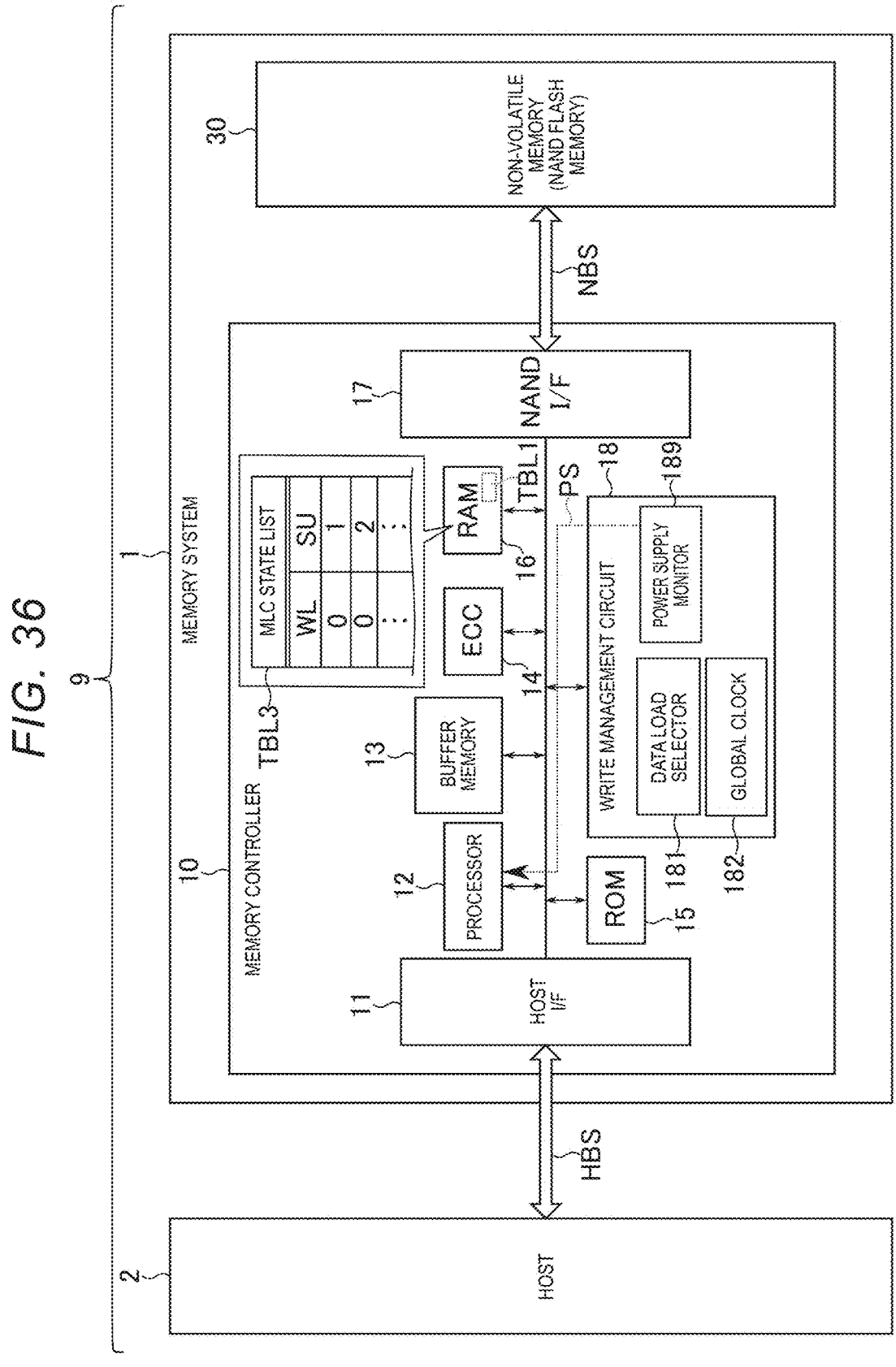
FIG. 36 is a block diagram showing a configuration example of a memory system according to a fifth embodiment.

FIG. 36 is a block diagram showing the configuration example of the memory system 1 of the present embodiment.

The memory system 1 of the present embodiment controls the selection of the IDL and the EDL at the time of the execution of the fine program according to a state of power supply cutoff and power supply restoration.

As shown in FIG. 36, in the memory controller 10 of the memory system 1 of the present embodiment, the write management circuit 18 further includes a power supply monitor When the power supply cutoff to the memory system 1 is detected, the power supply monitor 189 sends a power cut signal PS to the processor 12.

The processor 12 generates a management table TBL3 indicating the word line WL and the string unit SU to which a memory cell MC in the MLC state is connected, in accordance with the power cut signal PS. Hereinafter, the management table TBL3 indicating the word line WL and the string unit SU to which the memory cell MC in the MLC state is connected is referred to as an MLC state list TBL3.

The MLC state list TBL3 is temporarily stored, for example, in the RAM 16. For example, the memory controller 10 writes the generated MLC state list TBL3 to the NAND memory 30 or transmits the MLC state list TBL3 to the host 2 when the power supply to the memory system 1 is cut off. When the memory system 1 is started up by the power supply restoration, the memory controller 10 reads the MLC state list TBL3 from the NAND memory 30 or receives the MLC state list TBL3 from the host 2.

When the memory controller 10 receives a write command from the host 2 after the power supply restoration, the data load selector 181 refers to the MLC state list TBL3.

For a memory cell MC managed in the MLC state list TBL3, the elapsed time Dx from the completion of the MLC program to the present is unknown. Therefore, when a write target address corresponding to the write command from the host 2 corresponds to the word line number and the string unit number managed in the MLC state list TBL3, the data load selector 181 selects the EDL having higher reliability of data than the IDL as the data load method of the fine program.

After the power supply restoration, after the fine program using the EDL is executed for all the cell units CU designated by the addresses corresponding to the word lines WL and the string units SU recorded in the MLC state list TBL3, the data load selector 181 selects any one of the IDL or the EDL as the data load method used for the fine program, based on the above-described index (for example, the elapsed time from the completion of the MLC program).

Note that there is a case where the processor 12 is not able to generate the MLC state list TBL3 due to an unexpected power cutoff such as a power failure. In such a case, first, the processor 12 determines a block BLK to which a write operation was executed last before the power cutoff (hereinafter simply referred to as a last written block), for example based on some pieces of log information. Next, the processor 12 calculates, per cell unit CU, the number of memory cells MC that turn on by applying one or more read voltages to each word line WL included in the last written block. The processor 12, then, determines a cell unit CU that became the MLC state last before the power cutoff (hereinafter simply referred to as a last MLC cell unit), based on the calculation result. The processor 12 uses the EDL for all of the fine programs to be executed on the cell units CU up to the last MLC cell unit, which are to be executed in accordance with the write order as described with reference to FIG. 9. For example, in a case where a cell unit CU corresponding to the word line WL1 and the string unit SU0 is the last MLC cell unit by the 6th write operation described with reference to FIG. 9, the processor 12 uses the EDL for all of the fine programs to be executed on the cell units CU (i.e., 7th, 9th, 11th, 13th, 15th, and 17th write operations) up to this last MLC cell unit (17th write operation). For the cell units CU subsequent to this last MLC cell unit (e.g., 19th or subsequent write operations), the processor 12 selects any one of the IDL or the EDL, based on the above-described index (for example, the elapsed time from the completion of the MLC program (e.g., 8th or subsequent write operations)).

Note that, when the number of string units SU included in one block BLK is N (N is an integer of 1 or larger, and 5 in the example shown in FIG. 9), and the number of word lines WL is M (M is an integer of 1 or larger, and 2 in the example shown in FIG. 9), where the word lines WL include cell units CU to which a write operation is executed after an MLC program is executed to a certain cell unit CU before a fine program is executed to the certain cell unit CU, the processor 12 uses the EDL for all of the fine programs to be executed on L cell units CU up to the last MLC cell unit. Here, L is calculated by $L=(M-1)\times N+1$. In a case where the last MLC cell unit is located on either end of a word line WL, the number of cell units CU to which the EDL is applied may be smaller than L. However, to simplify processing, the processor 12 may apply the EDL to the L cell units CU regardless of the location of the last MLC cell unit within a word line WL. Alternatively, the processor 12 may use the EDL for all of the fine programs to be executed on L' cell units CU up to the last MLC cell unit. Here, L' is calculated by $L'=(M'-1)\times N+1$ (M' is an integer larger than M). Alternatively, the processor 12 may use the EDL for all of the fine programs to be executed on L'' cell units CU up to the last MLC cell unit. Here, L'' is an integer larger than L. To further simplify processing, the processor 12 may use the EDL for all of the fine programs to be executed on all of the cell units included in the last written block.

Further, even when the management table (for example, the MLC state list) related to the write target address is not updated each time the power cutoff is detected, the data load method used for the fine program after the power supply restoration may be selected, similarly to the case of the unexpected power cutoff, based on the history of the write operation before the power cutoff.

(b) Operation Example

Figure 37:
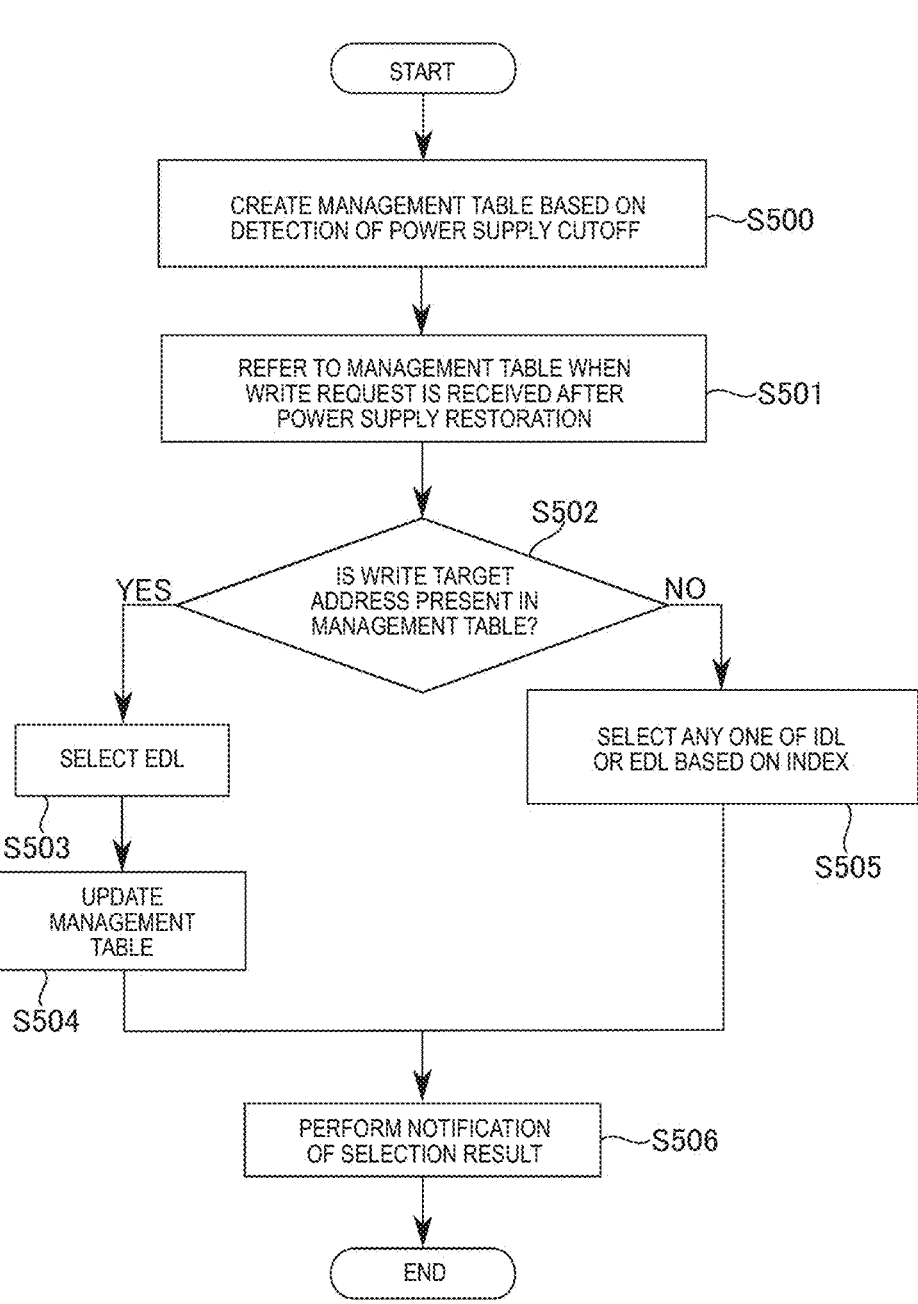
FIG. 37 is a flowchart showing an operation example of a write operation in the memory system according to the fifth embodiment.

FIG. 37 is a flowchart showing an operation example of the memory system 1 of the present embodiment.

As shown in FIG. 37, when the power supply monitor 189 detects the power supply cutoff, the processor 12 generates the management table TBL3 (MLC state list TBL3) in response to the power cut signal PS from the power supply monitor 189. The generated MLC state list TBL3 is transferred to the NAND memory 30 or the host 2 (S500).

When the memory system 1 is started up by the power supply restoration, the MLC state list TBL3 is stored in the RAM 16 of the memory system 1.

After the power supply restoration, when the memory controller 10 receives a write request from the host 2, the data load selector 181 refers to the MLC state list TBL3 (S501).

The data load selector 181 determines whether the write target addresses (the word line number and the string unit number) are present in the MLC state list TBL3 (S502).

When the word line number and the string unit number, which are the write targets, are present in the MLC state list TBL3 (YES in S502), the data load selector 181 selects the EDL as the data load method for the fine program to be executed (S503).

The data load selector 181 updates the MLC state list TBL3 (S504). For example, the data load selector 181 deletes the word line number and the string unit number, which are the write targets on which the fine program is executed by the selected EDL, from the MLC state list TBL3.

When the word line number and the string unit number, which are the write targets, are not present in the MLC state list TBL3 (NO in S502), the data load selector 181 selects any one of the IDL or the EDL based on an index such as the elapsed time from the completion of the MLC program or the write throughput (S505).

The data load selector 181 notifies the processor 12 of the selection result of the data load method (S506). Thereby, when the fine program is executed, the processor 12 instructs the NAND memory 30 to execute the fine program by using the data load method indicated in the selection result.

With the above, the memory system 1 of the present embodiment ends the operation.

(c) Summary

As described above, the memory system 1 of the present embodiment can provide a memory system having high performance and high reliability even when the power supply to the memory system 1 is cut off.

(6) Others

In the memory system of the embodiments, the non-volatile memory is not limited to the NAND flash memory, and may be another memory device.

In the memory system of the embodiments, when data is written to a memory cell by a plurality of write stages (write operations), the data written to the memory cell may be 2-bit data, 3-bit data, 5-bit data, or 6-bit data.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
   a non-volatile memory that includes
      a memory cell configured to store data in a non-volatile manner, and
      a control circuit configured to:
         write first data of n bits (where n is a real number of 1 or larger) to the memory cell by a first write operation; and
         write second data of m bits (where m is a real number larger than n), which includes the n bits of the first data, to the memory cell by a second write operation; and
   a memory controller electrically connected to the non-volatile memory and configured to:
      issue a first command sequence to the non-volatile memory to execute the first write operation;
      select one of first and second methods for preparing the second data for the second write operation based on an elapsed time from completion of the first write operation on the memory cell, such that the first method is selected when the elapsed time is shorter than a first threshold value and the second method is selected when the elapsed time is longer than the first threshold value; and
      issue a second command sequence to the non-volatile memory to execute the second write operation, the second command sequence indicating the selected method for preparing the second data, wherein
   in the first method, the second data for the second write operation is prepared inside the non-volatile memory, and
   in the second method, the second data for the second write operation is prepared outside the non-volatile memory.

2. The memory system according to claim 1, wherein the memory controller is further configured to:
   select the first method in a second period after a first period, when a throughput of data from a host in the first period is higher than a seventh threshold value; and
   select the second method in the second period, when the throughput is equal to or lower than the seventh threshold value.

3. The memory system according to claim 1, wherein the memory controller is further configured to:
   select the first method in a second period after a first period, when a throughput of write data to the non-volatile memory in the first period is higher than an eighth threshold value; and
   select the second method in the second period, when the throughput is equal to or lower than the eighth threshold value.

4. The memory system according to claim 1, wherein the memory controller is further configured to:
   select the first method when a size of first write data designated by a first command from a host is larger than a ninth threshold value and a logical address associated with second write data designated by a second command from the host is contiguous with a logical address associated with the first write data; and
   select one of the first and second methods based on the elapsed time when the size of the first write data is equal to or smaller than the ninth threshold value or when the logical address associated with the second write data is not contiguous with the logical address associated with the first write data.

5. The memory system according to claim 1, wherein the memory controller is further configured to:
   select the first method when the second write operation is initiated by background processing; and
   select one of the first and second methods based on the elapsed time when the second write operation is initiated in response to a command from a host.

6. The memory system according to claim 5, wherein the memory controller is further configured to:
   determine whether an interval of write requests from the host is equal to or shorter than a tenth threshold value; and
   when the interval is equal to or shorter than the tenth threshold value,
      select the first method for the second write operation that is initiated by the background processing; and
      select one of the first and second methods for the second write operation that is initiated in response to the command from the host, based on the elapsed time.

7. The memory system according to claim 1, wherein the memory controller is further configured to:

select the first method when the second write operation is initiated in response to a command from a host; and select the second method when the second write operation is initiated by background processing.

8. The memory system according to claim 7, wherein the memory controller is further configured to:

determine whether an interval of write requests from the host is longer than an eleventh threshold value; and when the interval is longer than the eleventh threshold value, select the first method for the second write operation that is initiated in response to the command from the host; and select the second method for the second write operation that is initiated by the background processing.

9. The memory system according to claim 1, wherein the memory controller is further configured to:

select the first method continuously upon receipt of a first flag indicating transmission of a plurality of commands from a host; and discontinue the continuous selection of the first method upon receipt of a second flag indicating an end of the transmission of the plurality of commands from the host.

10. The memory system according to claim 1, wherein the memory cell is one of a plurality of memory cells, and the memory controller is further configured to:

record an address of a memory cell on which the first write operation has been executed and the second write operation has not yet been executed in a third management table when power supply to the memory system is to be stopped;

select the second method when an address of a target memory cell among the plurality of memory cells, which is a target of the second write operation, is recorded in the third management table, after the power supply to the memory system is restored; and select one of the first and second methods based on the elapsed time when the address of the target memory cell is not recorded in the third management table.

11. The memory system according to claim 1, wherein the non-volatile memory does not execute an erase operation on the memory cell between the first write operation and the second write operation.

12. The memory system according to claim 1, wherein the non-volatile memory further includes a data latch, and in the first method, the control circuit is further configured to:

read the first data from the memory cell;

store the read first data in the data latch;

receive third data from the memory controller;

prepare the second data which includes the read first data and the received third data, in the data latch; and in response to receiving the second command sequence from the memory controller, write the second data, which is prepared by the control circuit in the data latch, to the memory cell, and in the second method, the memory controller is configured to:

prepare the second data after the first write operation of the first data is performed on the memory cell; and transfer the second data to the non-volatile memory, and the control circuit is configured to:

in response to receiving the second command sequence from the memory controller, write the second data, which is prepared by the memory controller, to the memory cell.

13. A memory system comprising:

a first memory;

a clock configured to measure time;

a non-volatile memory that includes a plurality of memory cells each configured to store data in a non-volatile manner, and a control circuit configured to:

write first data of n bits (where n is a real number of 1 or larger) to each of the plurality of memory cells by a first write operation; and write second data of m bits (where m is a real number larger than n), which includes the n bits of the first data, to each of the plurality of memory cells by a second write operation; and a memory controller electrically connected to the non-volatile memory and configured to:

issue a first command sequence to the non-volatile memory to execute the first write operation;

select one of first and second methods for preparing the second data for the second write operation; and issue a second command sequence to the non-volatile memory to execute the second write operation, the second command sequence indicating the selected method for preparing the second data, wherein the memory controller is further configured to:

store in the first memory, a first management table having a plurality of entries respectively corresponding to the plurality of memory cells, each of the entries indicating a memory cell address and a first time related to the first write operation performed on a memory cell designated by the memory cell address;

select the first method for performing the second write operation on a target memory cell among the plurality of memory cells when a difference value between a second time related to the second write operation to be performed on the target memory cell and the first time stored in the entry for the target memory cell is equal to or shorter than a second threshold value; and select the second method for performing the second write operation on the target memory cell when the difference value is longer than the second threshold value.

14. The memory system according to claim 13, further comprising:

a temperature sensor configured to measure a temperature of the non-volatile memory, wherein the memory controller is further configured to adjust the second threshold value based on a measurement result of the temperature sensor.

15. The memory system according to claim 14, wherein the memory controller is configured to:

decrease the second threshold value when a first temperature measured by the temperature sensor at a time the first write operation was executed, is higher than a third threshold value; and decrease the second threshold value when the first temperature is lower than a fourth threshold value which is smaller than the third threshold value.

16. The memory system according to claim 14, wherein the memory controller is further configured to:

acquire a temperature difference between a first temperature measured by the temperature sensor at a time the first write operation was executed and a second temperature measured by the temperature sensor in preparation for issuing the second command sequence for the second write operation; and decrease the second threshold value when the temperature difference is larger than a fifth threshold value.

17. The memory system according to claim 13, wherein the memory controller is further configured to:

track the number of times an erase operation is performed on each of the plurality of memory cells; and decrease the second threshold value when the number of times the erase operation is performed on the target memory cell is larger than a sixth threshold value.

18. The memory system according to claim 13, wherein the memory controller is further configured to:

select the first method in a second period after a first period, when a throughput of data from a host in the first period is higher than a seventh threshold value; and select the second method in the second period, when the throughput is equal to or lower than the seventh threshold value.

19. The memory system according to claim 13, wherein the memory controller is further configured to:

select the first method in a second period after a first period, when a throughput of write data to the non-volatile memory in the first period is higher than an eighth threshold value; and select the second method in the second period, when the throughput is equal to or lower than the eighth threshold value.

20. The memory system according to claim 13, wherein the memory controller is further configured to:

select the first method when a size of first write data designated by a first command from a host is larger than a ninth threshold value and a logical address associated with second write data designated by a second command from the host is contiguous with a logical address associated with the first write data; and select one of the first and second methods based on the difference value when the size of the first write data is equal to or smaller than the ninth threshold value or when the logical address associated with the second write data is not contiguous with the logical address associated with the first write data.

21. The memory system according to claim 13, wherein the memory controller is further configured to:

select the first method when the second write operation is initiated by background processing; and select one of the first and second methods based on the difference value when the second write operation is initiated in response to a command from a host.

22. The memory system according to claim 21, wherein the memory controller is further configured to:

determine whether an interval of write requests from the host is equal to or shorter than a tenth threshold value; and when the interval is equal to or shorter than the tenth threshold value, select the first method for the second write operation that is initiated by the background processing; and select one of the first and second methods for the second write operation that is initiated in response to the command from the host, based on the difference value.

23. The memory system according to claim 13, wherein the memory controller is further configured to:

select the first method when the second write operation is initiated in response to a command from a host; and select the second method when the second write operation is initiated by background processing.

24. The memory system according to claim 23, wherein the memory controller is further configured to:

determine whether an interval of write requests from the host is longer than an eleventh threshold value; and when the interval is longer than the eleventh threshold value, select the first method for the second write operation that is initiated in response to the command from the host; and select the second method for the second write operation that is initiated by the background processing.

25. The memory system according to claim 13, wherein the memory controller is further configured to:

select the first method continuously upon receipt of a first flag indicating transmission of a plurality of commands from a host; and discontinue the continuous selection of the first method upon receipt of a second flag indicating an end of the transmission of the plurality of commands from the host.

26. The memory system according to claim 13, wherein the memory controller is further configured to:

record an address of each of the plurality of memory cells on which the first write operation has been executed and the second write operation has not yet been executed in a third management table when power supply to the memory system is to be stopped;

select the second method when an address of the target memory cell is recorded in the third management table, after the power supply to the memory system is restored; and select one of the first and second methods based on the difference value when the address of the target memory cell is not recorded in the third management table.

27. The memory system according to claim 13, wherein the non-volatile memory does not execute an erase operation on the target memory cell between the first write operation and the second write operation.

28. The memory system according to claim 13, wherein in the first method, the second data for the second write operation is prepared inside the non-volatile memory, and in the second method, the second data for the second write operation is prepared outside the non-volatile memory.

29. The memory system according to claim 28, wherein the non-volatile memory further includes a data latch, and in the first method, the control circuit is further configured to:

read the first data from the target memory cell;

store the read first data in the data latch;

receive third data from the memory controller;

prepare the second data which includes the read first data and the received third data, in the data latch; and in response to receiving the second command
sequence from the memory controller, write the
second data, which is prepared by the control
circuit in the data latch, to the target memory cell,
and in the second method, the memory controller is configured to:

prepare the second data after the first write operation
of the first data is performed on the target memory
cell; and transfer the second data to the non-volatile memory,
and the control circuit is configured to:

in response to receiving the second command
sequence from the memory controller, write the
second data, which is prepared by the memory
controller, to the target memory cell.

\* \* \* \* \*